US010366096B2

(12) United States Patent
Ferrar

(10) Patent No.: US 10,366,096 B2
(45) Date of Patent: Jul. 30, 2019

(54) METHOD AND SYSTEM FOR IMPLEMENTING A LOG PARSER IN A LOG ANALYTICS SYSTEM

(71) Applicant: ORACLE INTERNATIONAL CORPORATION, Redwood Shores, CA (US)

(72) Inventor: Gregory Michael Ferrar, Santa Cruz, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 382 days.

(21) Appl. No.: 15/089,180

(22) Filed: Apr. 1, 2016

(65) Prior Publication Data
US 2016/0292263 A1  Oct. 6, 2016

Related U.S. Application Data

(60) Provisional application No. 62/142,987, filed on Apr. 3, 2015.

(51) Int. Cl.
G06F 17/30 (2006.01)
G06F 16/248 (2019.01)
G06F 16/84 (2019.01)
G06F 16/35 (2019.01)
G06F 16/2455 (2019.01)
G06F 16/22 (2019.01)
G06N 20/00 (2019.01)
(Continued)

(52) U.S. Cl.
CPC ........ *G06F 16/248* (2019.01); *G06F 3/04842* (2013.01); *G06F 9/44505* (2013.01); *G06F 9/542* (2013.01); *G06F 11/00* (2013.01); *G06F 16/21* (2019.01); *G06F 16/2228* (2019.01); *G06F 16/2455* (2019.01); *G06F 16/353* (2019.01); *G06F 16/84* (2019.01); *G06N 20/00* (2019.01); *H04L 41/5074* (2013.01); *H04L 41/145* (2013.01)

(58) Field of Classification Search
CPC ......... G06F 17/30554; G06F 17/30289; G06F 16/21
USPC ....................................................... 707/811
See application file for complete search history.

(56) References Cited

U.S. PATENT DOCUMENTS 6,738,911 B2  5/2004 Hayes
6,910,183 B2  6/2005 Maier et al.
(Continued)

FOREIGN PATENT DOCUMENTS

CN  101267352 B  5/2011

OTHER PUBLICATIONS

School of Haskell, "Parsing Log FIles in Haskell", Feb. 1, 2015, 22 pages.
(Continued)

Primary Examiner — Kimberly L Wilson
(74) Attorney, Agent, or Firm — Invoke

(57) ABSTRACT

Disclosed is a system, method, and computer program product for implementing a log analytics method and system that can configure, collect, and analyze log records in an efficient manner. An improved approach has been described to automatically generate a log parser by analysis of the line content of a log. In addition, an efficient approach has been described to extract key-value content from the log content.

20 Claims, 69 Drawing Sheets

(51) Int. Cl.
*H04L 12/24* (2006.01)
*G06F 9/445* (2018.01)
*G06F 9/54* (2006.01)
*G06F 3/0484* (2013.01)
*G06F 11/00* (2006.01)
*G06F 16/21* (2019.01)

(56) References Cited

U.S. PATENT DOCUMENTS

| | | |
|---|---|---|
| 7,111,075 B2 | 9/2006 | Pankovcin et al. |
| 7,155,514 B1 | 12/2006 | Milford |
| 7,523,433 B1 | 4/2009 | Anderson |
| 7,653,633 B2 | 1/2010 | Villella et al. |
| 7,822,850 B1 | 10/2010 | Brikman et al. |
| 7,844,999 B1 | 11/2010 | Aguilar-macias et al. |
| 8,041,683 B1 | 10/2011 | Korolev et al. |
| 8,612,377 B2 | 12/2013 | Beg et al. |
| 8,620,928 B1 | 12/2013 | Walton |
| 8,832,125 B2 | 9/2014 | Boctor |
| 9,092,625 B1 | 7/2015 | Kashyap et al. |
| 9,262,519 B1 | 2/2016 | Saurabh et al. |
| 9,292,328 B2 | 3/2016 | Pratt et al. |
| 2004/0254919 A1 | 12/2004 | Giuseppitti Gabriele |
| 2005/0044075 A1 | 2/2005 | Steere et al. |
| 2005/0228885 A1 | 10/2005 | Winfield et al. |
| 2006/0136177 A1 | 6/2006 | Patanian |
| 2006/0195297 A1* | 8/2006 | Kubota ............ G06F 17/30861 702/187 |
| 2006/0214963 A1 | 9/2006 | Komatsu |
| 2008/0005265 A1* | 1/2008 | Miettinen ............ G06F 17/248 709/217 |
| 2008/0155103 A1 | 6/2008 | Bailey |
| 2009/0089252 A1 | 4/2009 | Galitsky et al. |
| 2009/0119307 A1 | 5/2009 | Braun et al. |
| 2009/0249250 A1 | 10/2009 | Gajula et al. |
| 2010/0115010 A1 | 5/2010 | Anderson et al. |
| 2011/0246826 A1 | 10/2011 | Hsieh et al. |
| 2012/0005542 A1 | 1/2012 | Petersen et al. |
| 2012/0117079 A1 | 5/2012 | Baum et al. |
| 2012/0124047 A1 | 5/2012 | Hubbard |
| 2012/0278872 A1 | 11/2012 | Woelfel et al. |
| 2013/0054402 A1 | 2/2013 | Asherman et al. |
| 2013/0227352 A1 | 8/2013 | Kumarasamy et al. |
| 2013/0282739 A1* | 10/2013 | Anderson ............ G06F 17/2705 707/755 |
| 2014/0089744 A1 | 3/2014 | Oshiro |
| 2014/0157370 A1 | 6/2014 | Plattner et al. |
| 2014/0289428 A1 | 9/2014 | Walter et al. |
| 2015/0154192 A1 | 6/2015 | Lysne et al. |
| 2015/0379052 A1 | 12/2015 | Agarwal et al. |
| 2016/0019286 A1 | 1/2016 | Bach et al. |
| 2016/0034510 A1 | 2/2016 | Gukal |
| 2016/0041894 A1* | 2/2016 | Reid, III ............ G06F 11/3636 714/45 |
| 2016/0092558 A1 | 3/2016 | Ago et al. |
| 2016/0246849 A1 | 8/2016 | Frampton et al. |
| 2016/0247205 A1 | 8/2016 | Ziliacus et al. |
| 2016/0253425 A1 | 9/2016 | Stoops et al. |

OTHER PUBLICATIONS

Loggly, "Automated Parsing Log Types", Support Center, Apr. 8, 2015, 15 pages https://www.loggly.com/docs/automated-parsing/.
"Log monitoring/analysis" May 13, 2014, 4 pages http://ossec-docs.readthedocs.org/en/latest/manual/monitoring/.
Scalyr, "Parsing Logs", Apr. 19, 2015, 9 pages https://www.scalyr.com/help/parsing-logs/.
DataDOG DOCS, "Log Parsing in the Agent", Jul. 20, 2013, 3 pages http://docs.datadoghq.com/guides/logs/.
Gamuts Software, "Log File Parsers", Mar. 5, 2015, 1 page http://www.gamutsoftware.com/index.php/help/logfileconfiguration/.
Logentries, "Tags and Alerts", Jul. 6, 2015, 5 pages https://logentries.com/doc/setup-tags-alerts/.
William Lam, "How To Add A Tag (Log prefix) To Syslog Entries", May 7, 2013, 4 pages.
Loggly, "Tags", Support Center, Apr. 30, 2015, 5 pages https://www.loggly.com/docs/tags/.
Loggly, "Tag Your Sources for More Focused Searching" Sep. 26, 2015, 5 pages https://www.loggly.com/blog/log-management-tags-searching/.
International Search Report and Written Opinion dated Jul. 7, 2016 for corresponding PCT Patent Application No. PCT/US2016/025739.
Wei Xu, et al., "Detecting large-scale system problems by mining console logs", Proceedings of the ACM SIGOPS 22nd Symposium on Operation Systems Principles, SOSP '09, Jan. 1, 2009, p. 117, XP055254995, New York, New York, USA.
Meiyappan Nagappan, et al., "Abstracting log lines to log event types for mining software system logs", Mining Software Repositories (MSR), 2010, 7th IEEE Working Conference on, IEEE, Piscataway, NJ, USA, May 2, 2010, pp. 114-117, XP031675571.
Hongyong Yu, et al., "Mass log data processing and mining Hadoop and cloud computing" Computer Science & Education (ICCSE), 2010, 7th International Conference on, IEEE, Jul. 14, 2012, pp. 197-202, XP032232566.
Li, Weixi "Automatic Log Analysis Using Machine Learning: Awesome Automatic Log Analysis Version 2.0", Uppsala Universitet, Nov. 2013. (Year: 2013).
T. G. Dietterich ("Ensemble methods in machine learning", In Multiple Classifier System, Springer, pp. 1-15, 2000) (Year: 2000).
Ning et al ("HLAer: a System for Heterogeneous Log Analysis", "HLAer: a System for Heterogeneous Log Analysis," in SDM Workshop on Heterogeneous Machine Learning, 2014, pp. 1-22) (Year: 2014).
Han et al("Centroid-Based Document Classification: Analysis and Experimental Results", In: Zighed D.A., Komorowski J., Zytkow J. (eds) Principles of Data Mining and Knowledge Discovery. PKDD 2000. Lecture Notes in Computer Science, vol. 1910. Springer, 2000, pp. 1-8) (Year:200).

* cited by examiner

```
<CV>1070</CV>
<FieldDef name="service" DataType="STRING" MaxSize="4000"/>
<LogSource id="XZY_ID10" name="LinuxSyslogSource" sourceType="os_file"/>
<BaseParser id="XYZ_ID11" singleLineOnly="true" type="0" locale="en_US" encoding="UTF-8">
  <Name>host_syslog_logtype</Name>
  <Regex>(\S+)\s+(\d+)\s(\d+):(\d+):(\d+)\s(\S+)\s(?:([^:\[]+)(?:\[(\d+)\])?:\s+)?(.+)</Regex>
  <BaseFields>
    <BaseField seq="1" name="timemonthshortname"/>
    <BaseField seq="2" name="timeday"/>
    <BaseField seq="3" name="timehour24"/>
    <BaseField seq="4" name="timeminute"/>
    <BaseField seq="5" name="timesecond"/>
    <BaseField seq="6" name="srvrhostname"/>
    <BaseField seq="7" name="service"/>
    <BaseField seq="8" name="ospid"/>
    <BaseField seq="9" name="msg"/>
  </BaseFields>
</BaseParser>
```

1003 → `<CV>1070</CV>`
1001 → `<FieldDef ...>`
1002 → `<LogSource ...>`
1004 → `<BaseParser ...>`
1006 → `<BaseFields> ... </BaseFields>`

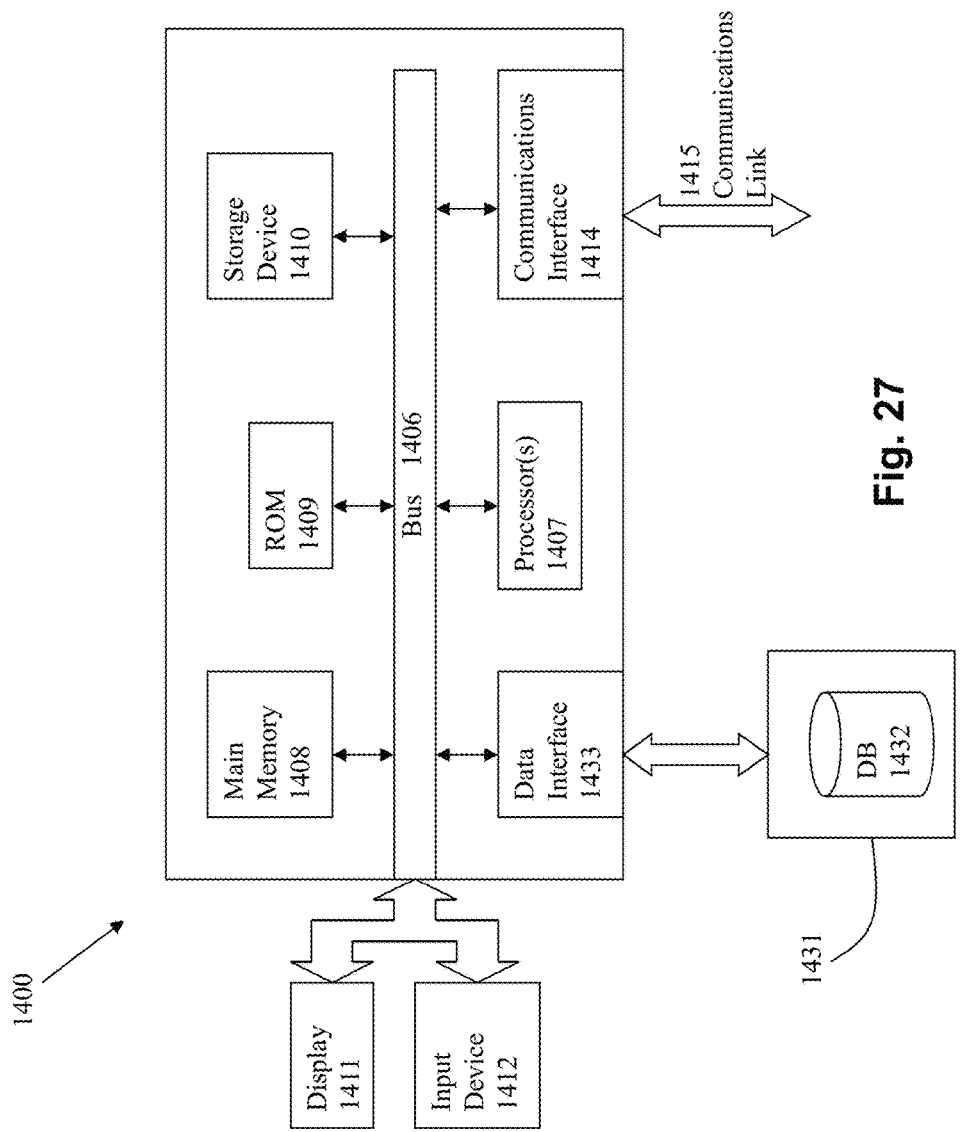

METHOD AND SYSTEM FOR IMPLEMENTING A LOG PARSER IN A LOG ANALYTICS SYSTEM

CROSS-REFERENCE TO RELATED APPLICATIONS

The present application claims the benefit of priority to U.S. Provisional Application No. 62/142,987, filed on Apr. 3, 2015, which is hereby incorporated by reference in its entirety. The present application is related to (a) U.S. Ser. No. 15/088,943, entitled "METHOD AND SYSTEM FOR IMPLEMENTING TARGET MODEL CONFIGURATION METADATA FOR A LOG ANALYTICS SYSTEM", (b) U.S. Ser. No. 15/089,005, entitled "METHOD AND SYSTEM FOR PARAMETERIZING LOG FILE LOCATION ASSIGNMENTS FOR A LOG ANALYTICS SYSTEM", (c) U.S. Ser. No. 15/089,005, entitled "METHOD AND SYSTEM FOR IMPLEMENTING AN OPERATING SYSTEM HOOK IN A LOG ANALYTICS SYSTEM", (d) U.S. Ser. No. 15/089,129, entitled "METHOD AND SYSTEM FOR IMPLEMENTING COLLECTION-WISE PROCESSING IN A LOG ANALYTICS SYSTEM", (e) U.S. Ser. No. 15/089,226, entitled "METHOD AND SYSTEM FOR IMPLEMENTING MACHINE LEARNING CLASSIFICATIONS", all filed on even date herewith, and which are all hereby incorporated by reference in their entirety.

BACKGROUND AND SUMMARY

Many types of computing systems and applications generate vast amounts of data pertaining to or resulting from the operation of that computing system or application. These vast amounts of data are stored into collected locations, such as log files/records, which can then be reviewed at a later time period if there is a need to analyze the behavior or operation of the system or application.

Server administrators and application administrators can benefit by learning about and analyzing the contents of the system log records. However, it can be a very challenging task to collect and analyze these records. There are many reasons for these challenges.

One significant issue pertains to the fact that many modern organizations possess a very large number of computing systems, each having numerous applications that run on those computing systems. It can be very difficult in a large system to configure, collect, and analyze log records given the large number of disparate systems and applications that run on those computing devices. Furthermore, some of those applications may actually run on and across multiple computing systems, making the task of coordinating log configuration and collection even more problematic.

Conventional log analytics tools provide rudimentary abilities to collect and analyze log records. However, conventional systems cannot efficiently scale when posed with the problem of massive systems involving large numbers of computing systems having large numbers of applications running on those systems. This is because conventional systems often work on a per-host basis, where set-up and configuration activities need to be performed each and every time a new host is added or newly configured in the system, or even where new log collection/configuration activities need to be performed for existing hosts. This approach is highly inefficient given the extensive number of hosts that exist in modern systems. Furthermore, the conventional approaches, particularly on-premise solutions, also fail to adequately permit sharing of resources and analysis components. This causes significant and excessive amounts of redundant processing and resource usage.

Conventional log analytics tools are also very inefficient when it comes to the construction of log parsers used by the log analytics tools. A log parser is a tool that understands how to parse the entries within a log. Conventionally, a log parser must be manually constructed by a person that must be both knowledgeable about the exact format of the log file to be analyzed, as well as skilled in the specific programming infrastructure that would be used to implement the parser.

One problem with the conventional approach of manually constructing log parsers is that this process requires significant amounts of both time and resources from skilled technology personnel to build the parser. In addition, this approach also requires an inordinate amount of manual resources to maintain the parsers in the event of changes to the format of a log file. Moreover, this manual approach necessarily requires a priori knowledge of the log file formats.

Some embodiments of the invention solve these problems by providing an approach to automatically construct a log parser. Instead of requiring a person to manually create the contents of the log parser, the log contents themselves are used to construct the parser. Other additional objects, features, and advantages of the invention are described in the detailed description, figures, and claims.

BRIEF DESCRIPTION OF FIGURES

Various embodiments are described hereinafter with reference to the figures. It should be noted that the figures are not drawn to scale and that the elements of similar structures or functions are represented by like reference numerals throughout the figures. It should also be noted that the figures are only intended to facilitate the description of the embodiments. They are not intended as an exhaustive description of the invention or as a limitation on the scope of the invention.

FIG. 18 shows the process flow of an embodiment to address non-standard line formats.

FIG. 19 illustrates manipulation or categorization of line content.

FIG. 20 shows flowchart of an approach for efficiently identifying the correct delimiter elements within a set of log content according to some embodiments of the invention.

FIGS. 21-1 through 21-5 illustrate the delimiter identification process.

FIGS. 24-1 through 24-12 illustrate the key value extraction process.

FIGS. 25-1 through 25-2 and 26-1 through 26-2 illustrate example line configurations.

FIG. 27 shows an architecture of an example computing system with which the invention may be implemented.

DETAILED DESCRIPTION

As noted above, many types of computing systems and applications generate vast amounts of data pertaining or resulting from operation of that computing system or application. These vast amounts of data are then stored into collected locations, such as log files/records, which can be reviewed at a later time period if there is a need to analyze the behavior or operation of the system or application.

Some embodiments of the invention provide an approach to automatically construct a log parser. Instead of requiring a person to manually create the contents of the log parser, the log contents themselves are used to construct the parser. Other additional objects, features, and advantages of the invention are described in the detailed description, figures, and claims.

While the below description may describe the invention by way of illustration with respect to "log" data, the invention is not limited in its scope only to the analysis of log data, and indeed is applicable to wide range of data types. Therefore, the invention is not to be limited in its application only to log data unless specifically claimed as such. In addition, the following description may also interchangeably refer to the data being processed as "records" or "messages", without intent to limit the scope of the invention to any particular format for the data.

Log Analytics System

This portion of the disclosure provides a description of a method and system for implementing high volume log collection and analytics, which can be used in conjunction with log parsers constructed as described below.

Figure 1A:
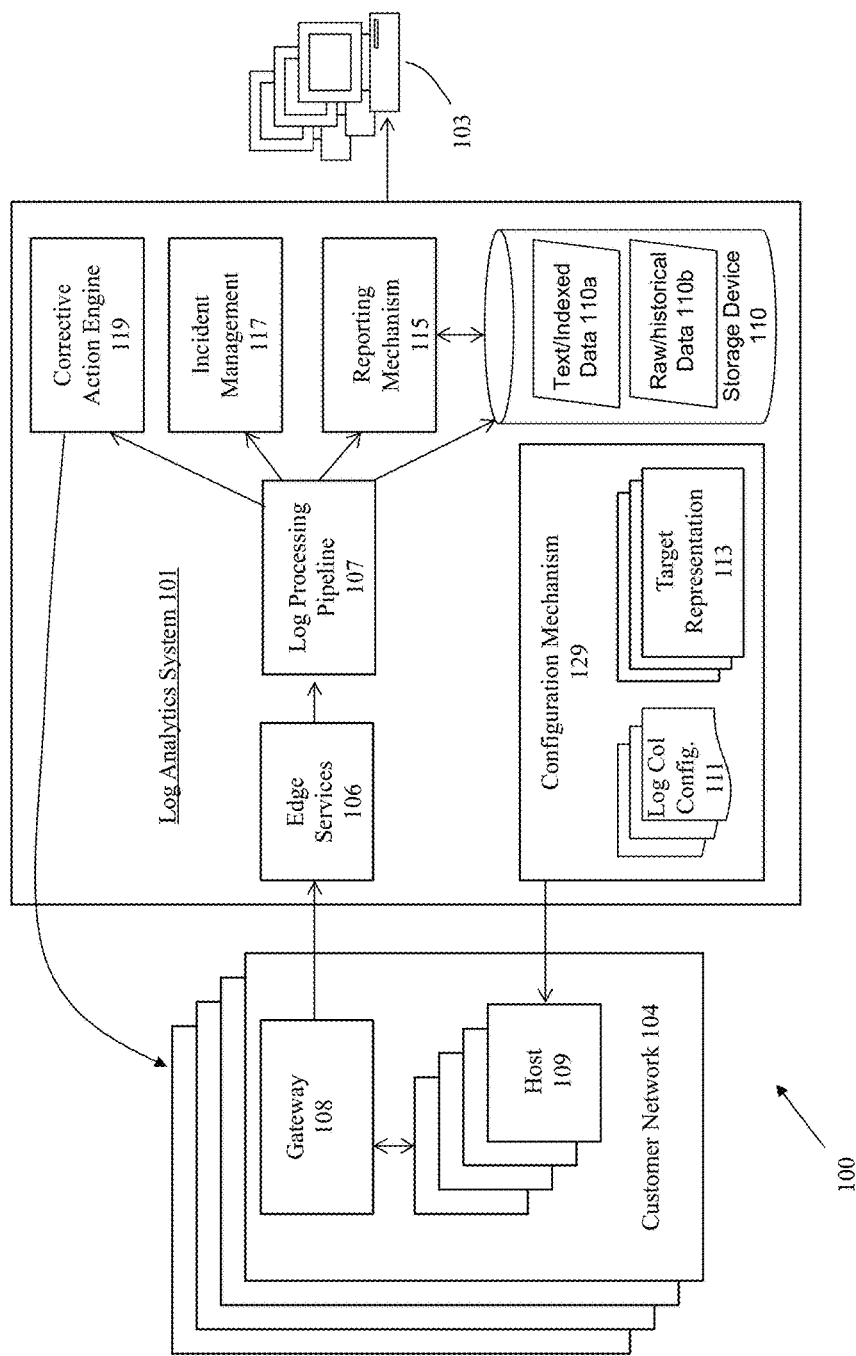
FIG. 1A illustrates an example system which may be employed in some embodiments of the invention.

FIG. 1A illustrates an example system 100 for configuring, collecting, and analyzing log data according to some embodiments of the invention. System 100 includes a log analytics system 101 that in some embodiments is embodied as a cloud-based and/or SaaS-based (software as a service) architecture. This means that log analytics system 101 is capable of servicing log analytics functionality as a service on a hosted platform, such that each customer that needs the service does not need to individually install and configure the service components on the customer's own network. The log analytics system 101 is capable of providing the log analytics service to multiple separate customers, and can be scaled to service any number of customers.

Each customer network 104 may include any number of hosts 109. The hosts 109 are the computing platforms within the customer network 104 that generate log data as one or more log files. The raw log data produced within hosts 109 may originate from any log-producing source. For example, the raw log data may originate from a database management system (DBMS), database application (DB App), middleware, operating system, hardware components, or any other log-producing application, component, or system. One or more gateways 108 are provided in each customer network to communicate with the log analytics system 101.

The system 100 may include one or more users at one or more user stations 103 that use the system 100 to operate and interact with the log analytics system 101. The user station 103 comprises any type of computing station that may be used to operate or interface with the log analytics system 101 in the system 100. Examples of such user stations include, for example, workstations, personal computers, mobile devices, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs. In some embodiments, the user stations 103 may be (although not required to be) located within the customer network 104.

The log analytics system 101 comprises functionality that is accessible to users at the user stations 101, e.g., where log analytics system 101 is implemented as a set of engines, mechanisms, and/or modules (whether hardware, software, or a mixture of hardware and software) to perform configuration, collection, and analysis of log data. A user interface (UI) mechanism generates the UI to display the classification and analysis results, and to allow the user to interact with the log analytics system.

Figure 1B:
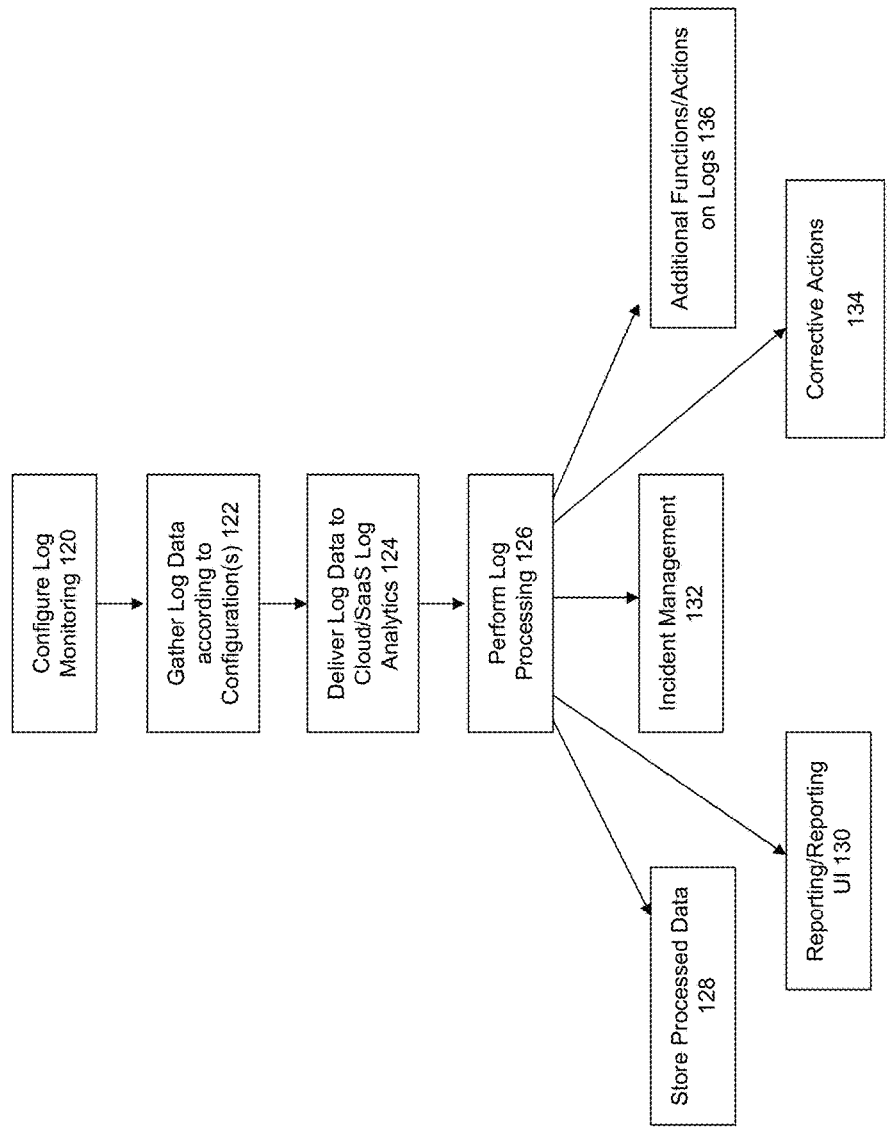
FIG. 1B illustrates a flowchart of a method which may be employed in some embodiments of the invention.

FIG. 1B shows a flowchart of an approach to use system 100 to configure, collect, and analyze log data. This discussion of FIG. 1B will refer to components illustrated for the system 100 in FIG. 1A.

At 120, log monitoring is configured within the system. This may occur, for example, by a user/customer to configure the type of log monitoring/data gathering desired by the user/customer. Within system 101, a configuration mechanism 129 comprising UI controls is operable by the user to select and configure log collection configuration 111 and target representations 113 for the log collection configuration.

As discussed in more detail below, the log collection configuration 111 comprise the set of information (e.g., log rules, log source information, and log type information) that identify what data to collect (e.g., which log files), the location of the data to collect (e.g., directory locations), how to access the data (e.g., the format of the log and/or specific fields within the log to acquire), and/or when to collect the data (e.g., on a periodic basis). The log collection configuration 111 may include out-of-the-box rules that are included by a service provider. The log collection configuration 111 may also include customer-defined/customer-customized rules.

The target representations 113 identify "targets", which are individual components within the customer environment that that contain and/or produce logs. These targets are associated with specific components/hosts in the customer environment. An example target may be a specific database application, which are associated with one or more logs one or more hosts.

The ability of the current embodiment to configure log collection/monitoring by associating targets with log rules and/or log sources provides unique advantages for the invention. This is because the user that configures log monitoring does not need to specifically understand exactly how the logs for a given application are located or distributed across the different hosts and components within the environment. Instead, the user only needs to select the specific target (e.g., application) for which monitoring is to be performed, and to then configure the specific parameters under which the log collection process is to be performed.

This solves the significant issue with conventional systems that require configuration of log monitoring on a per-host basis, where set-up and configuration activities need to be performed each and every time a new host is added or newly configured in the system, or even where new log collection/configuration activities need to be performed for existing hosts. Unlike conventional approaches, the log analytics user can be insulated from the specifics of the exact hosts/components that pertain to the logs for a given target. This information can be encapsulated in underlying metadata that is maintained by administrators of the system that understand the correspondence between the applications, hosts, and components in the system.

The next action at 122 is to capture the log data according to the user configurations. The association between the log rules 111 and the target representations is sent to the customer network 104 for processing. An agent of the log analytics system is present on each of the hosts 109 to collect data from the appropriate logs on the hosts 109.

In some embodiments, data masking may be performed upon the captured data. The masking is performed at collection time, which protects the customer data before it leaves the customer network. For example, various types of information in the collected log data (such as user names and other personal information) may be sensitive enough to be masked before it is sent to the server. Patterns are identified for such data, which can be removed and/or changed to proxy data before it is collected for the server. This allows the data to still be used for analysis purposes, while hiding the sensitive data. Some embodiments permanently remove the sensitive data (e.g., change all such data to "***" symbols), or changed to data that is mapped so that the original data can be recovered.

At 124, the collected log data is delivered from the customer network 104 to the log analytics system 101. The multiple hosts 109 in the customer network 104 provide the collected data to a smaller number of one or more gateways 108, which then sends the log data to edge services 106 at the log analytics system 101. The edge services 106 receives the collected data one or more customer networks and places the data into an inbound data store for further processing by a log processing pipeline 107.

At 126, the log processing pipeline 107 performs a series of data processing and analytical operations upon the collected log data, which is described in more detail below. At 128, the processed data is then stored into a data storage device 110. The computer readable storage device 110 comprises any combination of hardware and software that allows for ready access to the data that is located at the computer readable storage device 110. For example, the computer readable storage device 110 could be implemented as computer memory operatively managed by an operating system. The data in the computer readable storage device 110 could also be implemented as database objects, cloud objects, and/or files in a file system. In some embodiments, the processed data is stored within both a text/indexed data store 110*a* (e.g., as a SOLR cluster) and a raw/historical data store 110*b* (e.g., as a HDFS cluster).

Figure 2:
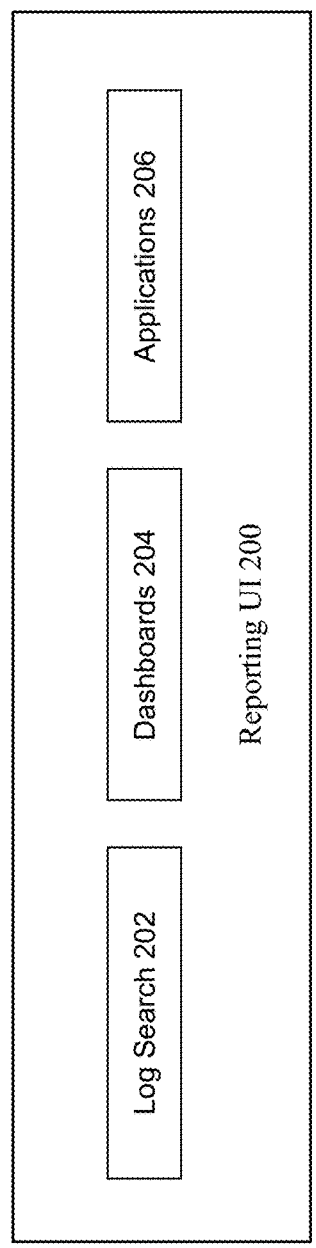
FIG. 2 illustrates a reporting UI.

At 130, reporting may be performed on the processed data using a reporting mechanism/UI 115. As illustrated in FIG. 2, the reporting UI 200 may include a log search facility 202, one or more dashboards 204, and/or any suitable applications 206 for analyzing/viewing the processed log data. Examples of such reporting components are described in more detail below.

At 132, incident management may be performed upon the processed data. One or more alert conditions can be configured within log analytics system such that upon the detection of the alert condition, an incident management mechanism 117 provides a notification to a designated set of users of the incident/alert.

At 134, a Corrective Action Engine 119 may perform any necessary actions to be taken within the customer network 104. For example, a log entry may be received that a database system is down. When such a log entry is identified, a possible automated corrective action is to attempt to bring the database system back up. The customer may create a corrective action script to address this situation. A trigger may be performed to run the script to perform the corrective action (e.g., the trigger causes an instruction to be sent to the agent on the customer network to run the script). In an alternative embodiment, the appropriate script for the situation is pushed down from the server to the customer network to be executed. In addition, at 136, any other additional functions and/or actions may be taken as appropriate based at last upon the processed data.

Figure 3A:
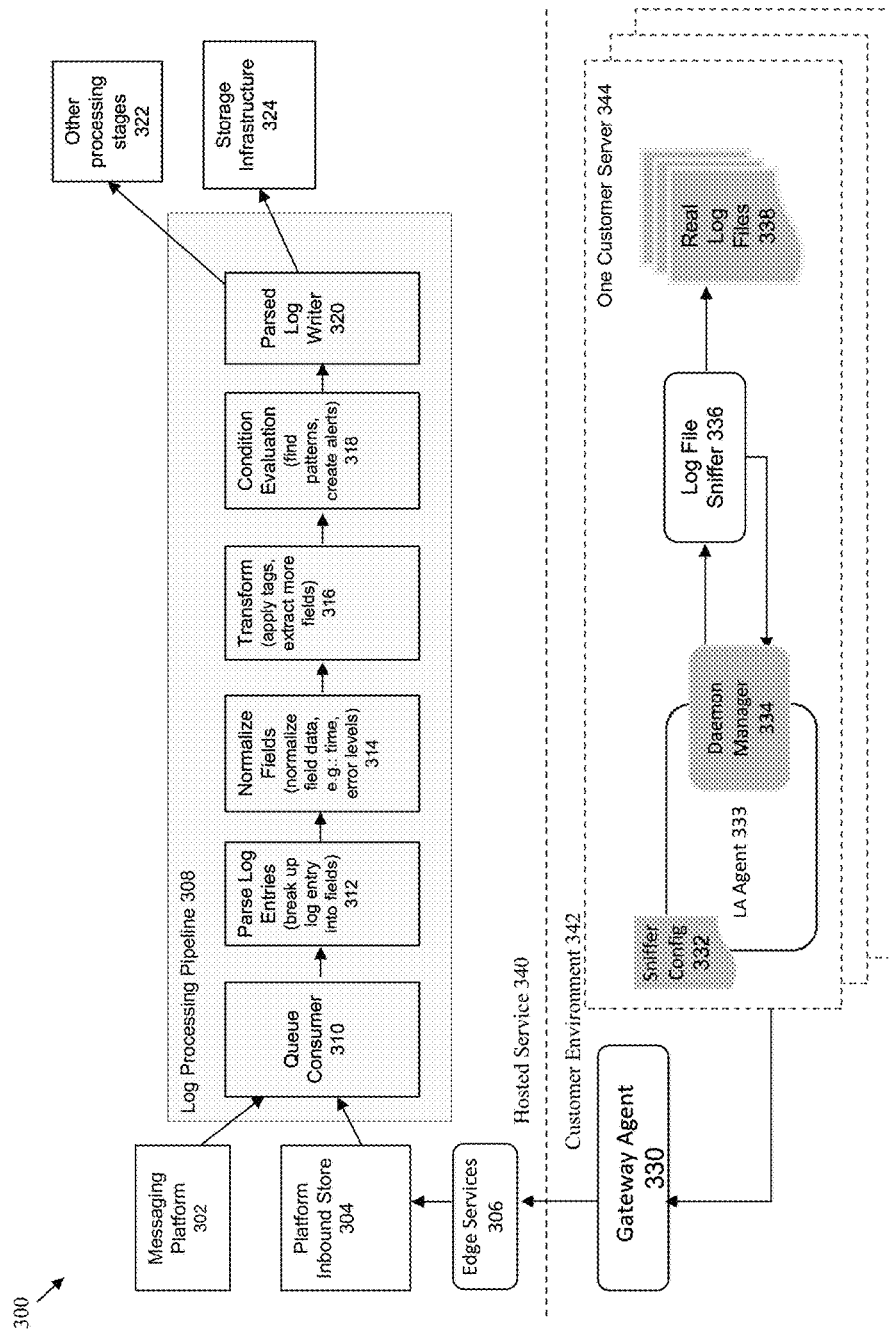
FIGS. 3A-C provide more detailed illustrations of the internal structure of the log analytics system and the components within the customer environment that interact with the log analytics system.

FIG. 3A provides a more detailed illustration of the internal structure of the log analytics system at a host environment 340 and the components within the customer environment 342 that interact with the log analytics system. This architecture 300 is configured to provide a flow for log monitoring that is able to handle large amounts of log data ingest.

In the customer environment 342 within a single customer host/server 344, the LA (log analytics) agent 333 takes the log monitoring configuration data 332 (e.g., sniffer configuration or target-side configuration materials), and calls a log file 336 sniffer (also referred to herein as the "log collector") to gather log data from one or more log files 338. A daemon manager 334 can be employed to interface with the log file sniffer 336. The log file sniffer 336 reads from one or more log files 338 on the host machine 344. The daemon manager 334 takes the log content and packages it up so that it can be handed back to the LA agent 333. It is noted that the system may include any number of different kinds of sniffers, and a log sniffer 336 is merely an example of a single type of sniffer that can be used in the system. Other types of sniffers may therefore be employed within various embodiments of the invention, e.g., sniffers to monitor registries, databases, windows event logs, etc. In addition, the log sniffer in some embodiments is configured to handle collective/compressed files, e.g., a Zip file.

The LA agent 333 sends the gathered log data to the gateway agent 330. The gateway agent 330 packages up the log data that is collected from multiple customer hosts/servers, essentially acting as an aggregator to aggregate the log content from multiple hosts. The packaged content is then sent from the gateway agent 330 to the edge services 306. The edge services 306 receive a large amount of data from multiple gateway agents 330 from any number of different customer environments 342.

Given the potentially large volume of data that may be received at the edge services 306, the data is immediately stored into an inbound data storage device 304 (the "platform inbound store"). This acts as a queue for the log processing pipeline 308. A data structure is provided to manage the items to be processed within the inbound data store. In some embodiments, a messaging platform 302 (e.g., implemented using the Kafka product) can be used to track the to-be-processed items within the queue. Within the log processing pipeline 308, a queue consumer 310 identifies the next item within the queue to be processed, which is then retrieved from the platform inbound store. The queue consumer 310 comprises any entity that is capable of processing work within the system off the queue, such as a process, thread, node, or task.

The retrieved log data undergoes a "parse" stage 312, where the log entries are parsed and broken up into specific fields. As discussed in more detail below, the "log type" configured for the log specifies how to break up the log entry into the desired fields.

In the "normalize" stage 314, the identified fields are normalized. For example, a "time" field may be represented in any number of different ways in different logs. This time field can be normalized into a single recognizable format (e.g., UTC format). As another example, the word "error" may be represented in different ways on different systems (e.g., all upper case "ERROR", all lower case "error", first letter capitalized "Error", or abbreviation "err"). This situation may require the different word forms/types to be normalized into a single format (e.g., all lower case unabbreviated term "error").

The "transform" stage 316 can be used to synthesize new content from the log data. As an example and which will be discussed in more detail below, "tags" can be added to the log data to provide additional information about the log entries. As another example, field extraction can be performed to extract additional fields from the existing log entry fields.

A "condition evaluation" stage 318 is used to evaluate for specified conditions upon the log data. This stage can be performed to identify patterns within the log data, and to create/identify alerts conditions within the logs. Any type of notifications may be performed at this stage, including for example, emails/text messages/call sent to administrators/customers or alert to another system or mechanism.

A log writer 320 then writes the processed log data to one or more data stores 324. In some embodiments, the processed data is stored within both a text/indexed data store (e.g., as a SOLR cluster) and a raw and/or historical data store (e.g., as a HDFS cluster). The log writer can also send the log data to another processing stage 322 and/or downstream processing engine.

Figure 3B:
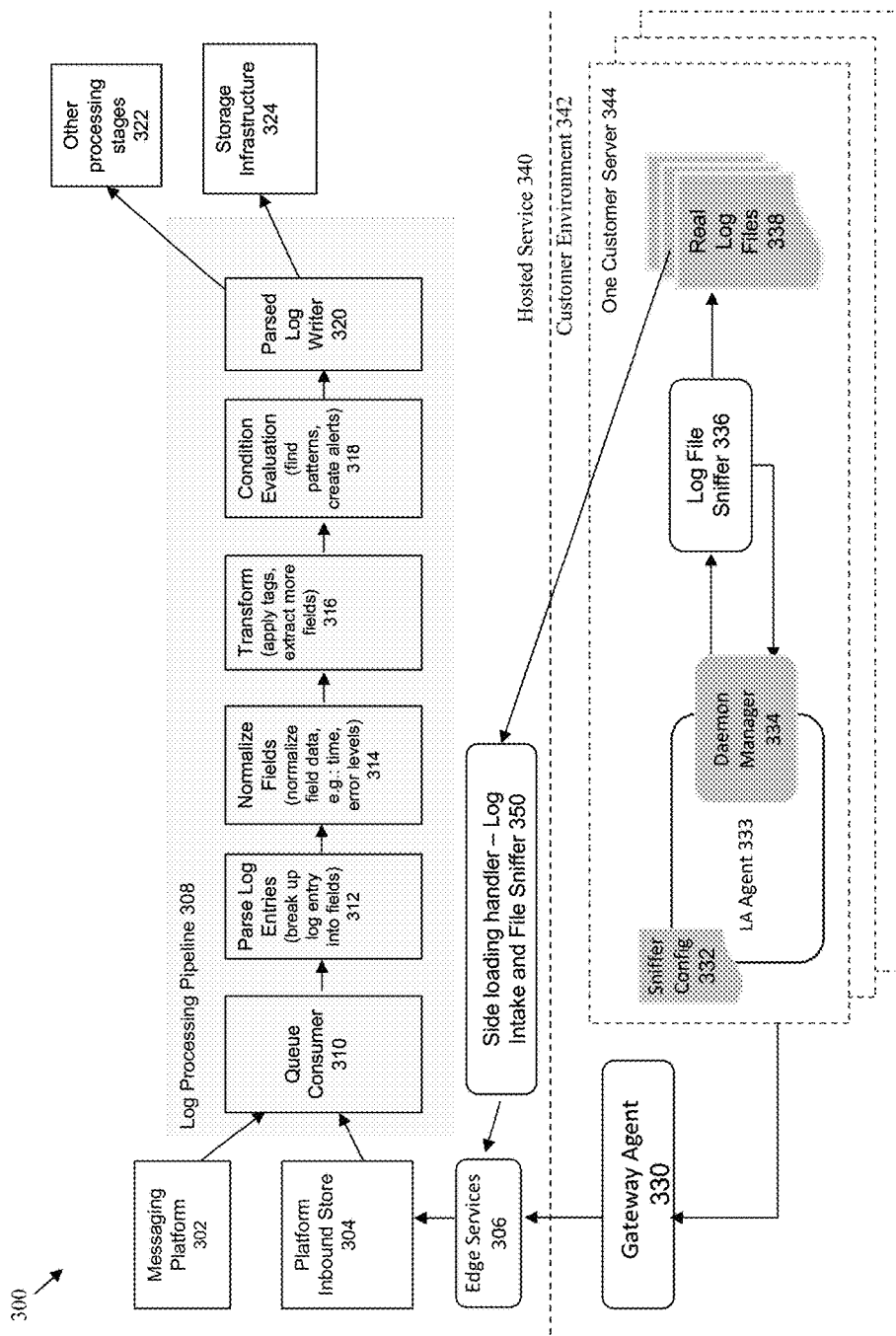
Figure 3C:
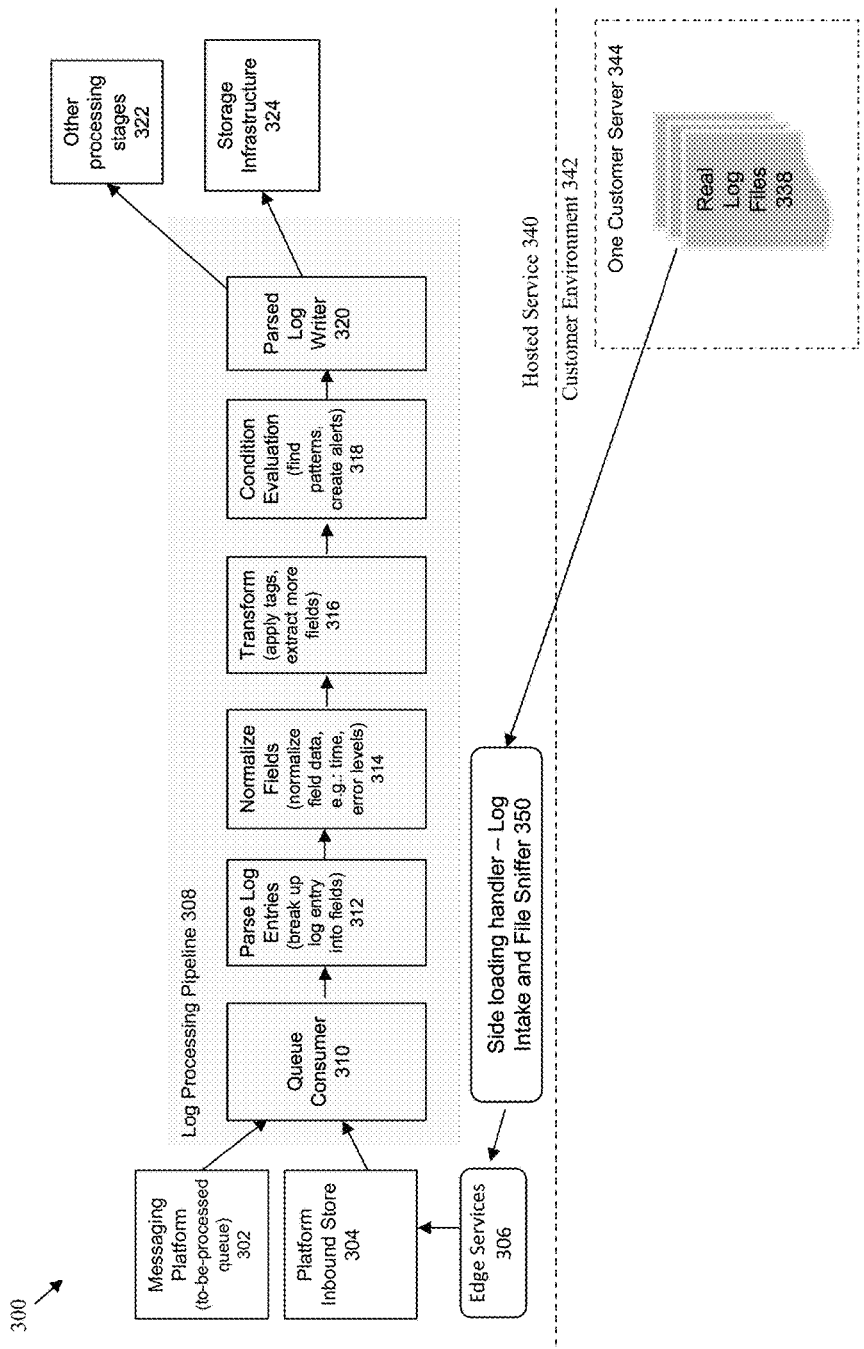

As shown in FIG. 3B, some embodiments provide a side loading mechanism 350 to collect log data without to proceed through an agent 333 on the client side. In this approach, the user logs into the server to select one or more files on a local system. The system will load that file at the server, and will sniff through that file (e.g., by having the user provide the log type, attempting likely log types, rolling through different log types, or by making an educated "guess" of the log type). The sniffing results are then passed to the Edge Services and process as previously described. In the embodiment, of FIG. 3C, only the side loading mechanism 350 exists to gather the log files—where the agent/sniffer entities are either not installed and/or not needed on the client server 344.

Figure 4A:
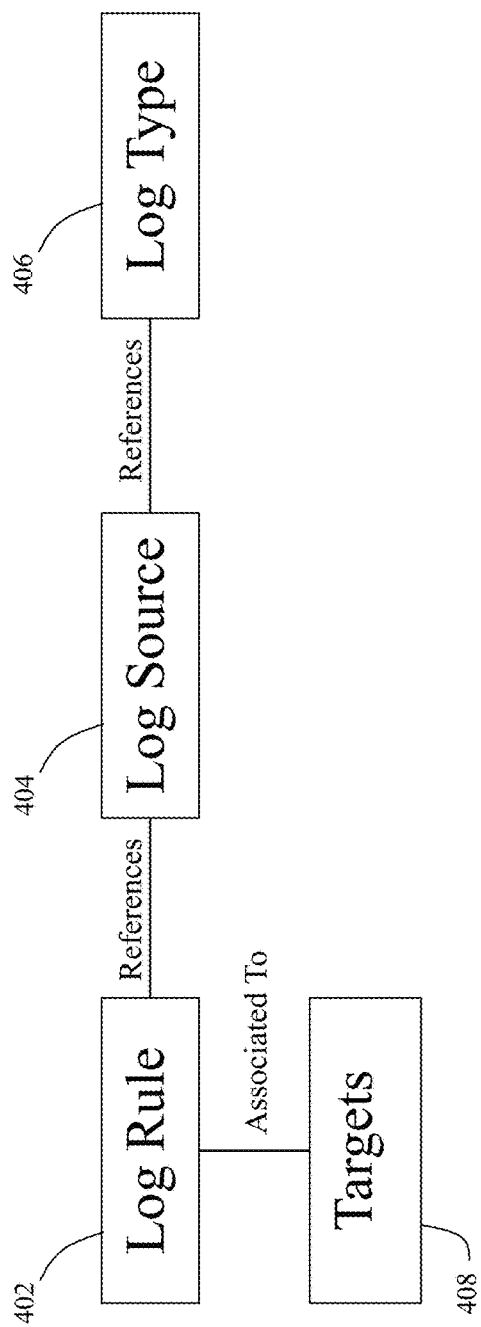
FIGS. 4A-C illustrate approaches to implement the log collection configuration.
Figure 4B:
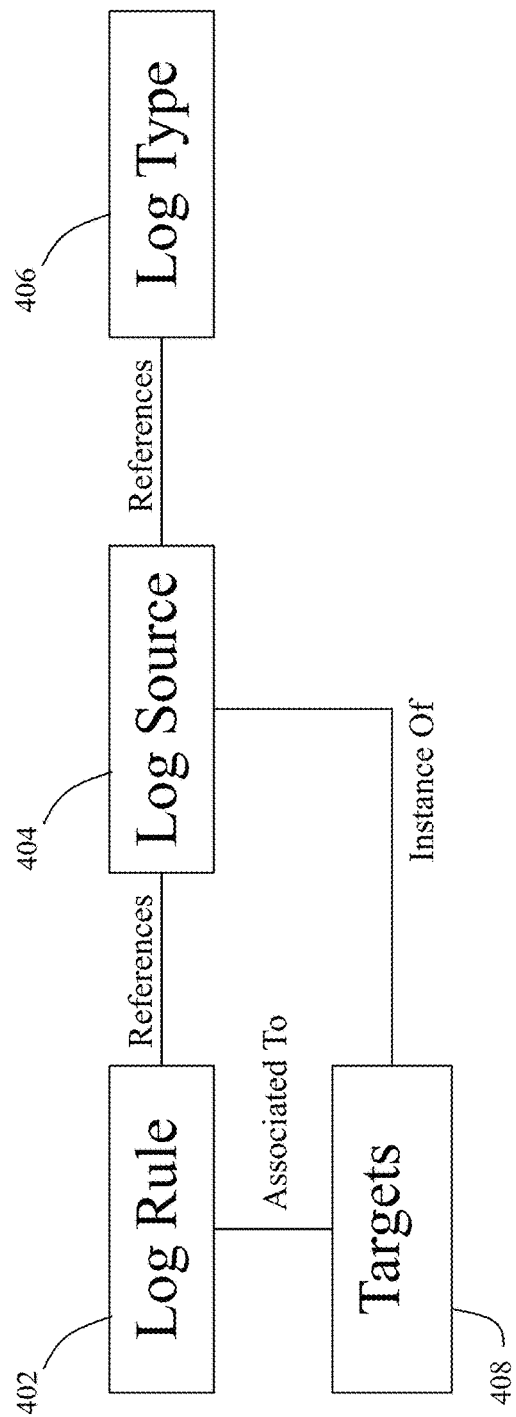

FIGS. 4A-B illustrate approaches to implement the log collection configuration. This approach allow for very large scale configuration of how to monitor log files having one or more log entries. In some embodiments, a log entry corresponds to a single logical row from a log file. In the actual log file, a single entry could take multiple lines due to carriage returns being part of the log entry content. This entire content is considered a single "entry". Each entry starts with "####<date" and could occupy a single physical line in the file or multiple lines separate by carriage returns.

In this model the "Log Type" 406 defines how the system reads the log file, as well as how to decompose the log file into its parts. In some embodiments, a log file contains several base fields. The base fields that exist may vary for different types of logs. A "base parser" can be used to breaks a log entry into the specified fields. The base parser may also perform transformations. For instance, a Date field can be converted to a normalized format and time adjusted to be in UTC so data from many locations can be mixed together.

The "Log Source" 404 defines where log files are located and how to read them. In some embodiments, the log source is a named definition that contains a list of log files described using patterns, along with the parser that is needed to parse that file. For instance, one source could be "SSH Log files". This source may list each log file related to SSH separately, or could describe the log files using a wildcard (e.g., "/var/log/ssh*"). For each pattern, a base parser can be chosen (e.g., by a user) to parse the base fields from the file. This approach can be used to ensure that for a single pattern that all files conform to the same base parse structure. For one source, one can choose from among multiple log types, and give a priority to those possible types. For example, types A, B, and C can be identified, where the analysis works through each of these in order to determine whether the source matches one of these identified types. Therefore, for each pattern, the user can choose multiple base parsers. In some embodiments, the same source may match against and be analyzed using multiple types.

The "Log Rule" 402 defines a set of sources along with conditions and actions to be triggered during continuous monitoring. The "Targets" 408 identify individual components in an IT environment that contain logs. Associating a rule to a target starts the monitoring process in some embodiments.

Figure 4C:
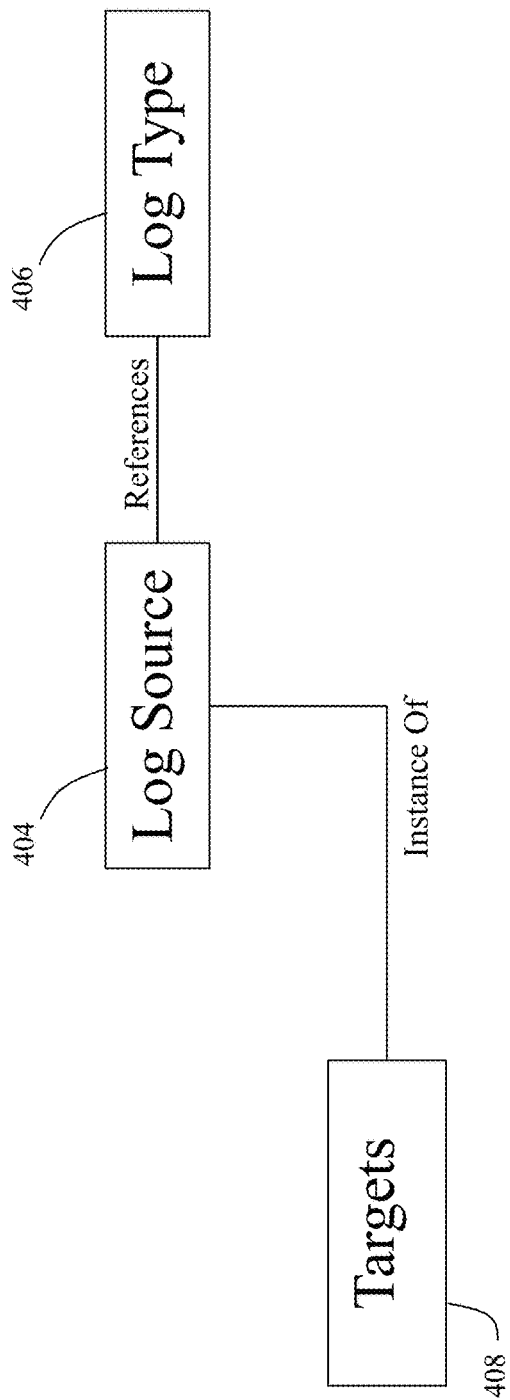

In the embodiment of FIG. 4A, one or more log rules are associated with one or more targets. In the alternative embodiment of FIG. 4B, one or more log sources can be associated with one or more targets to create an instance of a target. In the embodiment of FIG. 4C, log rules are not even provided as an approach to create the associations—where only log source to target associations are provided to create target instances. Each of these approaches are described in more detail below.

Figure 5:
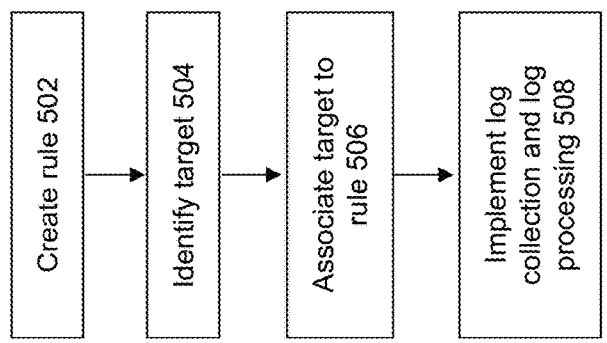
FIG. 5 shows a flowchart of an approach to implement a log collection configuration by associating a log rule with a target.

FIG. 5 shows a flowchart of an approach to implement a log collection configuration by associating a log rule with a target. At 502, one or more log rules are created. The rules are processed by a rules engine within the log processing system to implement rule-based handling of a given target. Therefore, the rule will include specific logic for handling a given target that it is associated with.

In some embodiments, the rule can be used to specific a target type, which identifies the type of the target that the rule is intended to address. A rule can be specified for a single target type or multiple target types. For example, when monitoring a log file for a database instance, the target type can be set to Database Instance so that reporting of activities in the log goes against the proper target type; In some embodiments, even though the rule may be configured for a "File" as a log type, the target type can still be any managed target type, such as a database.

The rule may specify a source type, which identifies the type of log file that the rule is intended to address. For example the rule may specify that the log file types will be: (i) File: OS level log file; (ii) Database Table: a table that stores log content in a database; (iii) Windows Event Log: read events from windows event as log content.

A target property filter may be specified in the rule to filter for targets to specify conditions under which the rule is applicable, such as for example, a particular operating system (OS), target version, and/or target platform. For instance, the user could create a rule that is only for a given OS on a given platform (e.g., only for Linux OEL5 on X86_64 hardware).

When creating rules in some embodiments, the rule the may also include: (a) the name of the rule; (b) a severity level indicating how important the outcome of this rule is if this rule leads to an event being generated; (c) a description of the rule; and/or (d) a textual rationale of why this monitoring is occurring.

In some embodiments, one or more conditions can be established for which the rule will "trigger". Multiple conditions may be specified, where each condition can be combined with others using a Boolean operator. For example, a set of conditions that is ORed with others means that if any of these conditions match an entry in a log file under evaluation, then that entry triggers this rule. When the conditions are ANDed together, all clauses of the condition must be met for the condition to trigger an entry in a log file. The specified actions will then be taken as a response to this entry that is matched. The following is an example condition clause that includes a regular expression: "MESSAGE contains "START: telnet pid[0-9]* from=[.]*"", where this condition triggers the rule if the message matches the regular expression.

The "operator" in the condition is how the comparison is to be performed. The following are some example operators that may be employed in some embodiments of the invention: (a)<, >, >=, <=: compare a value to be larger or smaller (or equal) than some set value; (b) Contains: pattern match with ability to include regular expression clauses, where an implicit wildcard may be placed at the beginning and end unless the user uses the ^ and $ regular expression symbols to specify the beginning of a string or end of the string; (c) In: list of possible values; (d) Is: exact string match (no regular expression capability); (e) Is Not; (f) Does Not Contain; (g) Not In: List of values to not match.

Actions may be specified to identify what to do when a match is found on the selected sources for a given condition. For example, one possible action is to capture a complete log entry as an observation when matching conditions of the rule. This approach lets the system/user, when monitoring a log from any source and when a single entry is seen that matches the conditions of this rule, to save that complete entry and store it in the repository as an observation. Observations are stored for later viewing through the log observations UI or other reporting features. Another possible action is to create an event entry for each matching condition. When a log entry is seen as matching the specified conditions, this approaches raise an event. In some embodiments, the event will be created directly at the agent. The source definition will define any special fields that may be needed for capturing events if there are any. An additional option for this action is to have repeat log entries bundled at the agent and only report the event at most only once for the time range the user specified. The matching conditions can be used to help identify the existence of a repeat entry. Another example action is to create a metric for the rule to capture each occurrence of a matching condition. In this approach, a new metric is created for this rule using a metric subsystem. Thereafter, when there is a log entry that matches the rule's conditions, some number of the fields are captured as metric data and uploaded as part of this metric. The fields can be selected to include, for example, information such as "key" fields like target, time, source, etc.

At 504, one or more targets are identified in the system. The targets are individual components within the customer environment that that contain logs. These targets are associated with specific components/hosts in the customer environment. Example targets include hosts, database application, middleware applications, and/or other software applications, which are associated with one or more logs one or more hosts. More details regarding an approach to specify targets are described below.

At 506, an association is made between a target and a rule. Metadata may be maintained in the system to track the associations between a given target and a given rule. A user interface may be provided that allows a user to see what targets a selected rule is associated with and/or to add more associations, where the associations are the way the rule becomes active by associating the rule against a real target.

Thereafter, at 508, log collection and processing are performed based at least in part upon the association between the rule and the target. As discussed in more detail below, target-based configuration may involve various types of configuration data that is created at both the server-side and the target-side to implement the log collection as well as log processing.

The ability of the current embodiment to configure log collection/monitoring by associating targets with log rules provides unique advantages. This is because the user that configures log monitoring does not need to specifically understand exactly how the logs for a given application are located or distributed across the different hosts and components within the environment. Instead, the user only needs to select the specific target (e.g., application) for which monitoring is to be performed and to then configure the rules under which the log collection process is to be performed.

This solves the significant issue with conventional systems that require configuration of log monitoring on a per-host basis, where set-up and configuration activities need to be performed each and every time a new host is added or newly configured in the system, or even where new log collection/configuration activities need to be performed for existing hosts. Unlike conventional approaches, the log analytics user can be insulated from the specifics of the exact hosts/components that pertain to the logs for a given target. This information can be encapsulated in underlying metadata that is maintained by administrators of the system that understand the correspondence between the applications, hosts, and components in the system.

Figure 6:
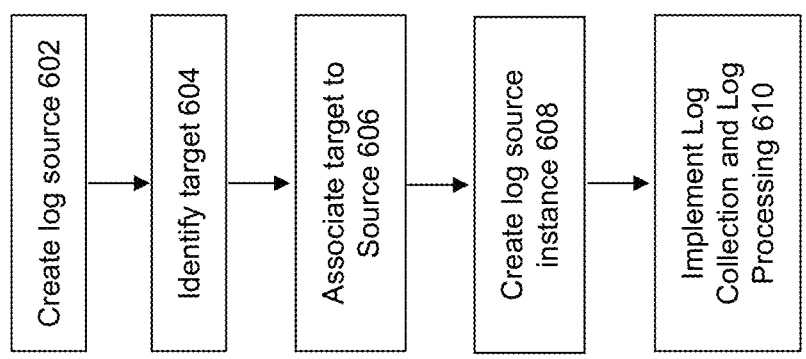
FIG. 6 shows a flowchart of an approach to implement a log collection configuration by associating a log source with a target.

Instead of, or in addition to the rules, log processing can also be configured by associating a log source to a target. FIG. 6 shows a flowchart of an approach to implement a log collection configuration by associating a log source with a target. At 602, one or more log sources are created. The log source defines where log files are located and how to read them. The log source may define a source type that indicates how the source content is gathered. The following are example source types: (a) File—identifies a readable file from the OS level that can be accessed using regular OS-level file operations; (b) Database Table—a table that stores log entries (e.g.: database audit table); (c) Windows Event System—an API that provides access to event records. One or more source names may be defined for the log source. In addition, the log source may be associated with a description of the source. It is noted that log sources can also be used when creating log monitoring rules (as described above).

The log source may also be associated with a file pattern and/or pathname expression. For instance, "/var/log/messages*" is an example of a file pattern (that may actually pertain to a number of multiple files). Regarding file patterns, one reason for their use in the present log analytics system is because it is possible that the exact location of the logs to monitor varies. Some of the time, a system will expect logs to be in a particular place, e.g., in a specific directory. When the system is dealing with a large number of streaming logs, it may not be clear which directory the logs are expected to be in. This prevents a system that relies upon static log file locations to operate correctly. Therefore, the file pattern is useful to address these possibly varying log locations.

In some embodiments, a log source is created by specifying a source name and description for the log source. The definition of the log source may comprise included file name patterns and excluded file name patterns. The file name patterns are patterns that correspond to files (or directories) to include for the log source. The excluded file name patterns correspond to patterns for files (or directories) to explicitly exclude from the log source, e.g., which is useful in the situation where the included file name pattern identifies a directory having numerous files, and some of those files (such as dummy files or non-log files) are excluded using the excluded file name pattern. For each pattern, the system captures the pattern string, the description, and the base parser (log type) that will be used to parse the file. The base parser may define the basic structure of the file, e.g., how to parse the data, hostname, and message from the file.

The definition of the log source may also specify whether the source contains secure log content. This is available so that a source creator can specify a special role that users must have to view any log data may be captured. This log data may include security-related content that not any target owner can view.

As noted above, the log rules may reference log sources, and vice versa. In some embodiments, the system metadata tracks these associations, so that a count is maintained of rules that are currently using sources. This helps with understanding the impact if a source and/or rule is changed or deleted.

At 604, one or more targets are identified. As noted above, targets are components within the environment that that contain, correspond, and/or create logs or other data to be processed, where the targets are associated with specific components/hosts in the customer environment. Example targets include hosts, database application, middleware applications, and/or other software applications, which are associated with one or more logs one or more hosts.

At 606, an association is made between a target and a source. Metadata may be maintained in the system to track the associations between a given target and a given source. A user interface may be provided that allows a user to see what targets a selected source is associated with and/or to add more associations.

The association of the target to the source creates, at 608, a specific instance of the log source. For example, consider a log source that generically specifies that a given file is located at a given directory location (e.g., c:/log_directory/log_file). It may be the case that any number of servers (Server A, Server B, Server C, Server D) within a customer environment may have a copy of that file (log_file) in that directory (c:/log directory). However, by associating a specific target (e.g., Server A) to the log source, this creates an instance of the log source so that the new instance is specific regarding the log file in the specified directory on a specific target (e.g., to begin monitoring c:/log_directory/log_file specifically on Server A).

Thereafter, at 610, log collection and processing are performed based at least in part upon the association between the rule and the log source. As discussed in more detail below, target-based configuration may involve various types of configuration data that is created at both the server-side and the target-side to implement the log collection and processing activities.

There are numerous benefits when using this type of model for configuring log collection. One benefit is that the Log Types, Sources, Rules can be easily reused as necessary. In addition, this approach avoids having to make numerous duplicate configurations by enabling sharing at multiple levels. Moreover, users can create custom rules that use sources and log types defined by other people or ship with the product. This approach also easily builds on top of shared knowledge.

Associating rules/sources to targets provides knowledge that identifies where to physically enable log collections via the agents. This means that users do not need to know anything about where the targets are located. In addition, bulk association of rules/sources to targets can be facilitated. In some embodiments, rules/sources can be automatically associated to all targets based on the configuration. As noted above, out-of-the-box configurations can be provided by the service provider. In addition, users can create their own configurations, including extending the provided out-of-the-box configurations. This permits the users to customize without building their own content.

Figure 7:
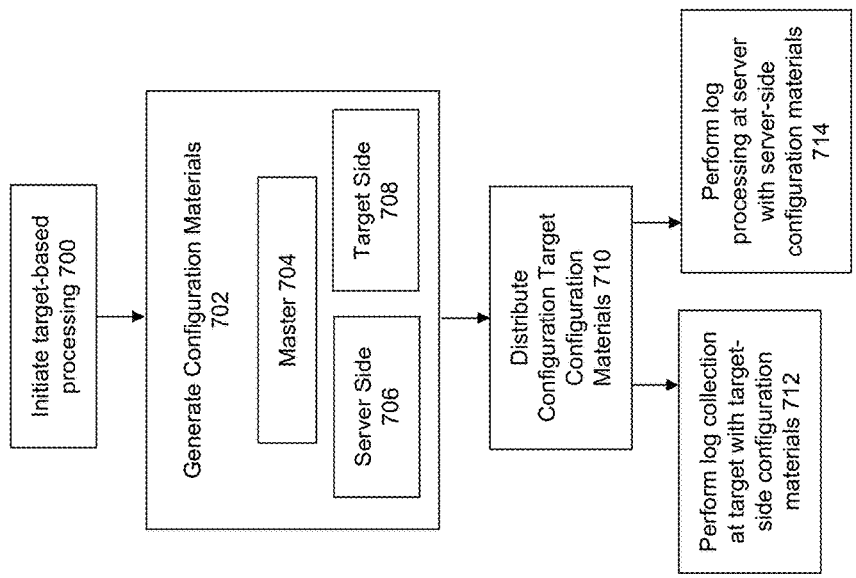
FIG. 7 shows a flowchart of an approach to implement target-based configuration for log monitoring.

FIG. 7 shows a flowchart of an approach to implement target-based configuration for log monitoring. This process generates the creation, deployment, and/or updating of configuration materials for log monitoring. In some embodiments, configuration materials are embodied as configuration files that are used by the log monitoring system to manage and implement the log monitoring process.

At 700, target-based processing is initiated. Example approaches for initiating target-based processing includes, for example, installation of a log analytics agent onto a specific log collection location. The target-based processing pertains to associations made between one or more targets and one or more log sources and/or rules.

At 702, configuration materials are generated for the target-based processing. In some embodiment, the target-based configuration file is implemented as configuration XML, files, although other formats may also be used to implement the configuration materials. The target-based configuration file may be created at a master site (e.g., to create a master version 704), with specific versions then passed to both the server side and the target side.

The target-side materials 708 may comprise those portions of the configuration details that are pertinent for log collection efforts. This includes, for example, information about log source details and target details. The server-side materials 706 may comprise portions of the configuration details that are pertinent to the server-side log processing. This includes, for example, information about parser details.

In some embodiments, a database at the server maintains a master version and a target version of the configuration materials. As noted above, the target version includes configuration details that are pertinent to log collection efforts, and is passed to the customer environment to be used by the agent in the customer environment to collect the appropriate log data from the customer environment. The master version includes the full set of configuration details needed at the server, and becomes the "server side" materials when selected and used for processing at the server. This may occur, for example, when the log data collected at the targets are passed to the server, where the transmission of the log data includes an identifier that uniquely identifies the target-side materials used to collect the log data (e.g., the configuration version or "CV" number 903 shown in the example targets-side materials of FIG. 9). When this data is received at the server, the identifier is used to determine the corresponding master version of the materials that have the same identifier number (e.g., as shown in field 1003 in the example server-side materials of FIG. 10). That master version is then used as the server-side materials to process the received log data. Therefore, in this embodiment, the master version 704 and the server-side materials 706 are identical, but having different labels depending upon whether the material is currently in-use to process the log data. In an alternative embodiment, the master version may differ from a server version, e.g., where the materials are used on multiple servers with different configuration details.

At 710, the configuration materials are then distributed to the appropriate locations within the log processing system. In some embodiments, the target-side materials 708 are distributed to the customer system as the sniffer configuration files 332 shown in FIG. 3A. With regards to the server-side materials 706, the materials are "distributed" as the log configuration files 111 shown in FIG. 1A, where the distribution does not actually require the materials to be distributed across a network, but merely indicates that the materials are obtained from another component within the server (e.g., on an as-needed basis).

Thereafter, at 712, log collection processing is performed at the target using the target-side configuration materials. In addition, at 714, server-side log processing is performed using the server-side configuration materials.

Figure 8:
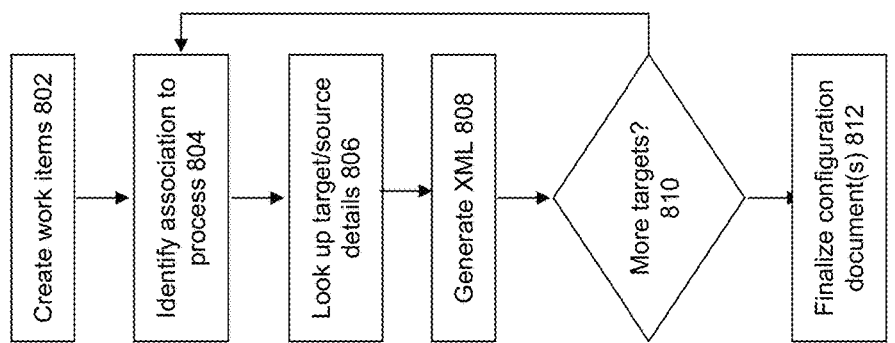
FIG. 8 shows a more detailed flowchart of an approach to implement target-based configuration for log monitoring according to some embodiments of the invention.

FIG. 8 shows a more detailed flowchart of an approach to implement target-based configuration for log monitoring according to some embodiments of the invention. At 802, one or more work items for processing target associations are created in the system. For example, this type of work may be created upon installation of the log analytics agent onto a target, where recognition of this installation causes a work item to be created for the target-based configuration materials. A list of target types are identified that have at least one auto-association rule (e.g., from a database of the associations). A list of targets is generated for which there is a need to be associated with auto-enabled rules. These steps are equivalent to putting association tasks into a queue (e.g., database table) by a producer entity/process, which are then processed by one or more consumer entities/processes.

One or more consumer/worker entities may wake up periodically to process the work items. For example, a worker entity (e.g., thread or process) wakes up (e.g., every 10 seconds) to check whether there are any pending association tasks. The set of one or more workers will iterate through the tasks to process the work in the queue.

At 804, one of the workers identifies an association task to process. At 806, the association request is processed by accessing information collected for the rules, sources, parsers, fields, and/or target. This action identifies what target is being addressed, finds that target, and then looks up details of the log source and/or log rule that has been associated with the target.

At 808, the worker then generate configuration content for the specific association task that it is handling. In some embodiments, the configuration content is embodied as XML content. This action creates both the target-side details and the server-side details for the configuration materials. For the server-side, this action will create configuration data for the server to process collected log data. For example, parser details in XML, format are created for the server-side materials for the log data expected to be received. For the target-side, this action will create configuration data for log collection from the target. For example, as discussed below, variable pathnames (e.g., having variables instead of absolute pathnames) may be specified for a given log source to identify a directory that contains log files to monitor. These varying pathnames may be replaced with actual pathnames and inserted into the target-side materials at step 808.

A determination is made at 810 whether there are any additional association tasks to process. If there are additional tasks on the queue, then the process returns back to 804 to select another task to process. If not, then at 812, the configuration materials are finalized.

It is noted that the same configuration/XML file can be used to address multiple associations. For example, if multiple targets are on the same host, then a single configuration file may be generated for all of the targets on the host. In this case, step 808 described above appends the XML, content to the same XML, file for multiple iterations through the processing loop.

Updates may occur in a similar manner. When a change occurs that requires updating of the materials, then one or more new association tasks may be placed onto a queue and addressed as described above. Furthermore, de-associations may also occur, e.g., where the log analytics agent is de-installed. In this situation, the configuration files may be deleted. When a target is deleted, a message may be broadcast to notify all listeners about this event by a target model service, which may be consumed to delete the corresponding associations and to update the XML content.

Figure 9:
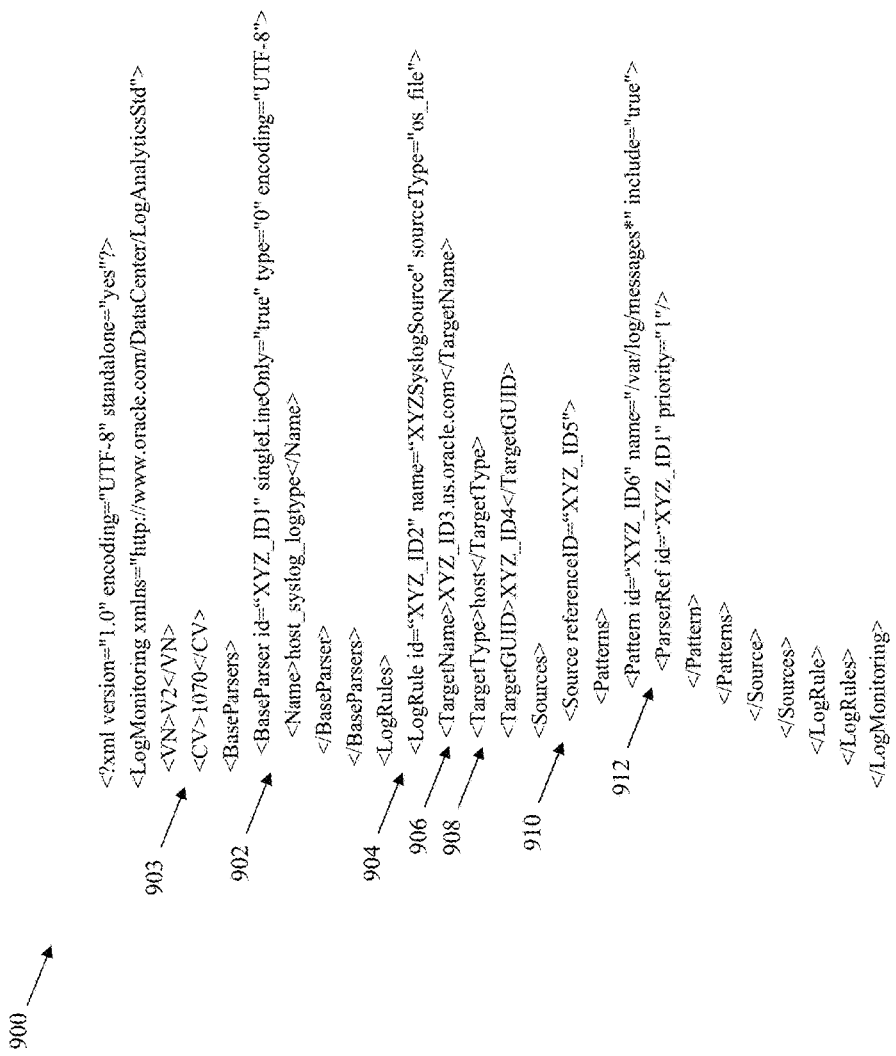
FIG. 9 illustrates example XML configuration content according to some embodiments of the invention.

FIG. 9 illustrates example XML configuration content 900 according to some embodiments of the invention. This is an example of target-side content that may be placed on the host that holds the target. This XML configuration content 900 defines a rule to collect Linux system message logs with file pattern "/var/log/messages*" on host XYZ.us.oracle.com. Portion 902 identifies a base parser for the association being addressed. Portion 903 provides an identifier for the version number ("configuration version" or "CV") of the content 900, which is used to match up against the corresponding server-side materials having the same version number. Portion 904 identifies the ID of a log rule. Portion 906 identifies a specific target. Portion 908 identifies a target type. Portion 910 identifies a source type. Portion 912 identifies a parser ID for the source. The logs will be parsed based on some defined parser. Such configuration files reside on sniffers and the log collection processes collect logs based on the defined log sources.

Figures 1, 17:
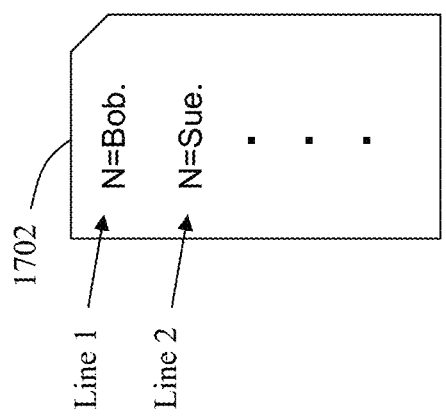
FIGS. 17-1 through 17-21 provide an illustration of the process to construct a log parser.
Figures 2, 17:
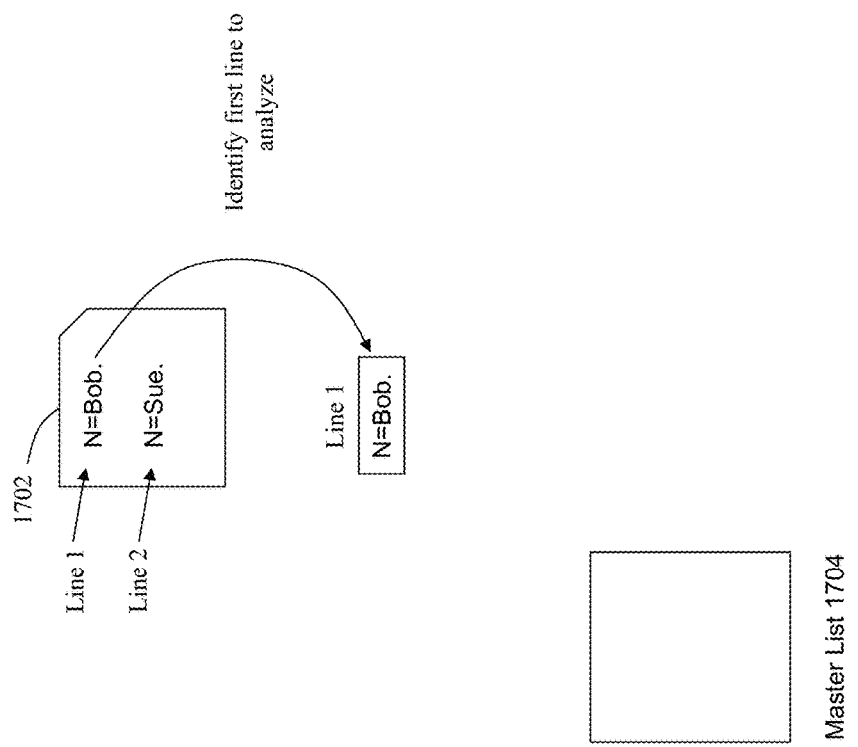
Figures 3, 17:
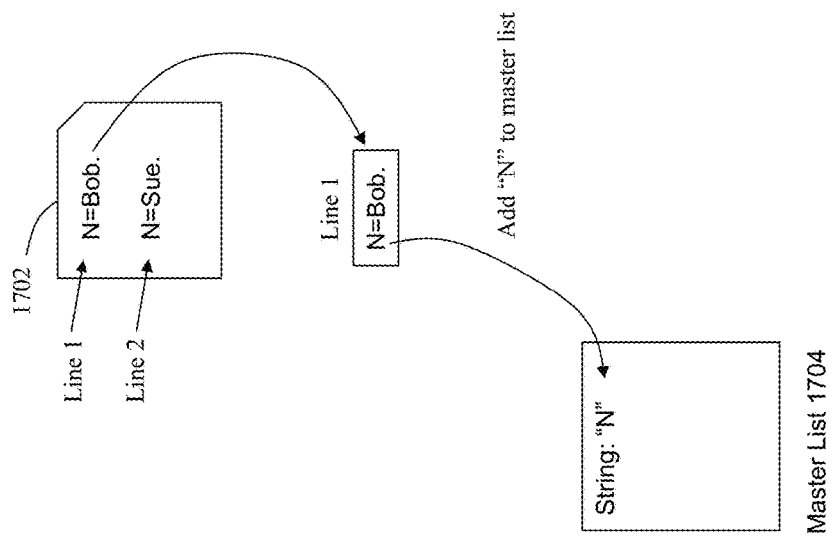
Figures 4, 17:
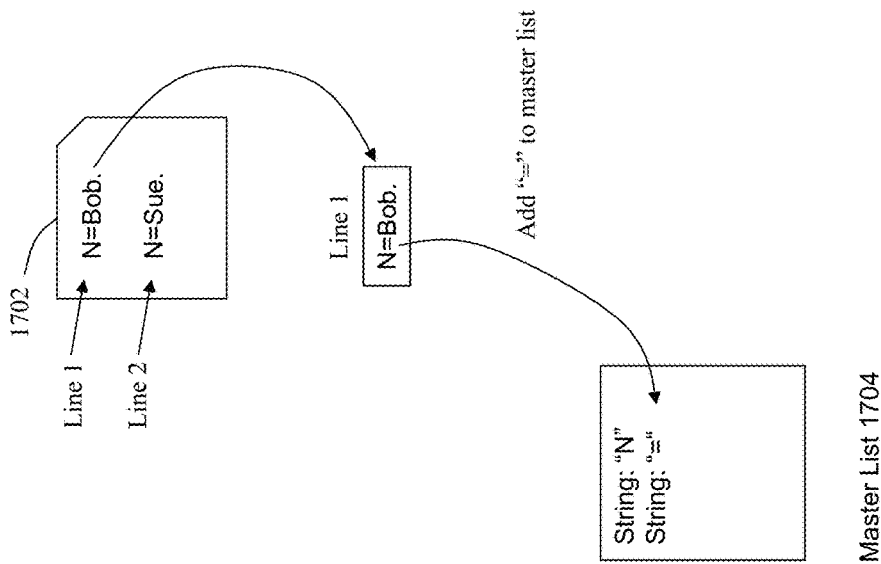
Figures 5, 17:
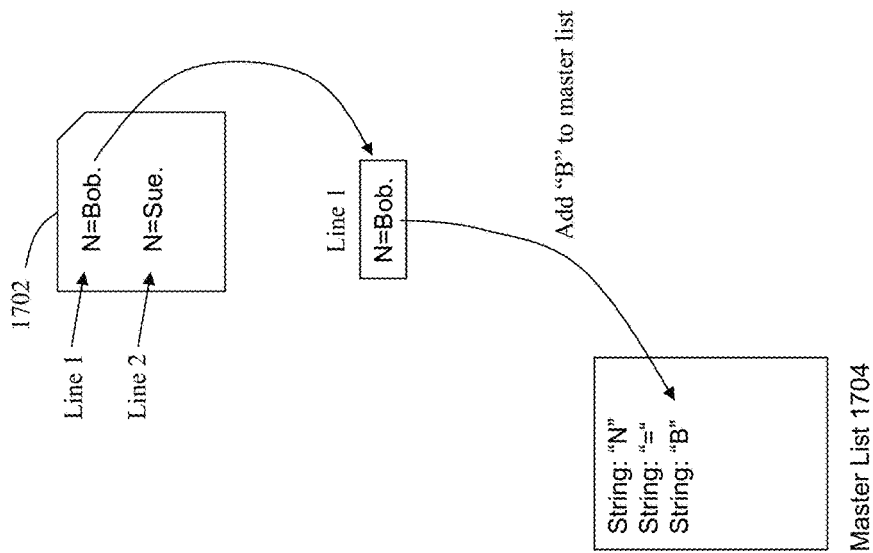
Figures 6, 17:
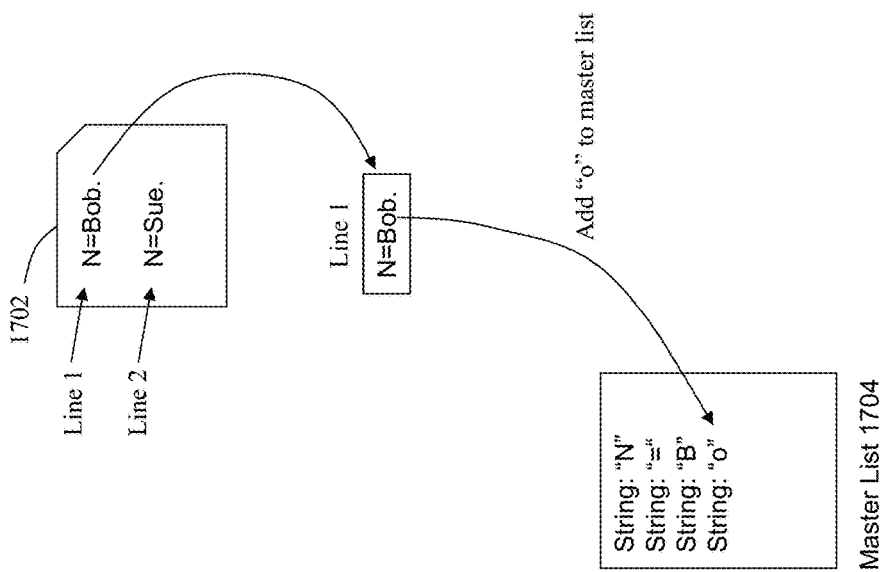
Figures 7, 17:
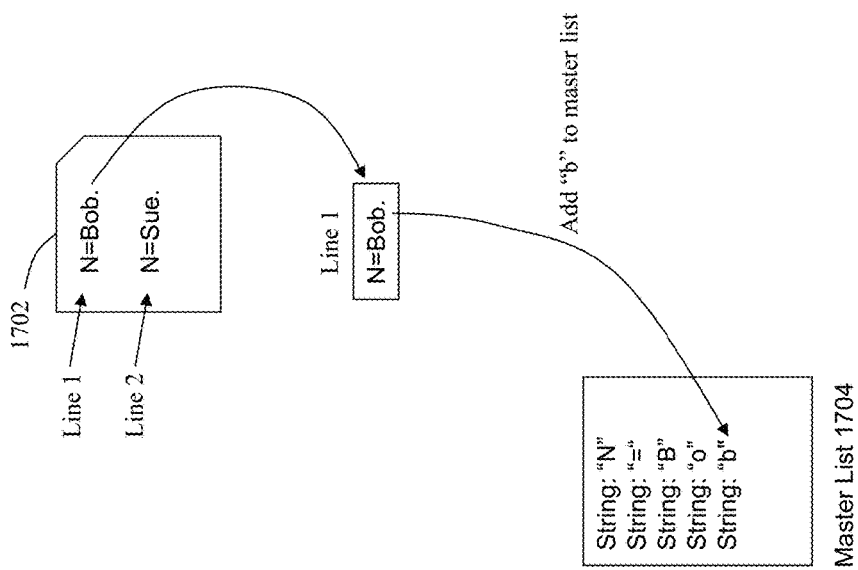
Figures 8, 17:
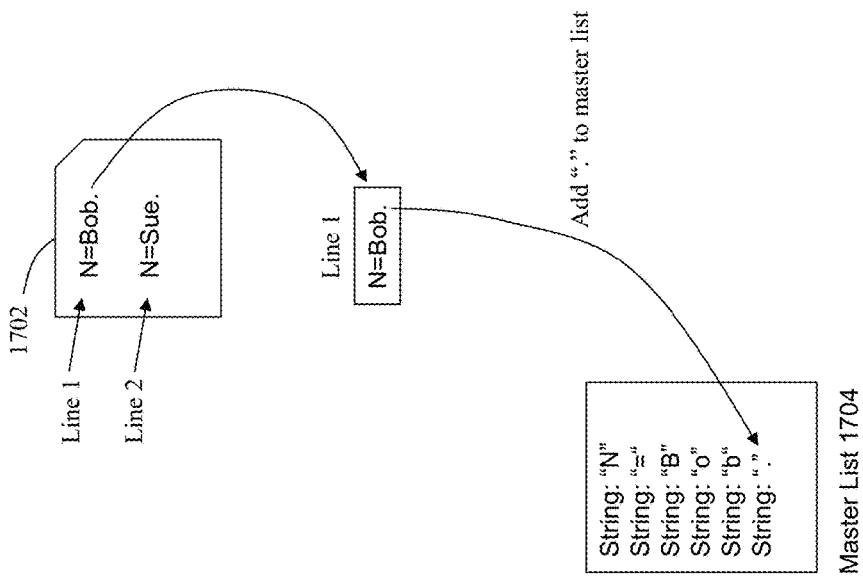
Figures 9, 17:
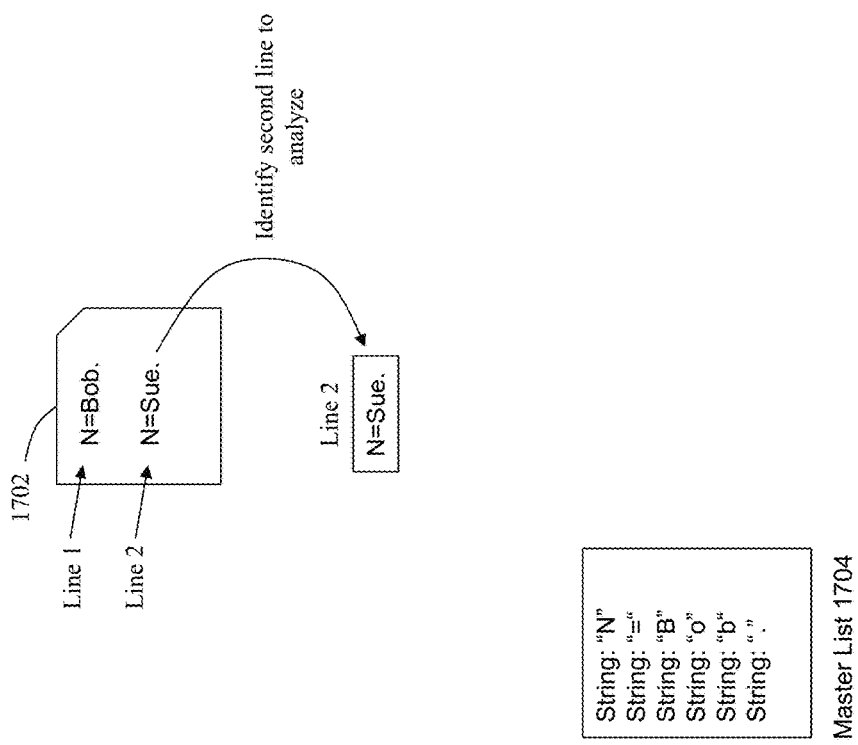
Figures 10, 17:
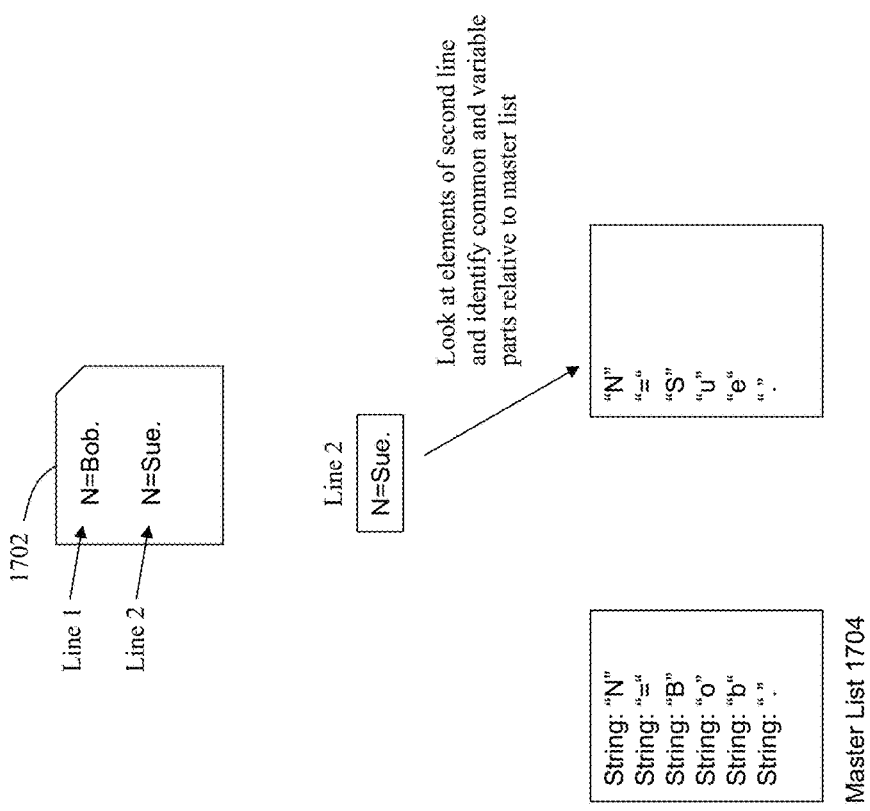
FIG. 10 illustrates server-side information to be included in the configuration file to facilitate the log parsing.
Figures 11, 17:
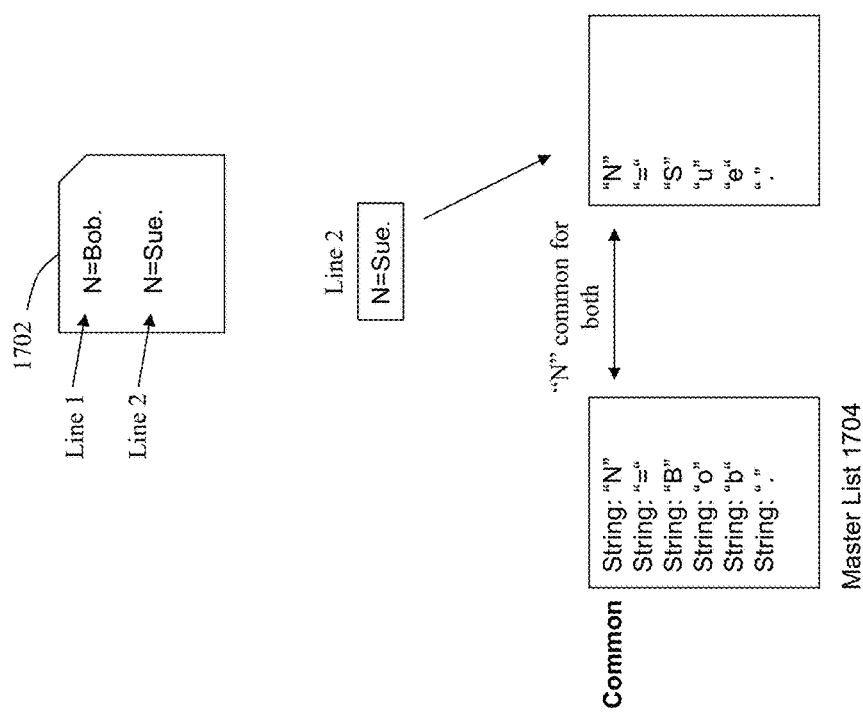
Figures 12, 17:
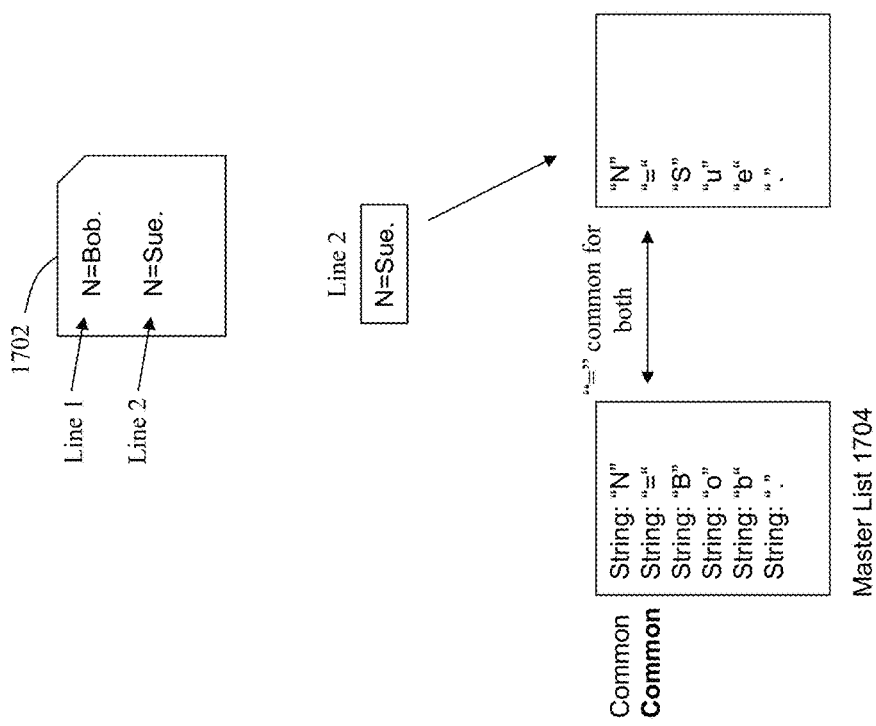
Figures 13, 17:
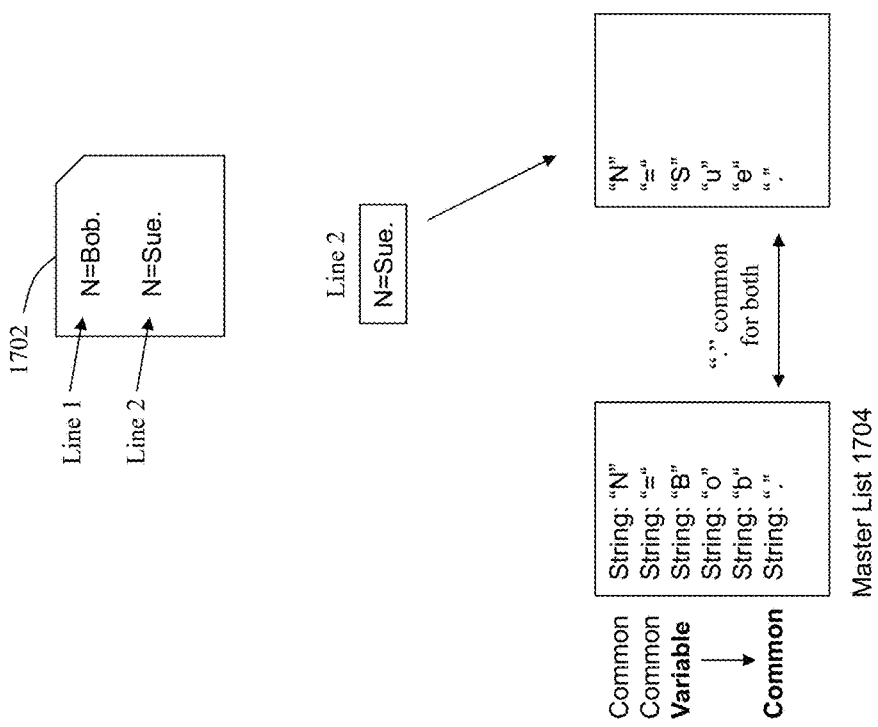
Figures 14, 17:
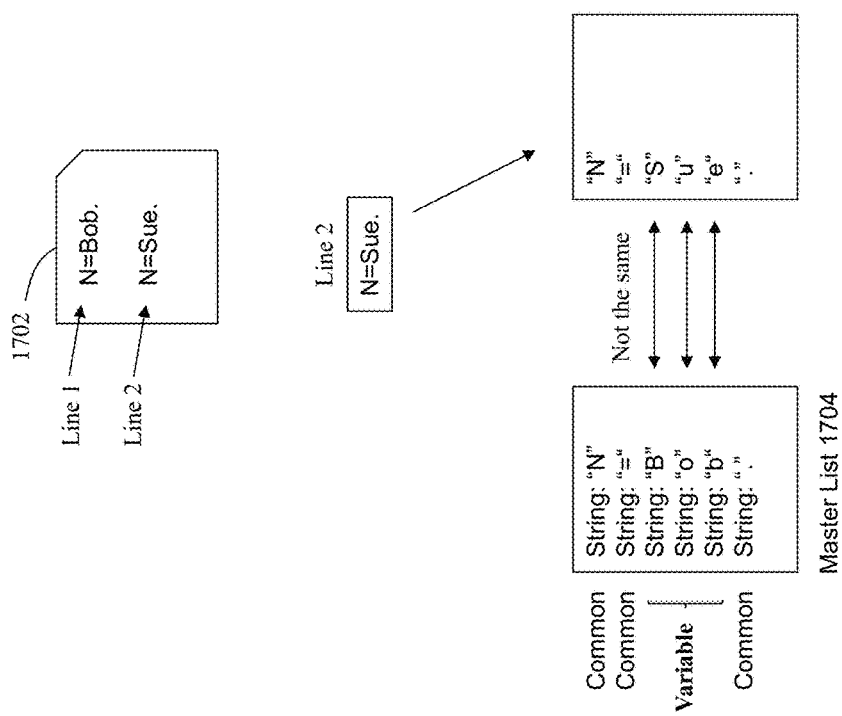
Figures 15, 17:
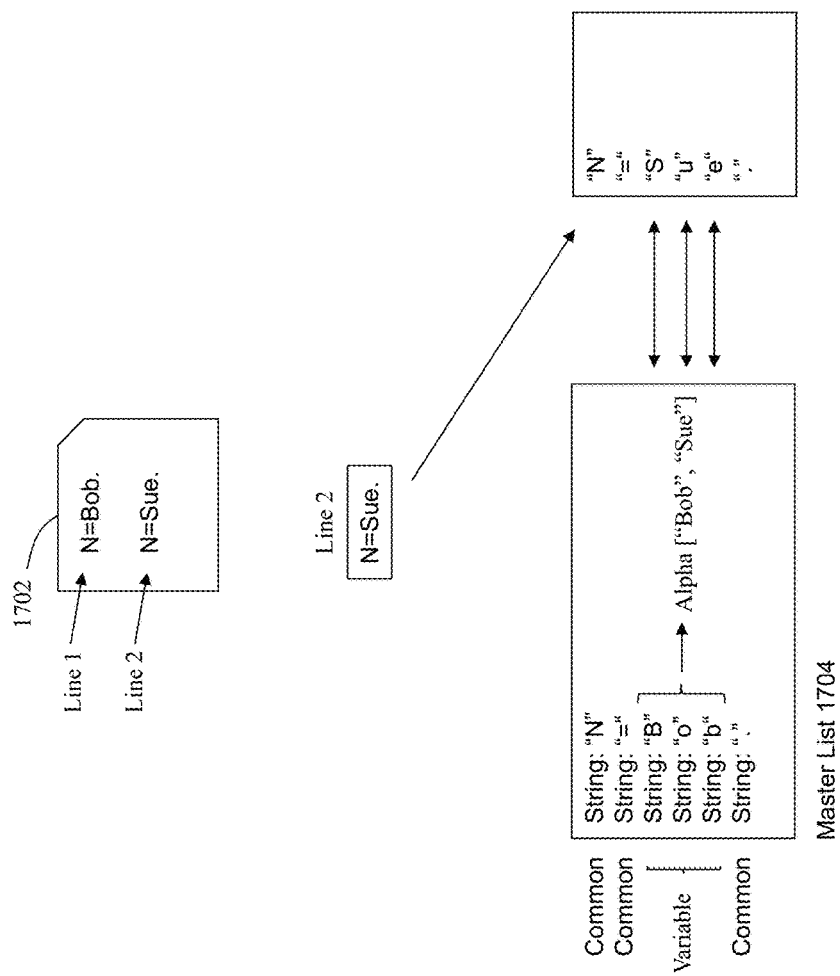
Figures 16, 17:
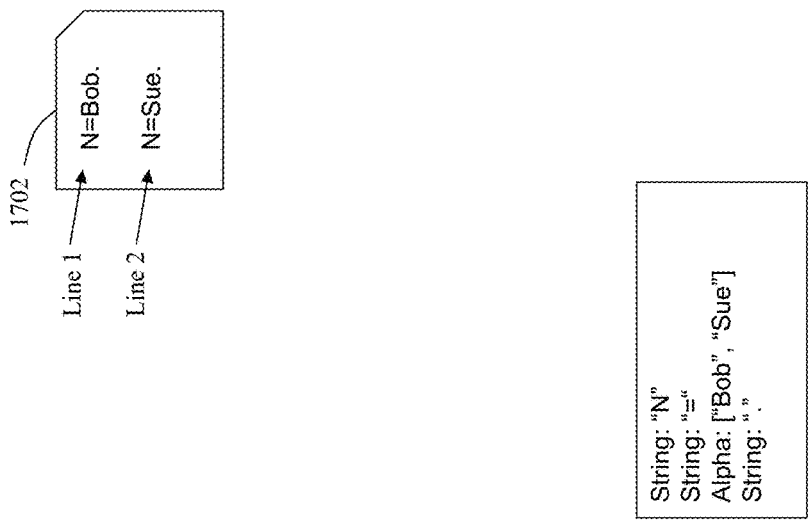
Figure 17:
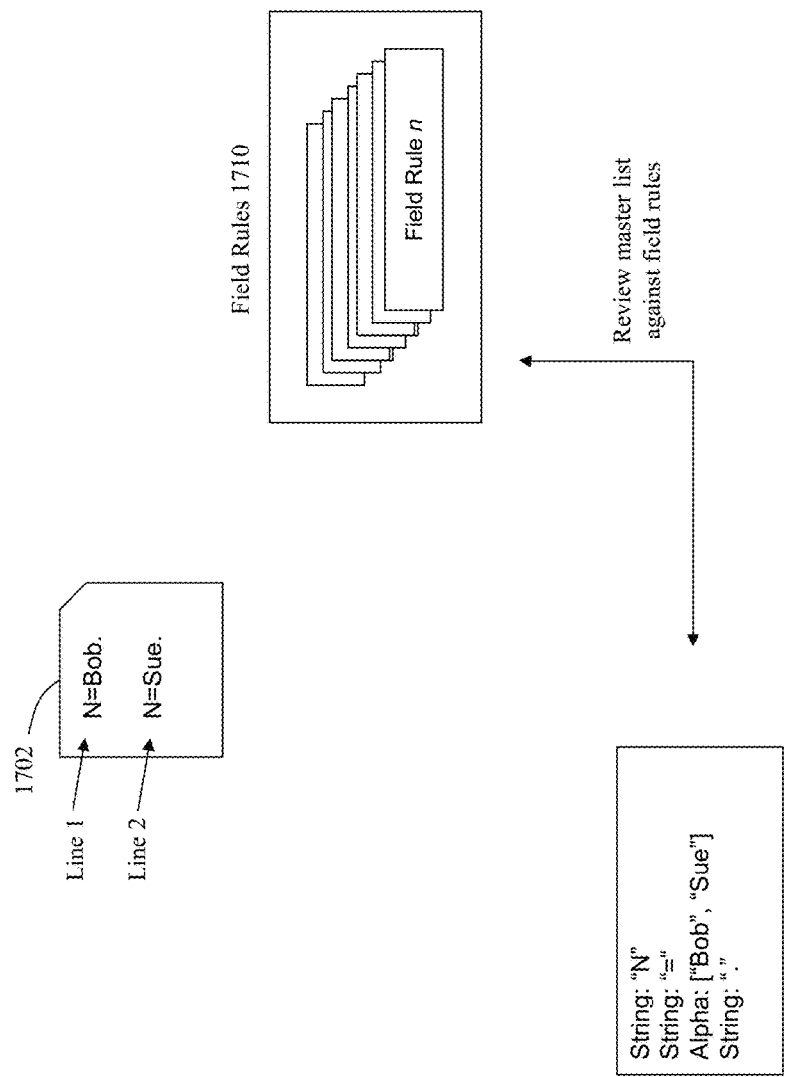

In the log processor at the server side, additional information can be included in the configuration file to facilitate the log parsing, e.g., as shown in the server-side content portion 1000 of FIG. 10. The FieldDef portion 1001 indicates the data type for the service. The Log Source portion 1002 indicates the logs are of "os_file" type. The BaseParse portion 1004 defines the way to parse the log entries based on defined regular expressions in portion 1006. Portion 1003 provides an identifier for the version number of the content 1000, which is used to match up against the corresponding target-side materials having the same version number.

In addition to the above-described auto-associations, target-source manual associations may also be performed. For example, a user interface may be provided to perform the manual associations. This also causes the above-described actions to be performed, but is triggered by the manual actions.

Re-syncshronization may be performed of target-source associations. To explain, consider that when a log analytics agent is installed, monitored targets connected through the agent can be associated with certain pre-defined log sources. Similarly, when the agent is de-installed, such associations can be deleted from the appropriate database tables. In addition, when a target is added to be monitored by an agent, the target can be associated with certain pre-defined log sources for that target type, and when the target is deleted from an agent, such association can be deleted from database tables.

Over time, these associations could become out-of-sync due to various reasons. For example, when a log analytics agent is being installed, the auto-association may occur due to some network issue that causes the loss of the configuration materials during its transfer. In addition, when a target is added or deleted, an event may not processed properly so the configuration XML, file when updating does not occur as appropriate.

To handle these cases and maintain the association consistency between targets and their corresponding log sources, a web service is provided in some embodiments to synchronize the associations periodically. In at least one embodiment, only the auto-associations are synched, and not the manual associations customized by users manually.

Associations may be performed for a specific log analytics agent. A delta analysis can be performed between targets in a data model data store and targets in a log analytics data store to implement this action. Processing may occur where: (a) For targets in data model data store but not in log analytics data store, add associations for these targets; (b) For targets not in data model data store but in log analytics data store, delete associations for these targets; (c) For targets in data model data store and log analytics data store, keep the same associations for these targets in case of user customization. One potential issue for adding associations pertains to the situation where a user may have deleted all associations for a particular target so there is no entry in the log analytics data store, but there is an entry in the data model data store. The issue is that when applying the above approach, the auto-associations not wanted could be brought in again after the synchronization operation. To avoid this, the system can record the user action to identify the potential issue.

In addition, associations may be synchronized for a specified tenant. When this action is performed, delta analysis can be performed between the agent for the data model data store and agent for the log analytics data store. Processing may occur by: (a) For an agent in the data model data store but not in the log analytics data store, add associations for these agents; (b) For agents not in the data model data store but in the log analytics data store, delete associations for these agents; (c) For agents in the data model data store and the log analytics data store, perform the same delta analysis and synchronization as described above.

Synchronization may be performed for associations for all tenants. When this action is performed, it should perform agent-level synchronization as described for each tenant.

Turning the attention of this document to file patterns, one reason for their use in log analytics systems is because it is possible that the exact location of the logs to monitor varies. Most of the time, a system will expect logs to be in a particular place, in a specific directory. When the system dealing with a large number of streaming logs, it may not be clear which directory the logs are expected to be in. This prevents a system that relies upon static log file locations from operating correctly.

The inventive approach in some embodiments can associate log analysis rules to variable locations. One approach is to use metadata that replaces variable parts that correspond to locations for the log files. A path expression is used to represent the pathname for the log files, where the path expression includes a fixed portion and a varying portion, and different values are implemented for the variable part. The placeholder for location is eventually replaced with the actual location in the directory path.

Some embodiments provide for "parameters", which are flexible fields (e.g., text fields) that users can use in either the include file name patterns or exclude file name patterns. The parameters may be implemented by enclosing a parameter name in curly brackets {and}. A user-defined default value is provided in this source. A user can then provide a parameter override on a per target basis when associating a log monitoring rule using this source to a target. The overrides are particularly applicable, for example, with regards to changes from out-of-the-box content (e.g., to override rules, definitions, etc. without actually changing the OOTB content). This is implemented, for example, by implementing a mapping/annotation table that includes the user overrides and indicate of an override for the OOTB content.

The reason this is very helpful is because in the log sources, paths may be defined for log files to monitor. In some cases, the paths are fixed, such as in the Linux syslog file, the path is "/var/log/messages*". However, in other cases, one may want to monitor a database alert log, where each database target will be installed in a completely different path, and the path to find the alert log may be different. For example, the alert log for one database is located at this location: "/xxx/db/yyyy/oracle/diag/rdbms /set2/set2/alert/log*.xml". The underlined portions may vary for every database target. However, each target has the notion of target properties. Included in these properties are metadata that can be used to fill in the variable parts in the path. In the current embodiment, one can express this path instead as:

"{DIAGNOSTIC_DEST}/diag/rdbms/{SID}/{SID}/alert/log*.xml"

When this source is used in a rule and this rule is associated to the target, the system replaces the parameters "DIAGNOSTIC_DEST" and "SID" with those that are known for that target. This allows the system to associate a single rule and source to thousands of targets at once.

As another example, the user may want to monitor the pattern: "/xxx/oracle/log/*". In this case, "/xxx/oracle" is a variable path depending on the host. One could instead write the pattern as: "{INSTALL_DIR}/log/*". For this source, the user can provide a default value (/xxx/oracle) to the INSTALL_DIR parameter. Later, when rule is associated to a target, the user can provide a target override value of "/xxx/oracle" for this parameter on this target without having to create a new source or rule.

With regards to system-defined fixed parameters, there may be a case where the user wishes to reference a built-in parameter (e.g., ORACLE_HOME). Here, the system will replace that variable with the ORACLE_HOME that is known for the selected target. The pattern could be written as: "{ORACLE_HOME}/log/*". This path will automatically be understood by the agent, where ORACLE_HOME is a special built-in parameter that does not need a default to be set by the user. The system could be provided with a list of fixed parameters that integrators/users can choose to use.

Figure 11:
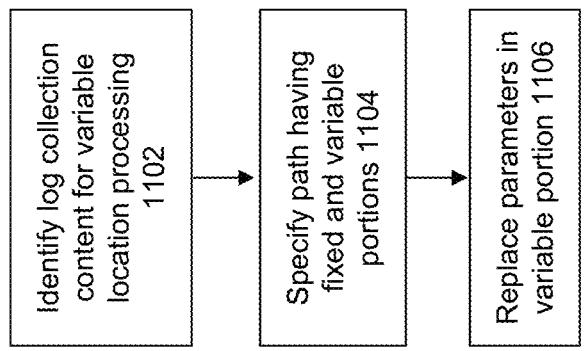
FIG. 11 shows a flowchart of one possible approach to implement this aspect of some embodiments of the invention.

FIG. 11 shows a flowchart of one possible approach to implement this aspect of some embodiments of the invention. At 1102, identification is made of location content for which it is desirable to implement variable location processing. This situation may exist, for example, when the system is handling a large number of streaming logs from possibly a large number and/or uncertain of directory locations. The log data may be located at target locations that are addressed using a pathname that varies for different database targets.

At 1104, a path is specified for the target locations having a fixed portion and a varying portion. The varying portion may be represented with one or more parameters. During log processing, at 1106, the one or more parameters are replaced with values corresponding to one or more target log files, wherein a single rule for implementing log monitoring is associated with multiple different targets to be monitored.

This approach is quite advantageous over approaches where every log is in a different directory that one cannot know about ahead of time, and where a separate forwarder mechanism would have to be set up for each path. Instead, the present approach can be used to set up one rule for a very large number of paths.

In some embodiments, configuration information from the log analytics system can be coupled to this approach to configure and setup the rules for identifying log file assignments. Some examples of configuration information that can be used include, for example, how a database is connected, how the components are connected, which datacenter is being used, etc.

Some embodiments specify how to map sources to targets based on their relationships. For instance, a defined source Source1 can be assigned to all related targets belonging to a certain system. Any association type and/or rule can be used in this embodiment, .e.g., where a common set of association types is used to provide configuration information useful for determining rules for log locations. Such association types may include, for example, "contains", "application_contains", "app_composite_contains", "authenticated_by" "composite_contains (abstract)", "cluster_contains", "connects_through", "contains (abstract)", "depends_on(abstract)", "deployed_on", "exposes", "hosted_by", "installed_at", "managed_by", "monitored_by", "provided_by" "runs_on (abstract)", "stores_on", "stores_on_db", and "uses (abstract)".

It is noted that the target relationship information/model can be used in other ways as well. For example, the target model can also be used to help correlate log entry findings to aid in root cause analysis. As another example, the host model can be used for comparing all hosts in one system. For instance, if there are a number of databases in a first system, this feature can be used to see logs across these systems together, and in isolation from databases used for a second system.

Figure 12:
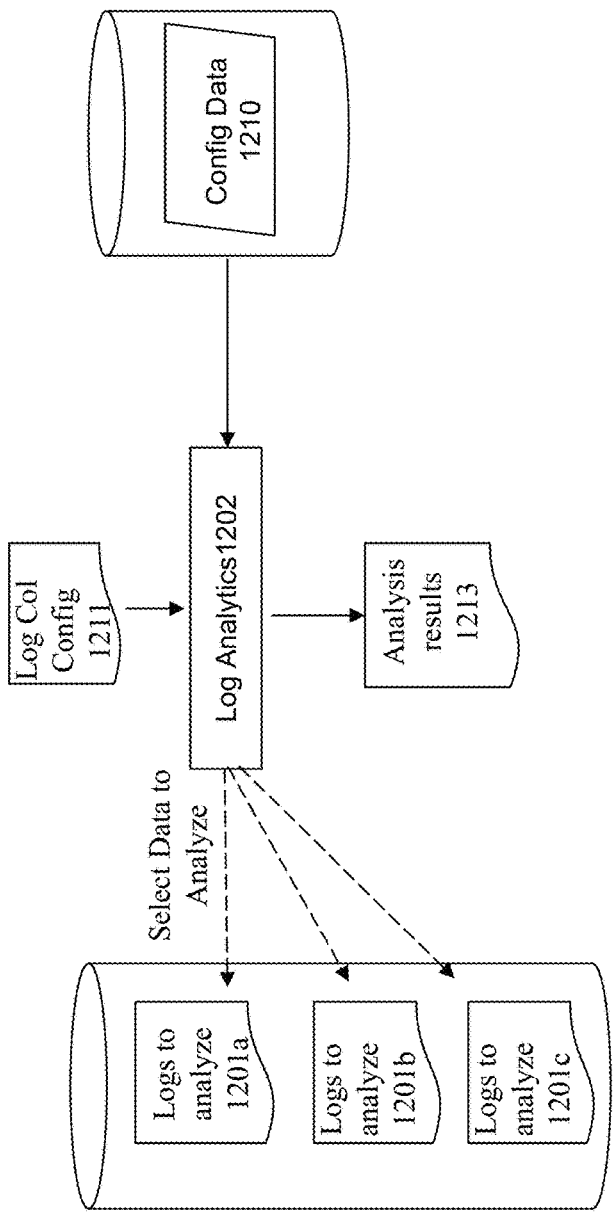
FIG. 12 illustrates an architecture for implementing some embodiments of the inventive approach to associate log analysis rules to variable locations.

FIG. 12 illustrates an architecture for implementing some embodiments of the inventive approach to associate log analysis rules to variable locations. Here, the log analytics engine 1202 operates by accessing log collection configuration files 1211. Log collection configuration files 1211 is implemented to represent a path where the target location may have both a fixed portion and a varying portion. The varying portion may be represented with one or more location parameters. In this example, different locations may exist for logs 1202a, 1201b, and 1201c. By replacing the variable portion, the specific location for the log of interest may be selected by the log analytics engine 1202, and processed to generate analysis results 1213.

Here, the reference material 1210 may be accessed to identify the correct replacement of the variable portions of the paths for the target locations. Any suitable type of reference materials may be implemented. As noted above, a defined source Source1 can be assigned to all related targets belonging to a certain system, and/or an association type and/or rule can be used as well. In addition, target relationship information/models can be employed as well as the reference material.

Embodiments of the invention therefore provides improved functionality to perform target-based log monitoring. Two possible use cases this functionality includes log monitoring and ad hoc log browsing. Log monitoring pertains, for example, to the situation where there is continuous monitoring and capture of logs. Some embodiments of log monitoring pertains to the some or all of the following: (a) monitor any log for any target and capture significant entries from the logs; (b) create events based on some log entries; (c) identify existence of log entries that can affect a compliance score; (d) perform user as well as integrator defined monitoring; (e) capture log entries that are not events to enable analytics on a subset of all logs; (f) use cases such as intrusion detection, potential security risk detection, problem detection; (g) implement long term persistent storage of log contents; (h) search for log content; (i) customizable search-based views; (j) log anomaly detection and scoring.

Ad hoc log browsing pertains, for example, to the situation where there is not continuous monitoring of logs. In this approach, the user can browse live logs on a host without having to collect the logs and send them up to the SaaS server. The model for configuring what to monitor is similar to what was described earlier. The difference pertains to the fact that the user can select a rule, source, and some filters from the UI and the search is sent down to agent to obtain log files that match and bring them back, storing them in a temporary storage in the server. The user can continue to narrow their search down on that result set. If the user adds another target, rule, or extends the time range, the system goes back to the agent to obtain only the delta content, and not the entire content again. The user can therefore get the same benefits of log analytics without configuring continuous log monitoring. The feature can be very low-latency since the system only needs to go back to get more data from agent when the search is expanded. All searches that are narrowing down current result set goes against the data that have been cached from a previous get from the agent.

The embodiments of the invention can be used to store log data into a long-term centralized location in a raw/historical datastore. For example, target owners in the company IT department can monitor incoming issues for all responsible targets. This may include thousands of targets (hosts, databases, middle wares, and applications) that are managed by the SaaS log analytics system for the company. Many log entries (e.g., hundreds of GB of entries) may be generated each day. For compliance reasons, these logs may be required to be stored permanently, and based on these logs, the data center manager may wish to obtain some big pictures of them in long run and IT administrators may wish to search through them to figure out some possible causes of a particular issue. In this scenario, a very large amount of logs could be stored in a centralized storage, on top of which users can search logs and view log trends with acceptable performance. In some embodiments, the log data can be stored in an off-line repository. This can be used, for example, when data kept online for a certain period of time, and then transferred offline. This is particularly applicable when there are different pricing tiers for the different types of storage (e.g., lower price for offline storage), and the user is given the choice of where to store the data. In this approach, the data may held in offline storage may be brought back online at a later point in time.

The logs can be searched to analyze for possible causes of issues. For example, when a particular issue occurs to a target, the target owner can analyze logs from various sources to pinpoint the causes of the issue. Particularly, time-related logs from different components of the same application or from different but related applications could be reported in a time-interleaved format in a consolidated view to help target owner to figure out possible causes of the issue. The target owner could perform some ad-hoc searches to find same or similar log entries over the time, and jump to the interested log entry, and then drill down to the detailed message and browse other logs generated before/after the interested point.

In some embodiments, restrictions can be applied such that users have access only to logs for which access permissions are provided to those users. Different classes of users may be associated with access to different sets of logs. Various roles can be associated with permissions to access certain logs.

Some embodiments can be employed to view long-term log distribution, trends, and correlations. With many logs generated by many different targets and log sources over long time, data center managers may wish to view the long-term log distributions and patterns.

Some embodiments can be employed to search logs to identify causes of an application outage. Consider the situation where an IT administrator or target owner of a web application receives some notification that some customers who used the application reported that they could not complete their online transactions and the confirmation page could not be shown after the submit button was clicked. With embodiments of the invention, the IT administrator can search the logs generated by the application with the user name as key and within the issue reporting time range. Some application exception may be found in the log indicating that some database error occurred when the application tried to commit the transaction. By adding the database and its corresponding hosting server via target association relationship and their availability related log sources for the search, the IT administrator could browse the logs around the application exception time to find some database errors, which was related for example to some hosting server partial disk failure and high volume of committing transactions.

Some embodiments can be employed to view long-term log distributions, trends, and correlations by tags. A data center manager may define some tags for logs collected in the data center, such as security logs for production databases, security logs for development servers, logs for testing servers, noise logs, etc. The data manager may be interested, for example, in knowing the followings: log distributions by these tags over the past half year, their daily incoming rates during last month, and whether there are any correlations between the security log entries for production databases and the changes of their compliance scores during a given time period.

Some embodiments permit log data to be stored as metrics. In certain embodiments, the system will store several log fields as key fields. The key fields will include (but may not be limited to): Time, Target, Rule, Source, and Log File. The system may also create a hash or GUID to distinguish possible log entries that have the same time and all other key fields. When a rule that is using this metric action for log entries is associated with the first target, a metric extension is created and deployed. This metric extension will be named similar to the rule to make it easy for the user to reference it.

In some embodiments, the log monitoring rule has a possible action to create an event when a log entry matches the condition of the rule. Additionally, users will be able to indicate that this event should also trigger a compliance violation which will cause an impact on the compliance score for a compliance standard and framework.

As noted above, one possible use case is to provide a log browser, e.g., where browsing is employed to browse live logs on a host without collecting the logs and sending them to a SaaS Server. The user can select a rule, source, and some filters from the UI and the search is sent down to agent to obtain log files that match and bring them back, storing them in a temporary storage in the server. One use case for this feature is to allow users to browse a short time period of log files across multiple targets in a system to try to discover a source of a problem, especially when there is a rich topology mapping and dependency mapping of the customer's environment. This content can be used to help find related elements and show the logs together. This allows the users to see logs for all targets related to a given system for instance and see what happened across all targets in time sequence. In many cases, when there is a target failure, it may be a dependent target that is experiencing the problem, not the target that is failing.

The user may choose to start a new log browsing session in context of a system/group/individual target. If coming in from a target home page, the target home page context is to be retained. This means that the outer shell of the page still belongs to the target home page, and just the content panel will contain the browse UI functionality. This means the browse UI can be implemented to be modular to plug into other pages dynamically. In some embodiments, multiple row-content can be provided per entry to show additional details per row. This is one row at a time, or the user could decide to perform this for all rows. Sorting can be provided on the parsed fields, but in addition, can be used to see additional details per row (including the original log entry).

Search filters can be provided. For example, a search filter in the form of a date range can be provided, e.g., where the options are Most Recent, and Specific Date Range. With the Most Recent option, the user can enter some time and scale of Minutes or Hours. With the Specific Date Range, the user will enter a start and end time. With the date range option, Targets, Sources, and Filters can be specified. These allow the users to select what they want to see in this log browsing session. After the user has selected the targets, sources, and applied any filters, they can begin the browse session to initiate retrieval of the logs from various targets and ultimately have them shown on the interface.

Search queries can be implemented in any suitable manner. In some embodiments, natural language search processing is performed to implement search queries. The search can be performed across dependency graphs using the search processing. Various relationships can be queried in the data, such as "runs on", "used by", "uses", and "member of".

In some embodiments, the search query is a text expression (e.g., based on Lucene query language). Users can enter search query in the search box to search logs. The following are example of what could be included in the search query: (a) Terms; (b) Fields; (c) Term modifiers; (d) Wildcard searches; (e) Fuzzy searches; (d) Proximity searches; (f) Range searches; (g) Boosting a term; (h) Boolean operators; (i) Grouping; (j) Field grouping; (k) Escaping special characters.

A tabular view can be provided of the search findings. Some query refinement can be performed via table cells to allow users to add/remove some field-based conditions in the query text contained in the search box via UI actions. For example, when a user right-mouse clicks a field, a pop-up provides some options for him/her to add or remove a condition to filter the logs during the searches. This is convenient for users to modify the query text, and with this approach, users do not need to know the internal field names to be able to refine the query at field level.

There are numerous ways that can be provided to list fields for user to select/de-select them for display purpose in the search findings table. One example approach is based on static metadata, and another possible way is based on dynamic search results.

For list fields based on static metadata, a basic field shuttle is used to list all defined fields. Some example fields that can be defined by the log entry metadata include: (a) Log file; (b) Entry content; (c) Rule name; (d) Source name; (e) Parser name; (f) Source type; (g) Target type; (h) Target name. The values of these fields can be obtained from the agent with log entry (although source, parser, rule, target are all GUIDs/IDs) that will need to be looked up at display time.

For list fields based on dynamic search findings, the top n fields (e.g., 10) will be shown that would be suggested as making the most difference for that search. A "more fields" link will lead to a popup for users to select other fields. Users can see more information of those fields on the popup than form the View menu. When listing the fields, the system could use any suitable algorithm, for example, to assign a number to each field that is influenced by how many rows in the search results having non-null value, or how many different values there are across all search results for that field, etc.

Given so many dynamic fields available for users to select/de-select, it is desired for a user to be able to save the fields selection (field names and sizes). The system can store the last selected fields so when the user comes back to the page, he/she still gets the fields picked last time.

There may be a very large number (e.g., thousands) of log entries resulting from a search and it may not be possible for users to browse all of them to find the interested logs. For a particular search, users should be able to drill down to the details of the search findings with a few clicks. In some embodiments, features include clickable bar charts and table pagination. With these navigation features, plus customizable time range, users should be able to jump to some interested point quickly. Correspondingly, some embodiments provide for drilling up from details to higher levels so users can easily navigate to desired log entries via bar graphs. An example use case is: after users drill down a few levels they may want to drill up back to a previous level to go down from another bar. After users identify an interested log entry via some searches, they likely want to explore logs from a particular log source around the interested log entry, or explore logs from multiple log sources around the interested log entry in time-interleaved pattern. Some embodiments provide an option for users to browse forward/backward the logs around a specified log entry page by page. A graphical view can be provided of the search findings. This allows the user to pick fields to render the results graphically.

Some embodiments pertain to improved techniques to address log distributions, trends, and correlations. For search findings resulted from a particular search, distributions can be based on log counts to give users some high-level information about the logs. For each distribution type, the top n (e.g., 5 or 10) items are listed with number of found logs (where a "more . . . " link will lead to a popup with all other items listed). When users select a particular item, only logs corresponding to that item would be shown in the right table, so the action is equivalent to filtering the search findings with that item. Such information may be presented: (a) By target type; (b) By target, such as target owner and/or lifecycle status; (c) By log source; (d) By tag. Besides showing the search findings in the results table, the system can also provide options for users to switch between table view and the corresponding distribution chart view.

In some embodiments, results can be filtered by selecting distribution items. Users can filter the results table by selecting one or more distribution items. By default, all distribution items are selected and all log entries are listed in the results table. After selecting one or more distribution items, users can navigate the log entries via pagination. With one or more distribution items selected, when users click the search button for a new search, the selections of distribution items will be reset to be selected for all distribution items.

Some embodiments provide a feature to show search finding trends. Some embodiments provide a feature to show search finding correlations. Related to this feature, some embodiments provides launching links for users to navigate to search/view detailed logs when they perform correlation analysis among events, metrics, and infrastructure changes. Launching links could be provided, e.g., for users to navigate to an IT analytics product to analyze/view detailed events/metrics when they wish to see some bigger pictures related to the logs here.

Another feature in some embodiments pertains to process-time extended field definitions. Even with the same baseline log type, it is possible for individual log entries to contain inconsistent information from one log to the next. This can be handled in some embodiments by defining base fields common to the log type, and to then permit extended field definitions for the additional data in the log entries.

To explain, consider that a source definition defines log files to monitor. The log files are parsed into their base fields based on the log type definition. One can extract additional data that is not consistent across all log entries, e.g., as shown in 1300 of FIG. 13. In this figure, the base fields that are parsed from the log entries are Month, Day, Hour, Minute, Second, Host, Service, Port (optional), and Message. The goal is to extract IP address and Port out of the second log entry. This goal may not be obtainable in certain implementations as part of the log type, e.g., since not every log entry has this structure. Here, the Message field for the second entry has the following content:

Accepted publickey for scmadm from xxx.xxx.1.1 port xyz ssh2

In some embodiment, a definition is made for an Extended Field Definition on the Message field using a format such as:

Accepted pubhckey for .* from {IP Address} port {Port} ssh2

For that log entry, two new field IP Address and Port will be parsed out and will be usable for reporting, searching, etc. This extraction happens as the data is being processed at collection time.

According to some embodiments, the processing for implementing process-time extended field definitions comprises: identifying one or more log files to monitor, wherein some of the entries in the one or more log files may include additional data that does not exist in other entries or is inconsistent with entries in the other entries, such as an additional IP address field in one entry that does not appear in another entry; identifying a source definition for one or more log files to monitor; parsing the one or more log files into a plurality of base fields using the source definition; defining one or more extended fields for the one or more log files; and extracting the one or more extended fields from the one or more log files.

Therefore, some embodiments permit the user to add extended field definitions. These are defined patterns that are seen within a field. A user could perform a create-like on a source and then the source and all extensions will become a new user-created source. The extended field definition defines new fields to create based on the content in a given file field. In some embodiments, the extended field definitions (and tagging) can be applied retroactively. This allows past log data to be processed with after-defined field definitions and tags.

Figure 14:
FIG. 14 shows some example field definitions.

FIG. 14 shows some example field definitions 1302. For the first case in the table, the user is specifying to look at the "Message" file field that comes from the log entry and is parsed by the file parser. This Message field will have text in it, but the user has identified that they want to capture the SIGNALNAME part of the message as a new field for this specific message. This new field (SIGNALNAME) can now become viewable in the captured log entries, viewable in the Log Browser, and can also be stored as part of a metric if a rule is created to do so. The extended field definition uses the entire contents of the Message in this example. The user could bind either side of their expression with a wildcard pattern. For instance, the definition could have been simply "sending a {SIGNALNAME}". The text that is shown is known to be static text that never changes for this log message. The use of [0-9]* in the expression means that any number of numeric characters can be located here, but they will just be ignored (since there is no field name associated to name this field. The text that comes after the string "sending a" will get assigned to the variable SIGNALNAME.

The last entry is another example where the user has defined two new fields and in the first field, they have also defined the way to get this content using a regular expression. Here, there are some characters containing a-z,A-Z,0-9 or a hyphen before a period '.'. Everything that matches that expression should be added to a new extended field called the HOSTNAME. Anything after the first period will be put into a new extended field called DOMAINNAME. The HOST field which came from the file parser will still have all of the content, but this extended field definition is telling our feature to add two NEW fields in addition to the HOST field (HOSTNAME and DOMAINNAME).

All extended field definitions where a new field is defined using the { } delimiters uses a parse expression. However in this example, except the HOSTNAME field in the last example, there is none shown. This is because in some embodiments, there is a default known regular expression pattern of (.)* which means any number of character. This expression is implicitly used if the user does not provide a regular expression. If there is static text, the system will take any characters between the two pieces of static text. If there is no static text or characters after a field expression, it is assumed that every character to the end of the file field is part of the new extended field's value (like DOMAINNAME in the last example and CONTENT_LENGTH_LIMIT in the third example.) This could lead to some issues if there were variants of this log entry that have additional text sometimes. The way to solve this is to also define the parse regular expression for each field and not rely on the default implicit (.)*.

Some embodiments provide the ability to define regular expressions and save them with a name. For instance, the regular expression for hostname used above is [a-zA-Z0-9\-]+.

One example of a saved regular expression may be:

IP_Address Regular Expression=>\d{1,3}\.\d{1,3}\.\d{1,3}\.\d{1,3}

When referencing this saved regular expression in the extended field definition, the last entry in the table above may look like this instead:

{HOSTNAME:@IP_Address}.{DOMAINNAME}

The new fields that will be created are HOSTNAME and DOMAINNAME. The referenced regular expression that was created and saved is called IP_Address. When the system performs the processing on the agent, it will replace the referenced regular expression "@IP_address" with the regular expression string:

"\d{1,3}\.\d{1,3}\.\d{1,3}\.\d{1,3}"

Extended expression definitions can be evaluated at the agent (e.g., using a Perl parsing engine) directly with minor changes to the input string from the user.

In some embodiments, field reference definitions can be provided. This provides a feature where users can provide a lookup table of a SQL query to transform a field which may have a not-easily-readable value into more human readable content. Three example use cases highlight this need: (a) In a log entry, there may be an error code field (either a core field or an extended field) that simply has a number, where the user can provide a lookup reference so that the system adds another new field to store the textual description of what this error code means; (b) In a log entry, there may be a field (either a core file field or an extended field) that has the GUID of a target, and the system can provide a lookup using a SQL query to a target table that will create another new field that stores the display name of the target; (c) IP to hostname lookup may also be performed as a common use case, where in a log, there may be IP addresses for clients, where the IP addresses are used to look up hostnames.

As noted above, log types (also referred to herein to include "Parsers" in some cases in this document) may also be defined to parse the log data. One example log type pertains to the "Log Parser", which is the parser that can be used to parse the core fields of the source. Another example log type pertains to a "Saved Regular Expressions", which can be used when defining extended field definitions. For example, a hostname can be defined via a regular expression as "[a-zA-Z0-9\-]+". This regular expression can be saved with a name and then used a later time when creating extended field definitions.

A log parser is a meta-data definition of how to read a log file and extract the content into fields. Every log file can be described by a single parser to break each log entry into its base fields. The log type may correspond to a parse expression field, such as for example, a Perl regular expression for parsing a file. When defining a log parser, the author identifies the fields that will always exist in the log file. In this case, the following are the fields that exist in every entry of the above log file:

Some fields may be very complex, meaning that the field will actually contain additionally structured content for some log entries but not for others. These may not be handled by the log file parser in some embodiments because it is not consistent in every line. Instead, when defining a source, extended fields can be defined to break this field into more fields to handle these cases.

Profiles can be implemented for various constructs in the system, such as parsers, rules, and sources. The profiles capture differences between different usages and/or versions of data items and products for users. For example, a source profile can be created that accounts for different versions of a user's products that are monitored, e.g., where a source profile changes the source definition between version 1 and version 2 of a database being monitored. Rule profiles may be used to account for differences in rules to be applied. As another example, parser profiles can be provided to adjust parsing functionality, e.g., due to difference in date formats between logs from different geographic locations. Different regular expressions can be provided for the different parser profiles.

With regards to a log entry delimiter, log files can have content that is always known to be one row per entry (syslog), or can have content that can span multiple lines (Java Log4j format). The Log Entry Delimiter input lets the user specify to always parse this log file as one row per entry, or to provide a header parse expression that tells us how to find each new entry. The entry start expression will typically be the same as the first few sections of the parse expression. The system uses this expression to detect when a new entry is seen versus seeing the continuation of the previous entry. For this example, the entry start expression may be:

([A-Z]{1}[a-z]{2})\s([0-9]{1,2})\s([0-9]{1,2}):([0-9]{2}):([0-9]{2})

This expression looks for a strict month, day, hour, minute, second structure. If that exact sequence of characters is seen, this "line" is treated as the beginning of a new entry.

In some embodiments, a table is maintained corresponding to parsed fields, and which starts empty (no rows) as the parse expression is empty. As users are creating the parse expression, the fields being defined are added to this table. This can be implemented by monitoring the text entered in this field and when a ')' is added, a function is called to determine how many fields have been defined. The system can ignore some cases of (and ), e.g., when they are escaped or when they are used with control characters.

For instance, consider the following parsing language:
([a-z]{2})\s([a-z0-9]+)

In this example, there are two pairs of ( ) which means there are two fields defined. The content inside is how to find the field from the log entry—The UI for this create parser page does not care about what is inside the parenthesis. This is evaluated and used on the agent only. The content outside of the (and ) are just static text that helps parse the line (this UI also does not care about this). For creating the right number of fields in the table, the approach counts the number of ( ) pairs in the parse expression. For each field that is parsed out by the parse expression, the user provides a field name based on one of the existing common fields.

Log Parser Construction

As noted above, a log parser is typically constructed in a manual process by a person that must be both knowledgeable about the exact format of the log file to be analyzed, as well as skilled in the specific programming infrastructure that would be used to implement the parser. There are numerous problems with this approach. For example, this highly manual process requires significant amounts of time and resources from skilled technology personnel, both upfront to create the parser, as well as on an ongoing basis to maintain the parsers in the face of possible changes to the log file formats. Moreover, this manual approach necessarily requires a priori knowledge of the log file formats, which may not always be available before the log files start streamlining into the log analytics system. Finally, the lack of a suitable parser could potentially bring the log analysis pipeline to a halt with respect to analysis of the affected log data.

Some embodiments of the invention solve these problems by providing an approach to automatically construct a log parser. Instead of requiring a person to manually create the contents of the log parser, the log contents themselves are used to construct the parser.

Figure 15:
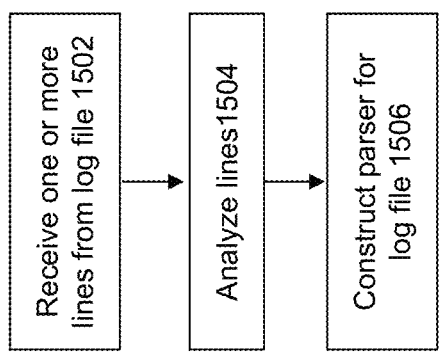
FIG. 15 shows a high level flowchart of an approach to implement a log parser according to some embodiments of the invention.

FIG. 15 shows a high level flowchart of an approach to implement this embodiment of the invention. At 1502, one or more lines of a log file are received for processing. In some embodiments, the log parser is constructed as each line of the log file is received in a streaming manner. This approach permits the parser to be constructed in real time as the contents of the log file are received. In an alternative embodiment, a number of lines from the log file may be collected together before processing those lines. This approach may be useful to perform batch processing on the log file lines, e.g., to implement certain types of processing such as clustering or grouping analysis that may need a collected set of a minimum number of log file lines before processing.

At 1504, the lines from the log file are analyzed. The analysis is performed to identify the specific contents and differentiated sections within the log file lines. As additional lines are processed and more information is obtained about the lines, a greater level of certainty can be obtained of the basic structure of the log file lines. It is noted that the number of lines that needs to be reviewed to generate an accurate parser depends upon the complexity and content of the log file lines. However, using the techniques described herein, many log files may only need 10-20 lines (or even less) to be analyzed to construct an acceptably accurate log parser. This ability to generate a log parser based upon review of a relatively small number of lines permits the log parser generation processes to be performed in a very time-efficient manner, and therefore improves the functioning of the computing system itself since it allows the log parser generation process to be performed in real-time as the log file data is streamed into the log analytics system.

At 1506, the parser is then constructed based upon analysis of the lines from the log files. This is performed, for example, by scanning the contents of one or more sets of logs to construct a regular expression to parse the logs. The present embodiment operates by walking through a selected set of the lines to identify commonalities between the lines, and to then construct a regular expression that can be used to generally parse through logs files containing similar lines of log entries.

Figure 16:
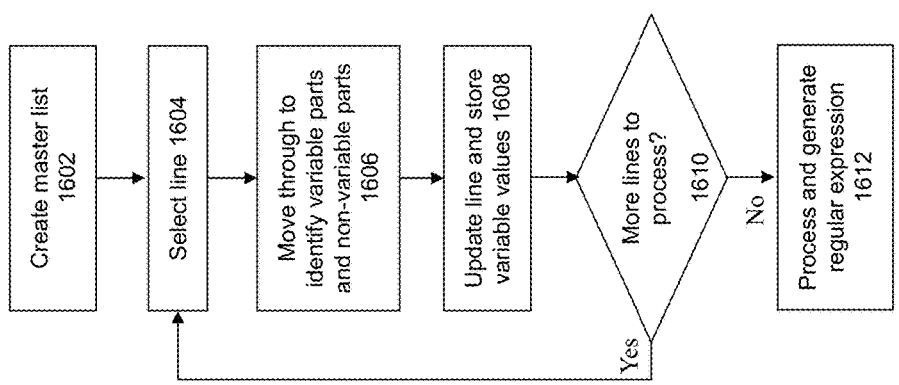
FIG. 16 shows a more detailed flowchart of an approach to implement a log parser according to some embodiments.

FIG. 16 shows a more detailed flowchart of an approach to implement this process according to some embodiments. At 1602, a master list is created from the first line of the log being analyzed. The master list comprises a mapping structure that maps the contents of the log file line to identified element types within the line. Examples of these element types include, for example, number/integer types, character types, and string types.

Once the first line has been processed, then at 1604, another line from the log is selected for analysis. At 1606, the analysis is performed by moving through the line under analysis to compare against the master list. This action is performed to identify the variable and non-variable parts of the line(s) being analyzed. This can be performed by starting from beginning of line, and moving forward until there is a mismatch. At this point, the process finds the next common character(s). One of the identified common characters is considered a "delimiter", so that the intervening range is marked as variable. It is noted that the intervening range may be variable in size between the two lines, and so the algorithm should be robust enough to handle this. An example algorithm for identifying the common parts that should be considered the delimiter is described in more detail below. The process loops through until the end of line is reached.

At 1608, the master line can then be updated to reflect the common portions and the variable portions. In addition, the values of the variable portions can be stored if desired.

At 1610, a determination is made whether there are any additional lines to analyze. In some embodiments, there is no need to analyze each and every line in the log to perform the analysis for the log. Instead, only a subset of the lines (e.g., 10 lines) needs to be analyzed to construct the parser. If additional lines needs to be analyzed (e.g., only 2 of the 10 lines for analyzed has been processed), then the process returns back to 1604 through 1608 to select and analyze another line from the log.

If no additional lines need to be analyzed, then at 1612, the updated master line is ready to be processed. One example type of processing, as described in more detail below is, for at least one of the variable parts, assigning the at least one variable part to a least restrictive data type that encompasses a variability of values detected in the at least one variable part. In addition, commonalities can be identified between the lines to then construct a regular expression from the commonalities. The regular expression can be generated for the non-variable parts with placeholders for the variable parts to implement a log parser, where at least two different placeholders are associated with different data types.

FIGS. 17-1 through 17-21 provide an illustration of this process. FIG. 17-1 shows an example of a log file 1702. Two lines within log file 1702 are shown in the figure. The first line includes the content "N=Bob." and the second line includes the content "N=Sue.".

The first action is to select line 1 from the log file 1702 to construct a master list 1704. A shown in FIG. 17-2, line 1 corresponding to "N=Bob." is selected for processing.

To construct the master list 1704, each portion/unit of the content within Line 1 is examined to identify a unit type (also referred to herein as a "parse unit") that is associated with the portion of the line. According to one embodiment, each portion of the line is identified from one of the following parse units: (a) string—this is a default parse unit type that correspond to any type of element that may exist within a string; (b) alpha—this parse unit type corresponds to any number of contiguous alphabetic elements; (c) integer—this parse unit type corresponds to any number of contiguous integer elements; and/or (d) field rule type—this parse unit type corresponds to a type that is identified based upon a rule definition, and may correlate to complex combinations of any numbers of characters, integers, or symbols. The more restrictive the type, the more favored is the selection of that type for element(s) within the line.

FIGS. 17-3 through 17-8 illustrate the process of constructing a master list 1704 for Line 1 of log file 1702. As shown in FIG. 17-3, the first character "N" is retrieved and placed into the master list in the first position. The parse unit type is also identified for this character. In this case, the initial parse unit type of "string" is assigned to this character, since the process does not yet have enough information to know if the variability of this element within multiple lines should cause this element to be assigned to a different parse unit type. Therefore, since the master list pertains to the very first line of the log file, this element (as well as each of the other elements within the line) will all be assigned to the default parse unit type of "string" since this parse unit type encompasses every possible element type that may exist in the lines. As shown in FIG. 17-4, the next character "=" from Line 1 is also placed into master list 1704 and assigned to parse unit type "string". As shown in FIG. 17-5, the next character "B" from Line 1 is placed as well into master list 1704 and assigned to parse unit type "string". FIG. 17-6 shows the next character "o" from Line 1 being placed into master list 1704 and assigned to parse unit type "string". FIG. 17-7 similarly shows the next character "b" from Line 1 being placed into master list 1704 and assigned to parse unit type "string". Finally, as shown in FIG. 17-8, the last character "." from Line 1 is placed into the master list 1704 and also assigned to parse unit type "string".

Next, as shown in FIG. 17-9, Line 2 corresponding to "N=Sue." is retrieved from the log file 1702 and is compared against the master list 1704. The contents of Line 2 can be analyzed on an element-by-element basis relative to the master list 1704. To illustrate this type of analysis, FIG. 17-10 shows the contents of Line 2 organized on an element-by-element basis.

FIGS. 17-11 through 17-15 illustrate this comparison analysis between line 2 and the master list 1704. FIG. 17-11 shows the analysis of the first element position within line 2 against the first element position in the master list 1704. Here, the master list 1704 includes "N" in the first position, which matches the element "N" in the same position within line 2. Therefore, this shows that the master list 1704 correctly indicates that the first element of the lines has "N" as its content. Similarly, FIG. 17-12 shows the analysis of the second element position, where the master list 1704 includes "=" in the second position that matches the element "=" in the same position within line 2. This indicates that the master list 1704 correctly shows that the second element of the lines has "=" as its content.

Figure 13:
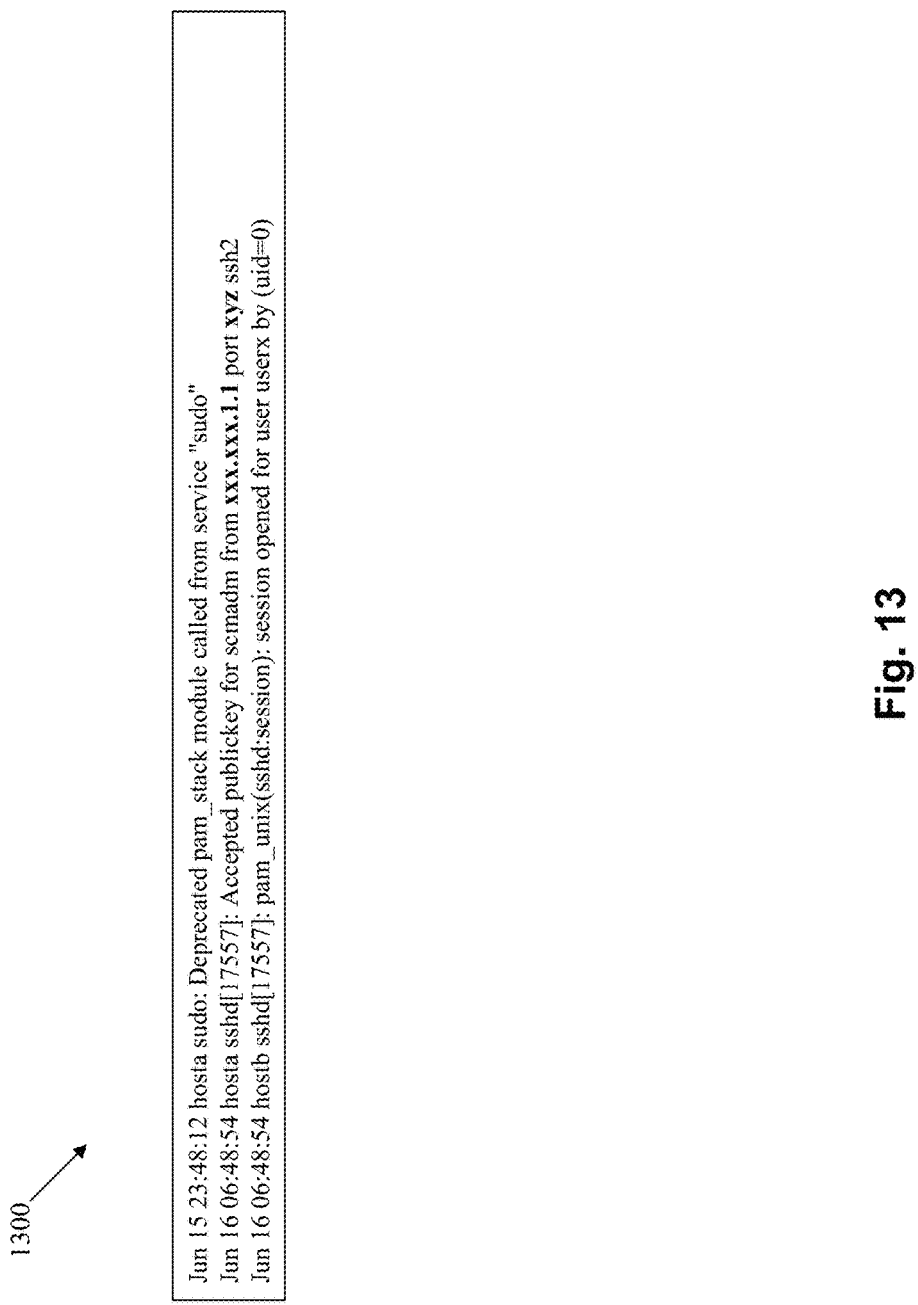
FIG. 13 illustrates extraction of additional data that is not consistent across all log entries.

However, as shown in FIG. 17-13, a comparison of the third element position indicates a difference between the content of the master list 1704 and the content of line 2. In particular, the master list 1704 has "B" in the third element position, whereas line 2 include "S" in the third element position. This indicates that the third element position is a variable part of the line(s).

The process then proceeds to identify the next common element(s) that should be considered a delimiter between common and variable portions. In the current example, the "." element in the sixth element position is the next common element. An approach is described in more detail below in conjunction with FIG. 20 that can be used to identify the next common element that should be considered a delimiter. It is noted that this approach of "skipping ahead" to find the next common portion permits any varying number of characters within each of the multiple lines to be compared, since it does not matter how many characters with each line are skipped to identify the next common character.

As shown in FIG. 17-14, the common portions are the first element position ("N"), the second element position ("="), and the sixth element position ("."). The variable portions include the third element position ("B" in the master list and "S" in line 2), the fourth element position ("o" in the master list and "u" in line 2), and the fifth element position ("b" in the master list and "e" in line 2).

The variable portion forms an analysis range where its contents can be analyzed as a collective group of elements. In addition, within the variable portion, common parse unit types may be collapsed together, e.g., for the variable portion of both the master list and line 2, this corresponds to "Bob" for the master list and "Sue" from line 2. The most restrictive parse unit type that correlates to these values is the alpha parse unit. Therefore, as shown in FIG. 17-15, the individual string values for the variable portion of the master list are replaced with the alpha parse unit.

When considering content from both the master list and line 2, the parse unit definition within the master list 1704 may also be used to track the specific contents from each of the lines that have been analyzed. Here, the "Bob" and "Sue" values from both line 1 and line 2 for this element position can be included within the parse unit definition for the alpha parse unit within the master list. This results in the master list 1704 shown in FIG. 17-16. One reason for tracking these values is identify content values that can later be used to construct a regular expression. Another reason is to permit reconstruction of any of the underlying lines from the master list, e.g., where the master list essentially provides a compressed collective view of every line that was used to construct the list.

Within a line of the log file, there may be sections of content that can be interpreted to have a meaningful label/type associated with it. For example, a sequence of numbers separated by the "." value such as "123.45.67.89" may be recognizable as an IP address. Therefore, instead of representing such sequences generically as integer, alpha, or string parse units, "field rule" types can be constructed that associate meaningful labels to these types of sequences. The field rule type may include a rule definition that correlates to combinations of characters, integers, and/or symbols associated with a given sequence of interest.

Figures 17, 18:
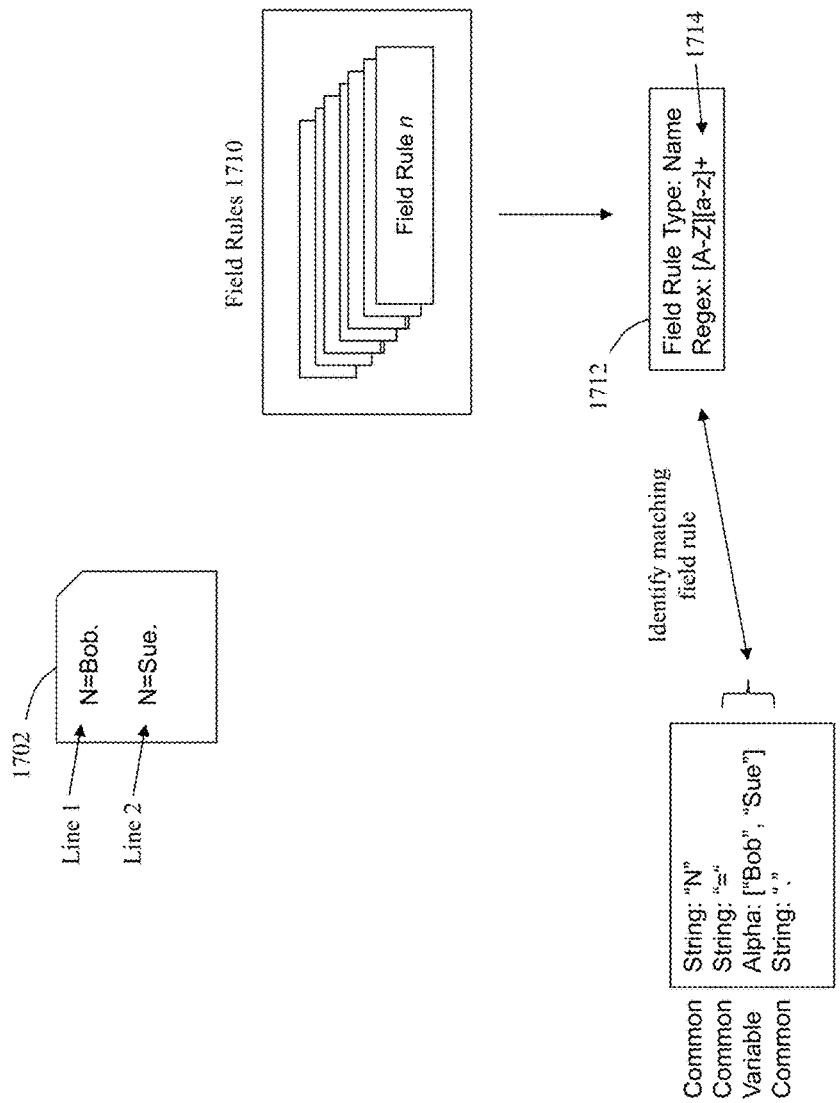
Figures 17, 18, 19:
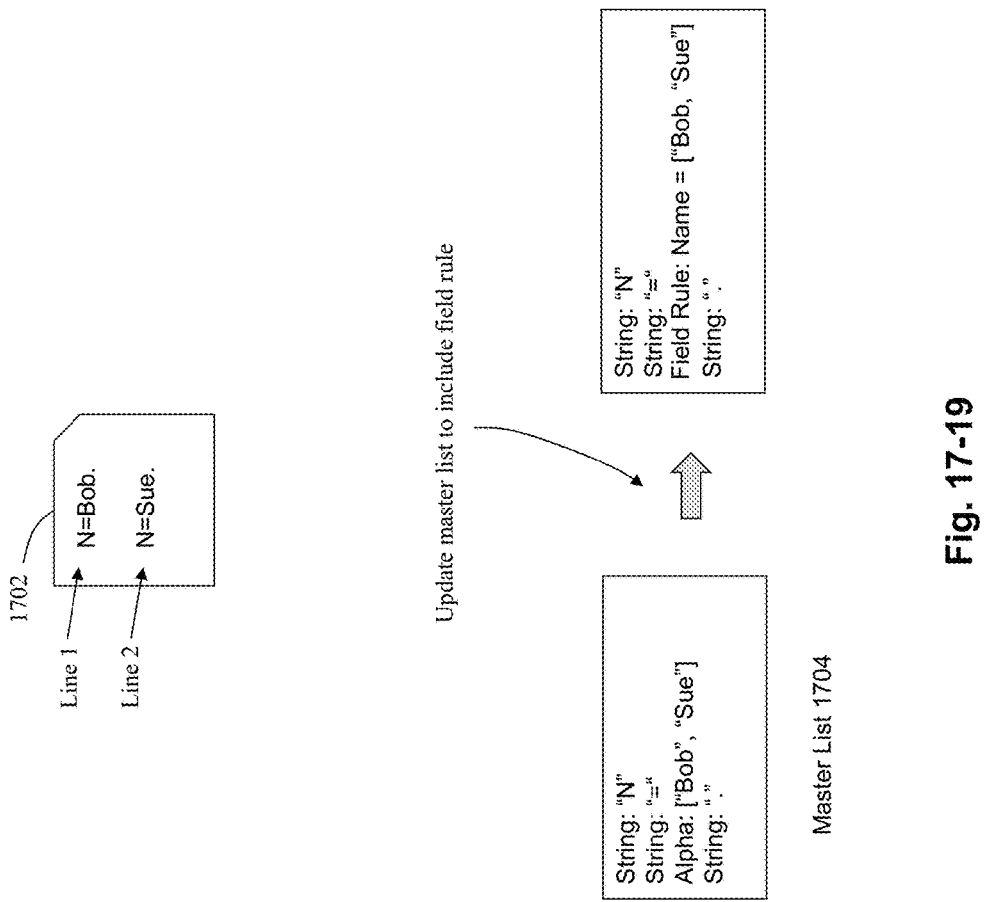

FIGS. 17-17 through 17-19 illustrate this process of identifying a field rule parse unit for the master list. As shown in FIG. 17-17, there may be any number of field rules 1710 that have been defined for the log analytics system. Each of the field rules correspond to a different type of sequence for which there is an interest in identifying a meaningful type for that sequence. Examples of field rule types include field rules for IP addresses, timestamps, identifiers, and the like.

FIG. 17-18 shows an example field rule 1712 that may be applicable to the variable portions of the master list. The field 1712 corresponds to a type (or name/label) of "Name", e.g., where the field rule may be applicable to identify a person's name. The field rule 1712 may be associated with a regular expression 1714 to identify the portions of the master list that correlate to the field rule. Here, the regular expression 1714 is "[A-Z][a-z]+". This regular expression corresponds to any sequence of characters where the first character is a capital letter (from A-Z), followed by any number of subsequent non-capital letters (from a-z). Here, the recorded set of data for the alpha parse unit of the master list (e.g., "Bob" and "Sue") matches the regular expression of this "Name" field rule. As shown in FIG. 17-19, the master list 1704 can thereafter be updated to replace the alpha parse unit type(s) with the field rule parse unit.

It is noted that processing of the master list to identify field rules may be performed in a post-processing action after construction of the master list—after analysis of multiple lines from the log file. Alternatively, the field rules may be identified as the lines are individually analyzed in a streamed manner. In another embodiment, field rules may be identified both during processing of the lines, and also afterwards in a post-processing step.

In some embodiments, the field rule processing is performed only for sections of the line that are identified as variable. Alternatively field rules may correlate to both constant and variable parts of the line.

Once a sufficient number of lines have been processed from the log file, a regular expression can be constructed from the master list. For example, as shown in FIG. 17-20, the regular expression "N=([A-Z][a-z]+)\." can be constructed which correlates to the values maintained in the master list 1704. In particular, the constant portions of the master list can be directly inserted within the regular expression. The portion of the regular expression that corresponds to the field rule can be pulled from the regular expression definition of the field rule itself.

Finally, as shown in FIG. 17-21, a log parser 1722 can be constructed for the log file. The log parser 1722 may include the regular expression that was constructed from the master list, where the regular expression correlates to a line definition for the log file that can be used to read and parse each line from the file. Other items of data/metadata may be included with the log parser 1722. For example, the log parser 1722 may be associated with a parser identification number/name, and/or associated with a file type identifier.

One key advantage of this approach is that diverse sub-patterns can be efficiently detected, which separately matches high-level patterns and then attempts to characterize variable portions that were not fixed parts of the high-level patterns, using sub-pattern detection. An example sub-pattern is key-value pairs.

This approach can also be used to define skeletal parts to construct a regular expression and build a parser that is capable of assigning parts of the expression to variables. This approach can also handle patterns that are below a similarity threshold by assigning variable parts to keep items in the same log consistent if possible. In some embodiments, the parser is generated for future processing rather than just categorizing.

Using this approach, logs having any level of complexity may be processed to construct a log parser. Consider the following log entries which are slightly more complex examples:

[11.22.33.44] Name=Bob Age=27
[10.20.30.40] Name=Sue Age=30

The present embodiment operates by walking through a selected set of the lines to identify commonalities between the lines, and to then construct a regular expression that can be used to generally parse through logs files containing similar lines of log entries. A master list can be constructed from the first line, which is compared against the second line. The analysis identifies the variable and non-variable parts of the line(s) being analyzed.

Assume that the first line (with name=Bob) was used to initially construct the master list. The next line (with name- Sue) is then analyzed to identify the variable and non-variable portions between the two lines. Here, the first portion of the line has the same common character "[". Moving from this character, it can be seen that there is an intervening range of different values until it reaches a closing bracket "]". The intervening range can optionally be considered to include common values for the "." characters. The rest of line similarly can be analyzed such that "Name=" and "Age=" portions are found to be common portions, while the range of characters after those common portions are found to be variable portions. The master line can be updated to reflect the common portions and the variable portions. In addition, the variable values can also be stored if desired.

The updated master line can then be processed to construct a regular expression from the commonalities. For the above example lines, the following identify the common portions, the variable portions, along with the values of the variable portions.

[{variable section 1} ] Name={variable section 2} Age={variable section 3}
Variable section 1: {11.22.33.44, 10.20.30.40}
Variable section 2: {Bob, Sue}
Variable section 3: {27, 30}

This can then be used to construct an appropriate regular expression to parse the lines from the logs. For example, the first portion of the line of the IP address may correspond to the following regular expression: "\[[0-9]*\.[0-9]*\.[0-9]*\.[0-9]*\.\]". It is noted that a field rule (defined to include this regular expression) may also be used to correlate this portion of a line to an IP address.

According to some embodiments, line pre-processing may be performed ahead of time to prepare the log data for processing. To explain, consider the example log file 1902 shown in FIG. 19. This log file 1902 includes four lines, where the first line includes "N=", the second line includes "Bob.", the third line includes "N=", and the fourth line includes "Sue.". This is exactly the same content as exists in two lines in file 1702 of FIG. 17-1, but is spread over four lines in file 1902. However, the problem is that a log parser generator that expects each line to be separately processed as a unitary unit would fail when faced with the log file structure shown in the log file 1902 of FIG. 19, since each log entry really encompasses two lines at a time (e.g., the first two lines as a first log entry and the third and fourth lines as a second log entry).

FIG. 18 shows the process flow of an embodiment to address this and other types of non-standard line format situations. At 1802, one or more lines are identified from the log file for pre-processing.

At 1804, the lines are analyzed for grouping purposes. One possible approach that can be taken to group lines together is to check timestamps of the lines. For example, it is possible in some systems that multiple lines that relate to one another only includes a timestamp for the first line. In this situation, lines are grouped together until another timestamp is identified. Even if each line includes its own timestamp, commonality of timestamp values permits multiple lines to be identified as parts of a unitary whole. As another alternative, clustering may be performed to cluster together grouping of lines that are supposed to link with one another. Another possibility is to perform pre-classification of lines to identify the line structures to identify lines that should be grouped together.

Once the groupings have been identified, then the grouped lines can be considered together for log parsing purposes. According to 1806a, one possible approach is to manipulate the lines so that grouped content appears within a single line. At 1806b, another approach is to categorize the multiple related lines into a single log entry for analysis purposes.

Portion 1904a of FIG. 19 illustrates the approach where grouped content is manipulated so that the content appears within a single line. Here, the original file 1902 includes four lines, where the first line includes "N=", the second line includes "Bob.", the third line includes "N=", and the fourth line includes "Sue.". The intent is for the first and second lines to be grouped with one another, while the third and fourth lines form another grouping. As shown in portion 1904a, the contents of the first and second lines are combined to form a single line having the content "N=Bob.". Similarly, the contents of the third and fourth lines are combined together for form another single line "N=Sue.". Each of these newly formed single lines are then processed for generation of a log parser.

In the alternative approach shown in portion 1904b, a new line is not created to combine multiple related lines together. Instead, the multiple lines are merely logically grouped together as a single log entry for analysis purposes. As shown in portion 1904b, a first logical log entry 1906s is formed by the first two lines and a second logical log entry 1906b is formed by the third and fourth lines. The master list described above would be constructed by walking through the elements of both lines that pertain to a common logical log entry. In this situation, the "newline" character that separates the lines within a single log entry can be considered as merely another character to be identified and processed within the master list for a given entry.

As previously noted, sequential sections of a log line can be considered as a unit when constructing a log parser. Delimiters within the line can be identified to determine the sequential sections to identify. Each lines can be considered for its common portions and variable portions, where common portions may correspond to a delimiter that separates one or more elements within the variable portions as a sequence of elements for analysis. For example, in the first line of the log file 1702 shown in FIG. 17-1, variable portion "Bob" is bordered by common portions "N=" on the left side and "." on the right side. Similarly for line 2, variable portion "Sue" is bordered by common portions "N=" on the left side and "." on the right side. Therefore, common element "." can be identified as a delimiter that sets the variable portion preceding it (e.g., "Bob" or "Sue") apart from other portions of the line for analysis.

However, the simplistic solution of just identifying common portions as a delimiter fails if one or more of the common portions should really be considered part of the content section that should analyzed as a unit. To illustrate this problem, consider the log file 2102 shown in FIG. 21-1. Here, line 1 and line 2 have common portions at both the fourth element position (having the letter "o" in both lines at that position in the lines) and at the sixth element position (having "." in both lines at that position). As a human observer, it is fairly easy to determine that "." should be the delimiter (and not the "o" character), since the letter "o" forms part of the name for both the "Bob" and "Tod" letter sequences. This is a much more difficult problem, however, to identify the correct delimiter when performing automated processing of lines, especially when facing these lines without having a priori knowledge of the line contents. This is particularly true since an automated processing system may not have advance knowledge of the "name" type as being part of the line structures. Indeed, the very process described herein will be used to discover such types within log line structure even without pre-knowledge of the line structures.

According to some embodiments, an inventive approach is provided to identify which of one or more common elements within a line should be considered a delimiter. The approach operates by walking through a line to identify common elements, where a combination of the element position and element weight are considered to determine a score for each common element. The element having the greatest score (or least score depending upon how the score is calculated) can then be identified as the delimiter.

Figures 17, 18, 19, 20:
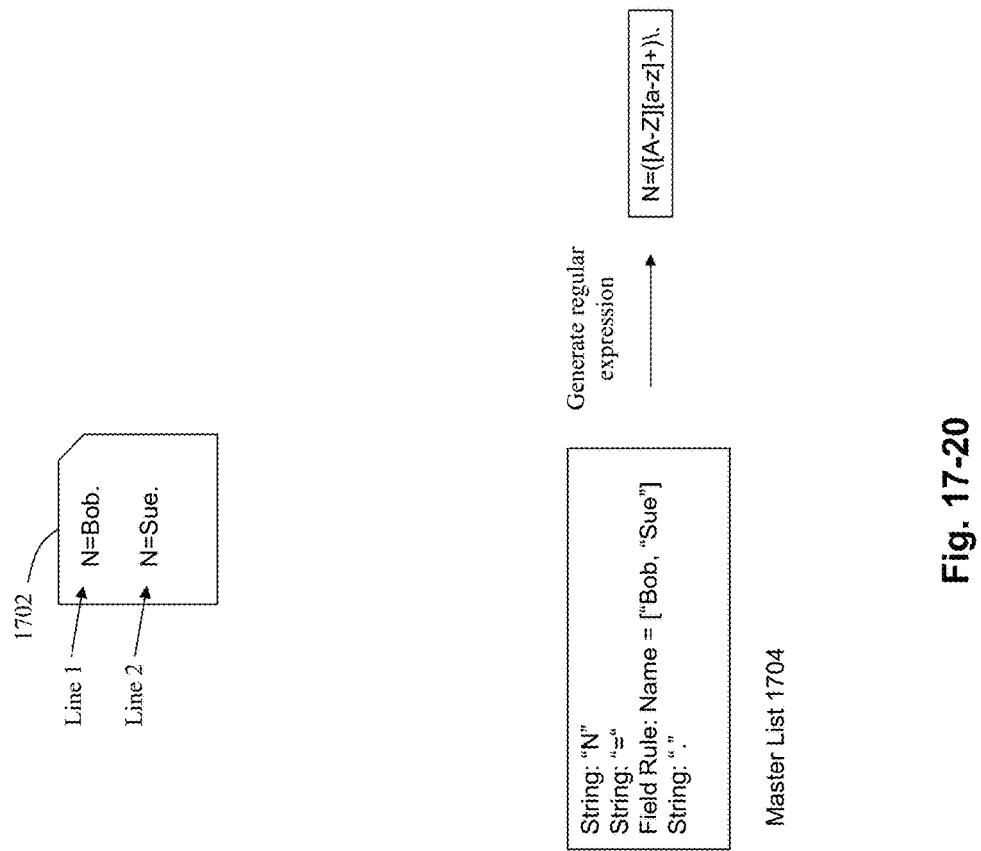

FIG. 20 shows flowchart of an approach for efficiently identifying the correct delimiter elements within a set of log content according to some embodiments of the invention. At 2002, the line content(s) for at least two lines are walked to identify a common element that borders a variable portion of the line, e.g., from left to right within the line.

At 2004, the process then iterates through the rest of the line to identify additional common element(s) within the line. There may be any number of one or more additional common elements.

At 2008, scoring is calculated for each of the identified common elements. The position of the common element within the line is first determined for the scoring. The general idea is that all else being equal, a possible delimiter that is found earlier (e.g, closer to the left side when walking from left-to-right within the line) should be the first delimiter to be considered. For example, consider the following line: "Names:Bob Joe Sam". In this example line, there is a first space between "Bob" and "Joe", and a second space between "Joe and "Sam". In this situation, both spaces may be delimiters, but the first space (the one to the left between "Bob" and "Joe") should be first identified. Only afterwards, as the delimiter identification process is run again, will the second space (between "Joe" and "Sam") be identified as the next delimiter. Therefore, when choosing between the first space and the second space, the position of the first space should receive a more prominent score than the second space. This is accomplished, at 2010, by providing a score factor determined by the position of the element within the line. For example, either a sum or an average of the position of the element can be identified and associated with the element.

Figure 22:
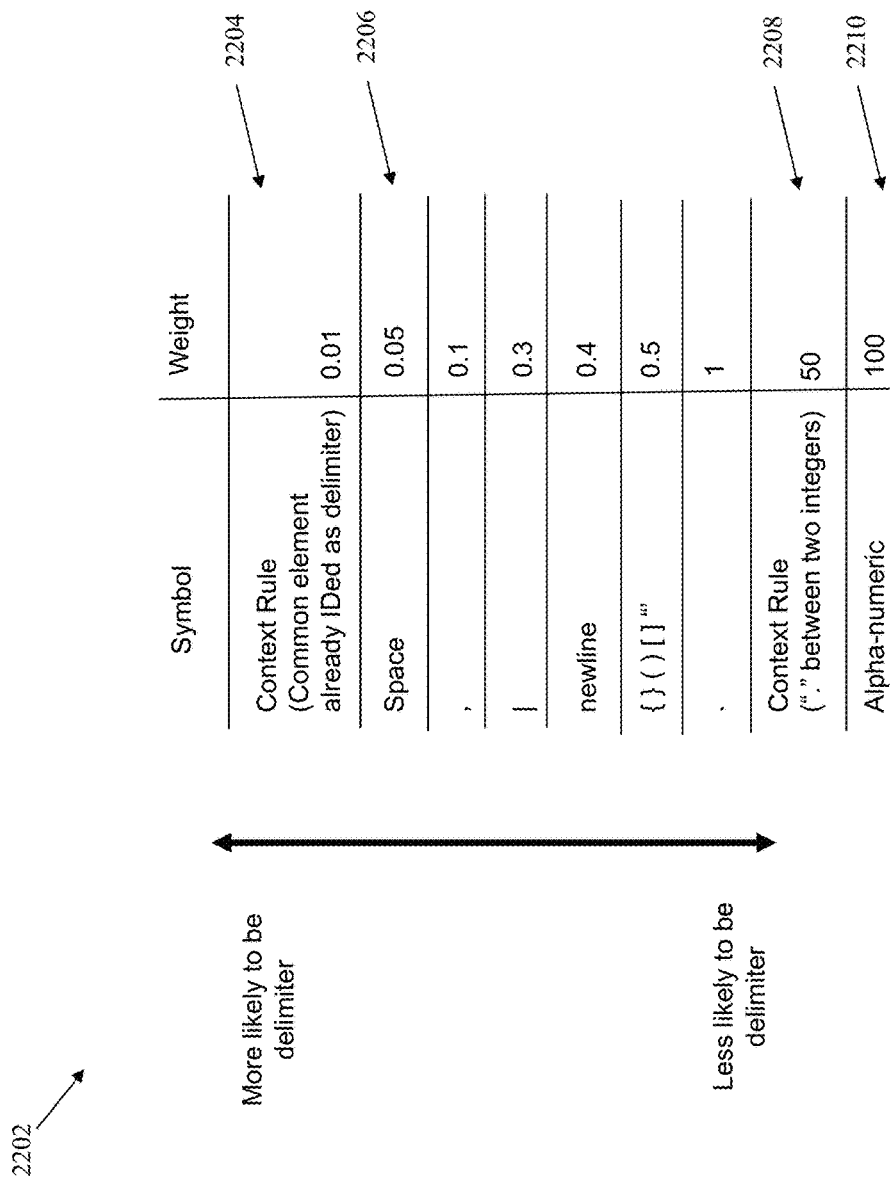
FIG. 22 shows some example weights that may be applied to common elements in some applications of the invention.

In addition, the type of element that is found should also be factored into the delimiter score for the element. This is accomplished, at 2012, by applying a weighting factor to the identified common element(s) within the line. FIG. 22 shows a chart 2202 having some example weights that may be applied to the identified common element in some applications of the invention. In particular, this figure is based upon the assumption that the lower the score, the more likely an element is found to be the delimiter. Therefore, each type of element shown in FIG. 22 is associated with a weighting factor, where the element type more likely to be a delimiter has a smaller weighting factor, and the element type less likely to the delimiter is associated with a greater weighting factor. In this example, a space is highly likely to be considered as a delimiter; therefore, as shown in row 2206, this element type is associated with a very small weighting factor. On the other hand, alpha-numeric characters are considered to be among the least likely elements type to be delimiters; therefore, as shown in row 2210, this element type is associated with a very high weighting factor.

Weighting factors may also be associated with more complex rules that consider combinations of elements. For example, since a typical IP address has sequences of numbers interspersed with the "." element, this means that a "." set between two sequences of integers is less likely to be a delimiter and more likely to be part of an IP address field. In addition, non-integer numbers (e.g., floating point numbers) may include a decimal between two numbers (e.g., for "." element between two number elements in "2.3"), which also makes the "." element unlikely to be a delimiter and more likely to be part of the numeric value in this situation. Therefore, as shown in row 2208, this combination of elements may be associated with a rule that identifies the "." element between two integers, where this rule is associated with a weighting factor to bias against "." in this type of combination of elements from being a delimiter.

As another example rule, consider when a given character has already been found to be a delimiter in a line. In this situation, that same character located later in the same line is very likely to also be a delimiter, e.g., where a "=" element found to be a delimiter for a key-value pair earlier in a line is very likely to also be a delimiter for other key=value pairs later in the same line. Therefore, as shown in row 2204, a rule for this situation can be associated with a weighting factor to bias heavily in favor of an element previously identified as a delimiter as being considered again as a delimiter.

Once the scores have been calculated, then at 2014, a delimiter can be identified from comparing the scores of the different possible delimiters. For example, if the scoring is configured such that lower scores correspond to a greater likelihood of being a delimiter, than the element in the line(s) having the lowest calculated score would be identified as the delimiter. The process can then be repeated to identify any number of additional delimiters (if they exist) within the line.

It is noted that while this example calculates delimiter scores where the lowest score is the most likely to be a delimiter, an application of the principles disclosed herein may also operate to calculate scores where the highest scores correspond to the most likely delimiters. In this alternate approach, the weighting factors would be configured such that the element types most likely to be delimiters would be associated with higher weighting factors, and the element types less likely to be considered delimiters would be associated with lower weighting factors.

Figures 17, 18, 19, 20, 21:
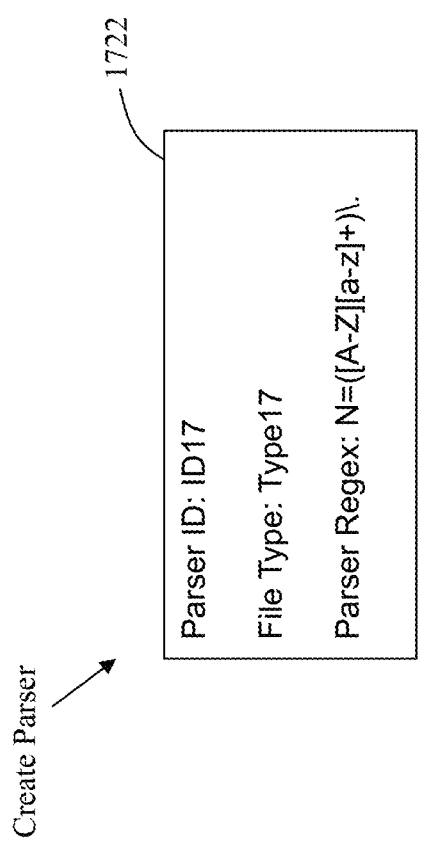
Figure 18:
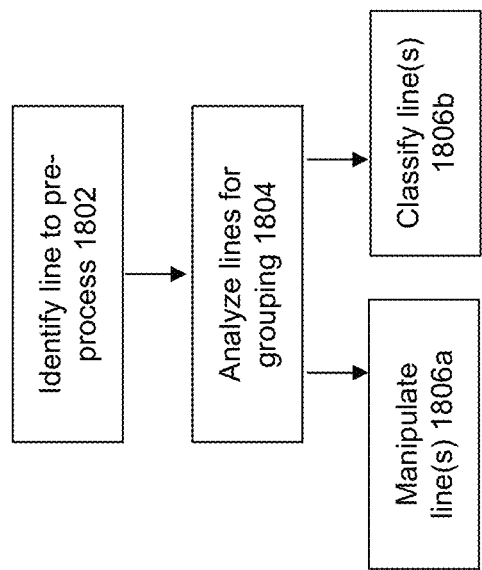
Figure 19:
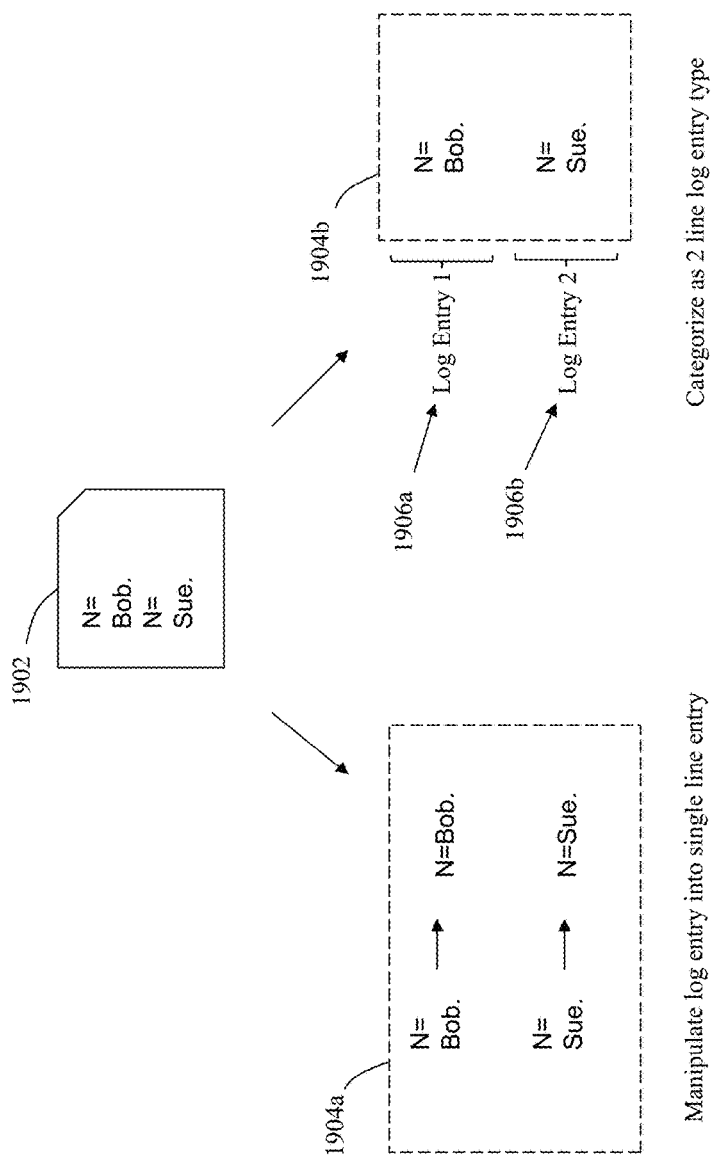
Figure 20:
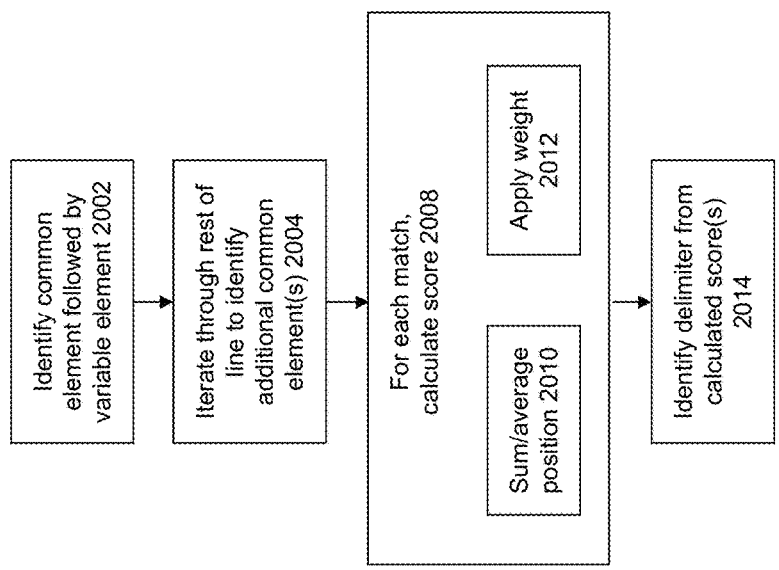
Figures 1, 21:
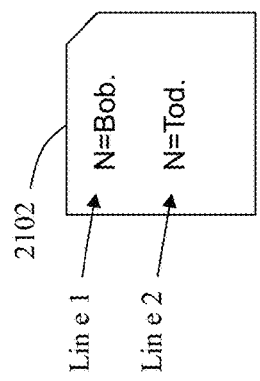
Figures 2, 21:
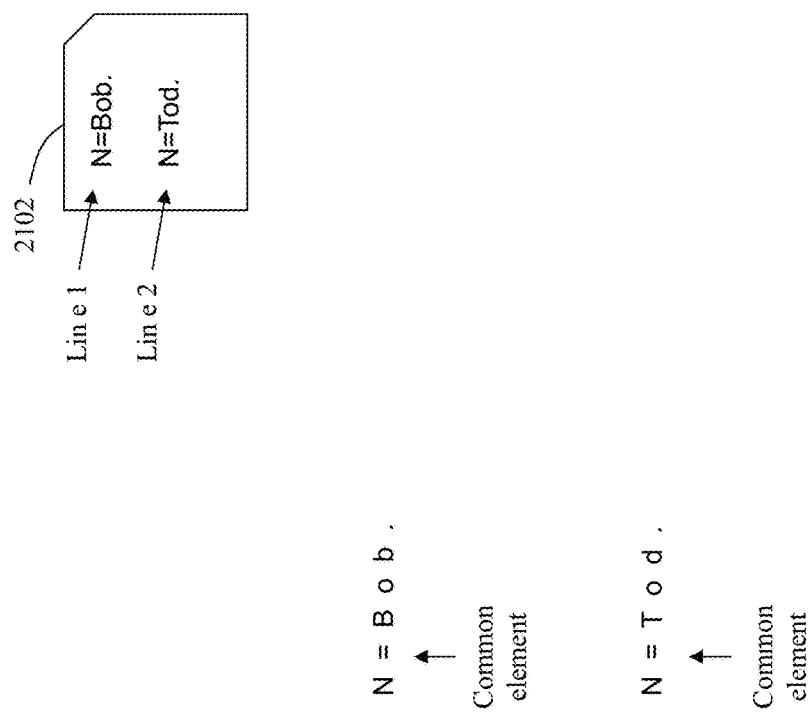
Figures 3, 21:
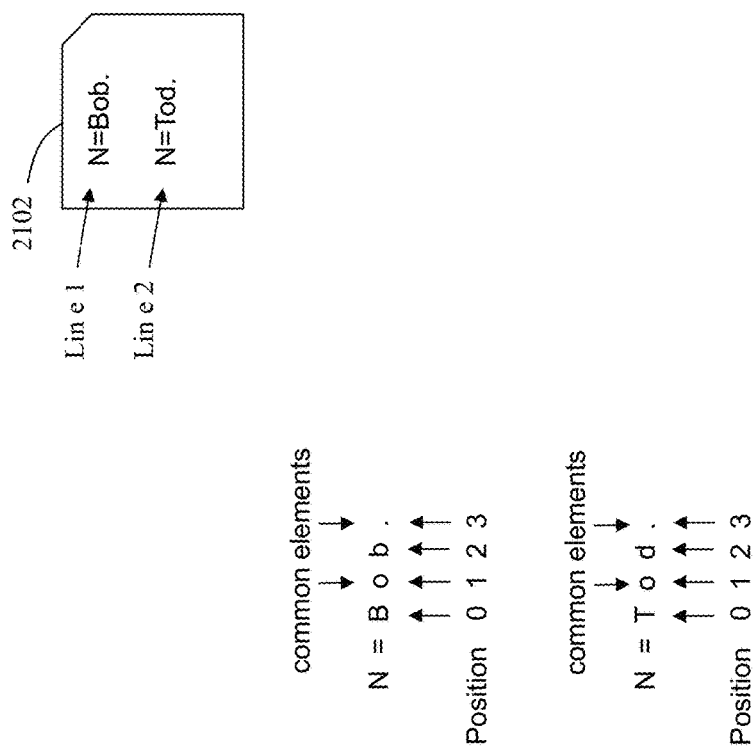
Figures 4, 21:
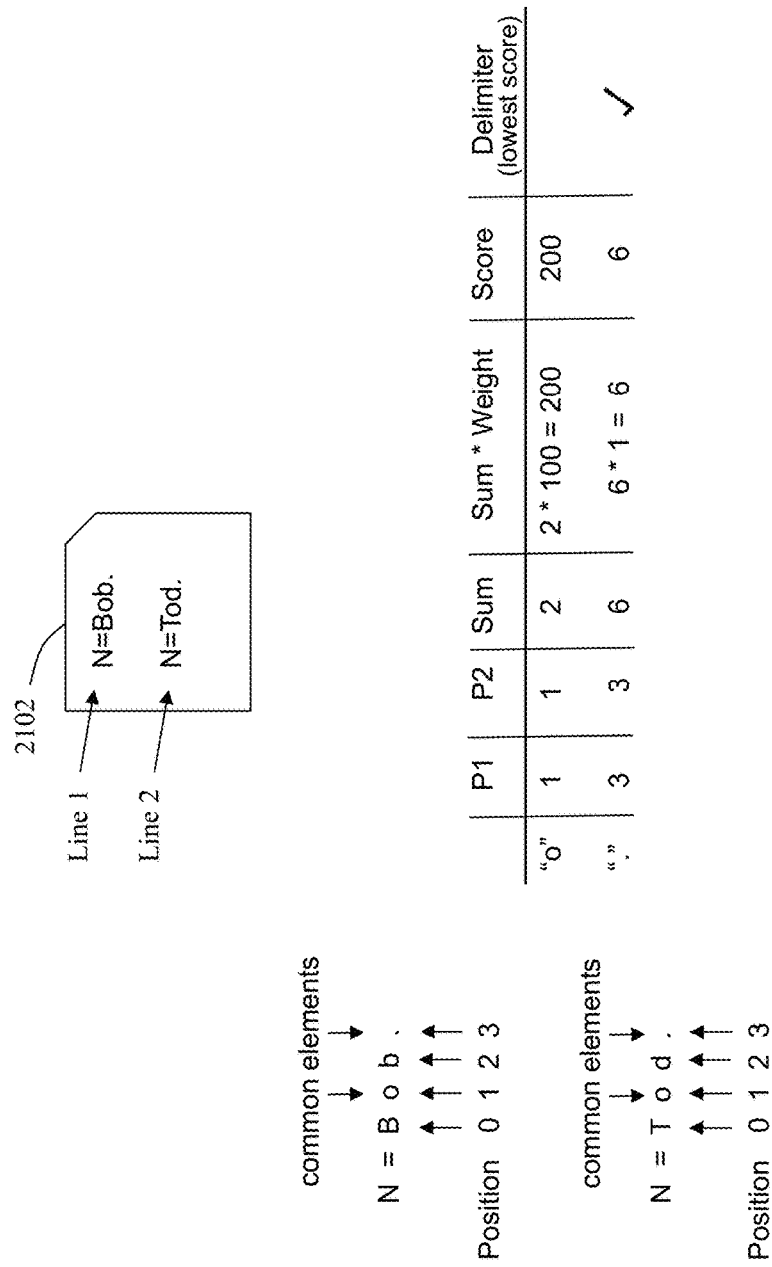
Figures 5, 21:
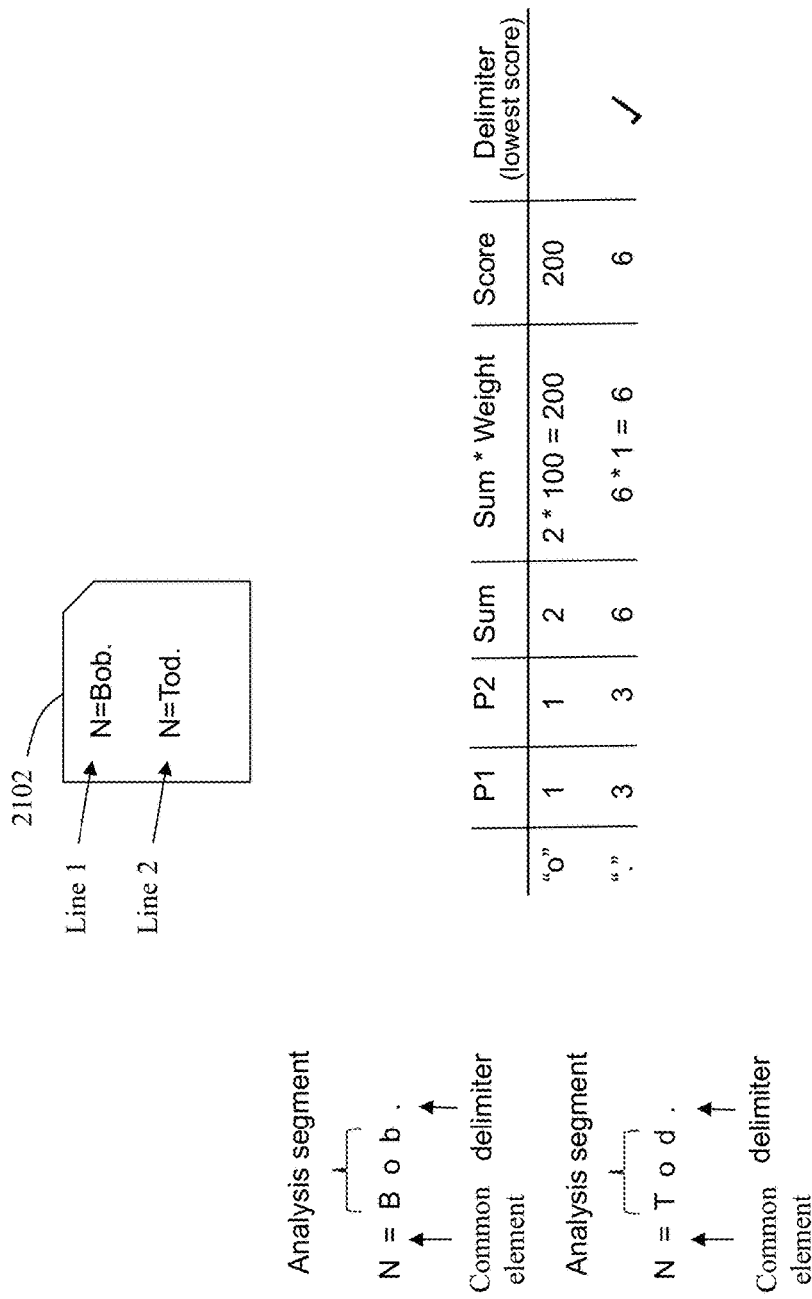

FIGS. 21-1 through 21-5 illustrate the delimiter identification process. FIG. 21-1 shows a log file 2102, where line 1 corresponds to "N=Bob." and line 2 corresponds to "N=Tod.". As shown in FIG. 21-2, a leftward common element "=" is found in both lines. The process then iterates through the rest of the lines to identify more common elements. As shown in FIG. 21-3, it can be seen that "o" is a first common element and "." is a second common element.

A delimiter score will then be calculated for each of these two common elements. FIG. 21-4 illustrates the process of calculating the score for each of these elements. First, the relative position for the element within the line is calculated for each line. For element "o", this element exists at position 1 for each line. Therefore, the sum of these position values is 2. For element ".", this element exists at position 3 for each line. Therefore, the sum of the position values is 6.

Next a weighting factor is identified for each element. FIG. 22 shows example weighting factors that may be used in the current scoring calculations. For element "o", this is an alpha-numeric character, which is associated with a weighting factor of 100 in the chart of FIG. 22. For element ".", this is associated with a weighting factor of 1 in the chart of FIG. 22.

The score is calculated in this example by multiplying the weighting factor by the sum of the position locations for the element. For the "o" element, the score would therefore be position sum (2)*weighting factor (100)=delimiter score of 200. For the "." element, the score is the position sum (6)*weighting factor (1)=delimiter score of 6.

The scores are then compared to identify the lowest score, where the element having the lowest score is considered the delimiter. Here, the "." element has a lower score than the "o" element (6<200). Therefore, the "." element is identified as the delimiter.

As shown in FIG. 21-5, the analysis sections "Bob" and "Tod" can now be identified between the "=" element and the delimiter ".". In this case, identification of "." as the delimiter (instead of "o") produces the correct result, since it can be seen that the "o" character is indeed part of the analysis segment rather than the delimiter, even though it is a common element between the two lines.

Another technique that may be applied in some embodiments is to automatically perform key value extraction from the log data. This approach is particularly useful, for example, to implement the extended field definitions that were described above. The current embodiment is implemented by identifying the first and last key value pair dividers in the lines, and to then process the content in-between with split functionality to extract the key value data.

Figure 23:
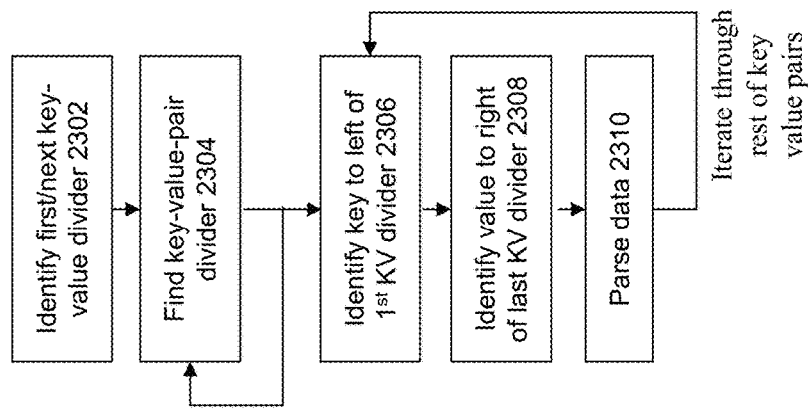
FIG. 23 illustrates a flowchart of an example approach to perform key value extraction.

FIG. 23 illustrates a flowchart of an example approach to perform key value extraction. The process begins at 2302 by analyzing a line and identifying the first key-value divider that it sees. The key-value divider can be, for example, the "=" character. The process exits if no appropriate key value divider is found in the line.

Next, at 2304, an attempt is made to find a key-value (KV) pair divider (with a break if the KV divider is found). This pair divider can be, for example, the space between different key-value pairs. The process loops through this step to find additional pair dividers. This therefore identifies the range of key-value pairs that exist within the line for processing.

The process then returns back to the beginning of the identified range to extract key-value content. At 2306, identification is made of the key to the left of the very first key value divider. At 2308, the value to the right of the last KV divider is identified. At 2310, the identified portion of the line is then parsed to identify the key values. For example, the "split" function from Java or Perl can be used to perform this action. For the current line, this action therefore identifies the key values for each of the key value pairs in the lines. This approach therefore can be used to automatically perform key value extraction. The process iterates through the rest of the key value pairs in the identified range to extract the key value data for all of the key value pairs.

Figures 1, 24:
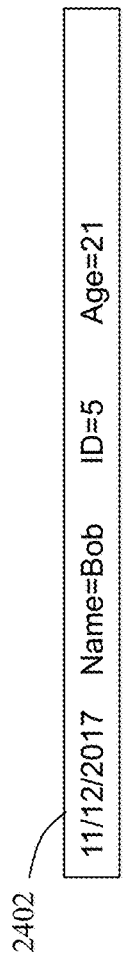
Figures 2, 24:
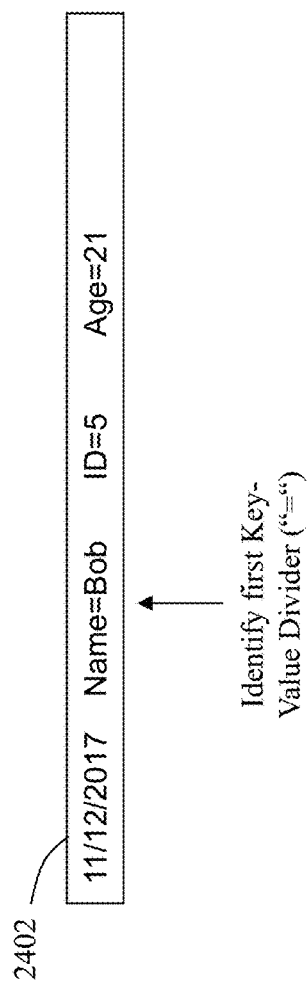
Figures 3, 24:
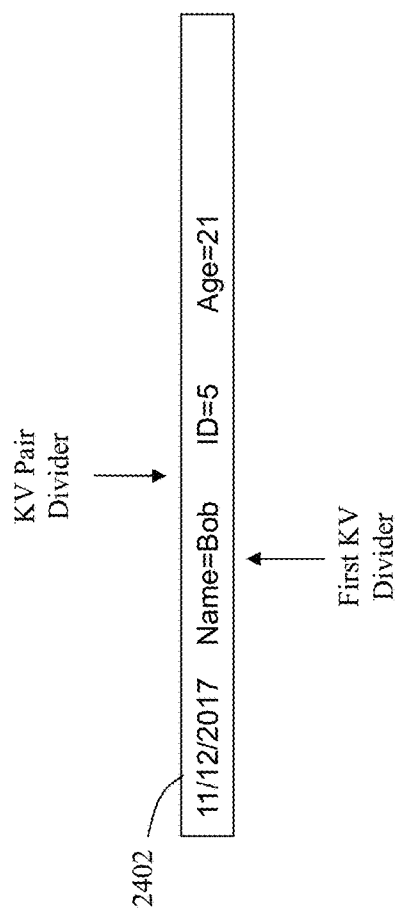
Figures 4, 24:
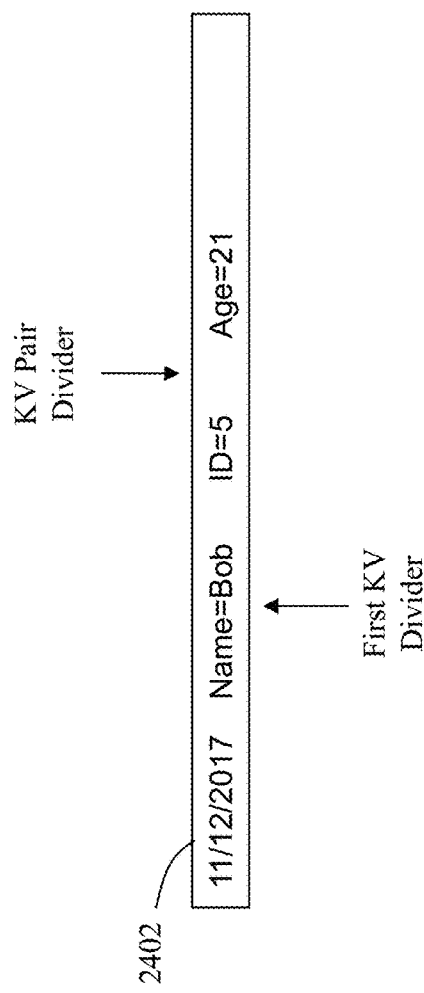
Figures 5, 24:
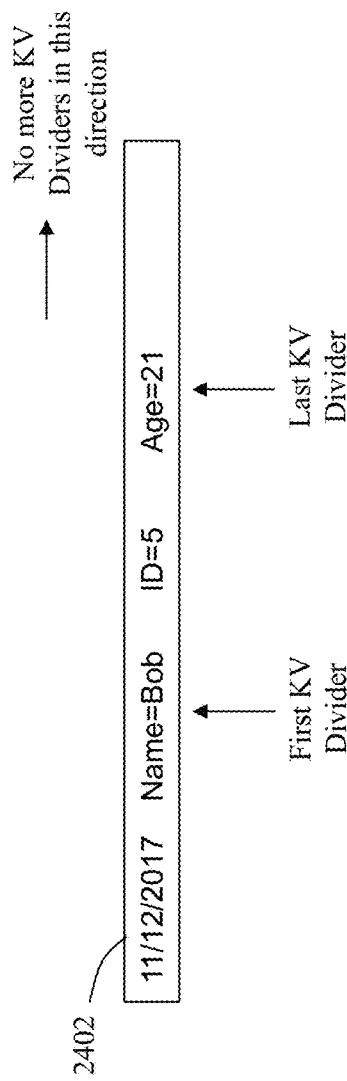
Figures 6, 24:
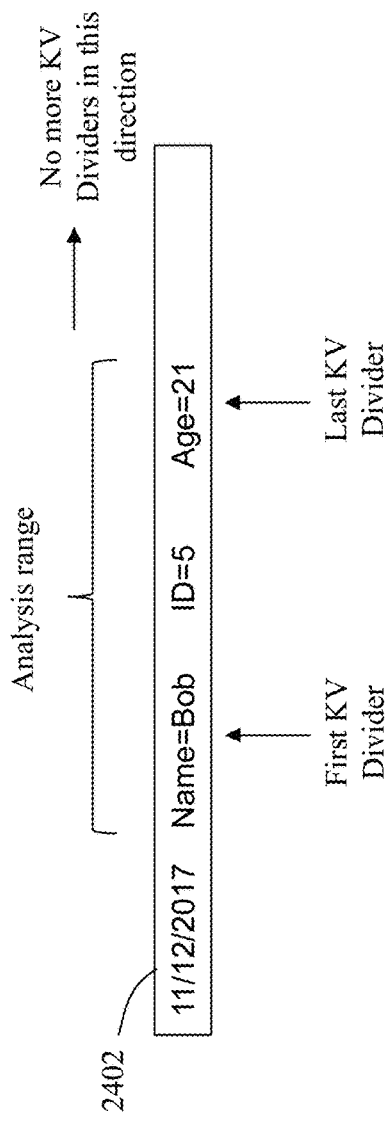
Figures 7, 24:
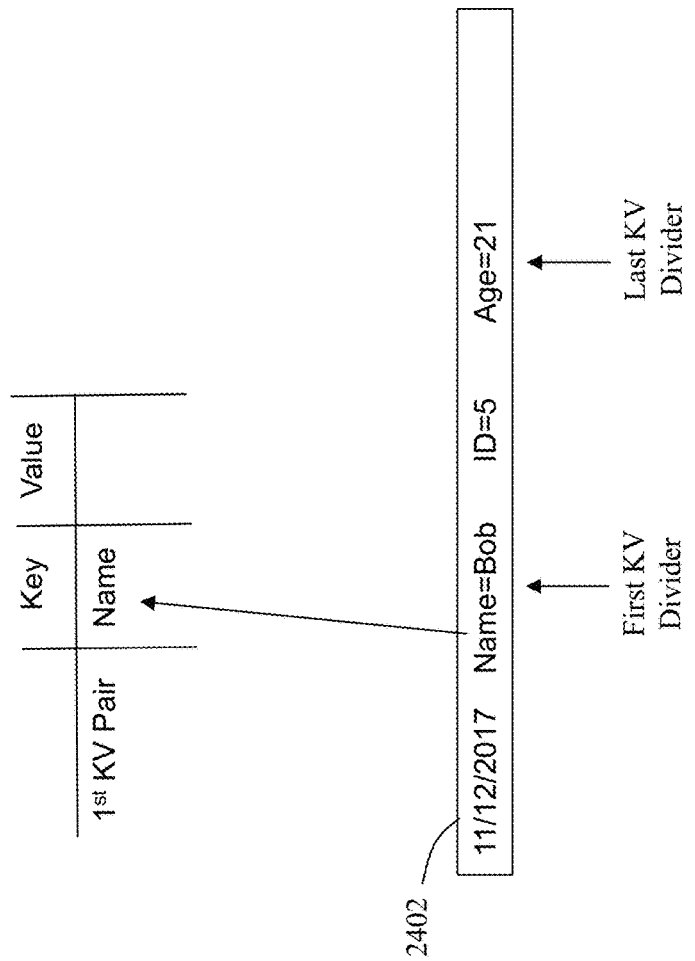
Figures 8, 24:
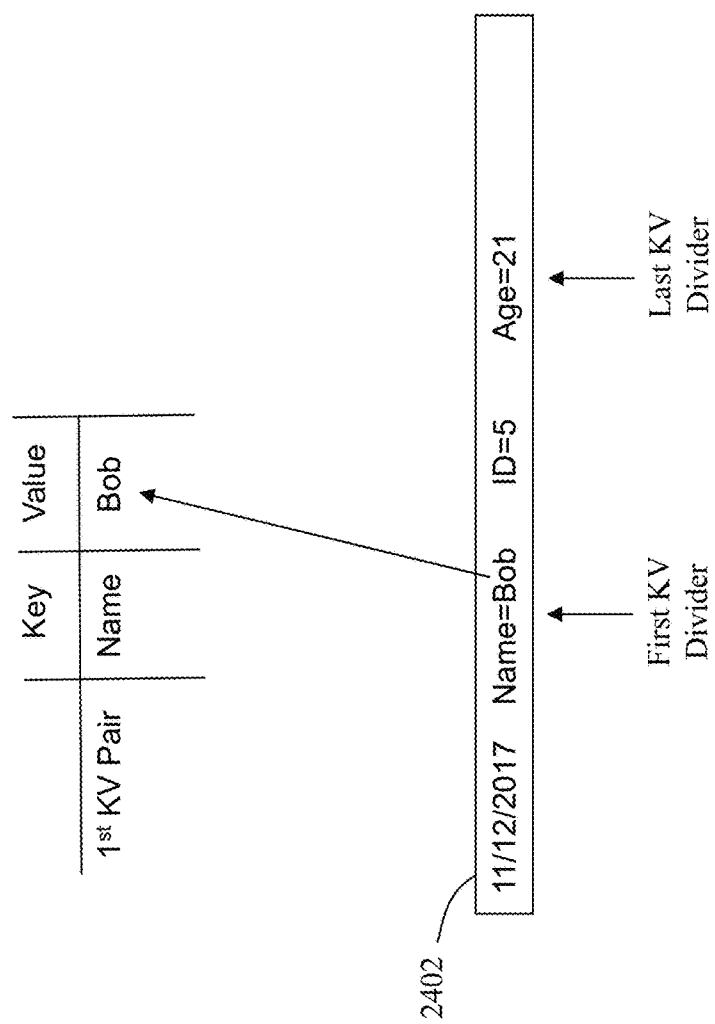
Figures 9, 24:
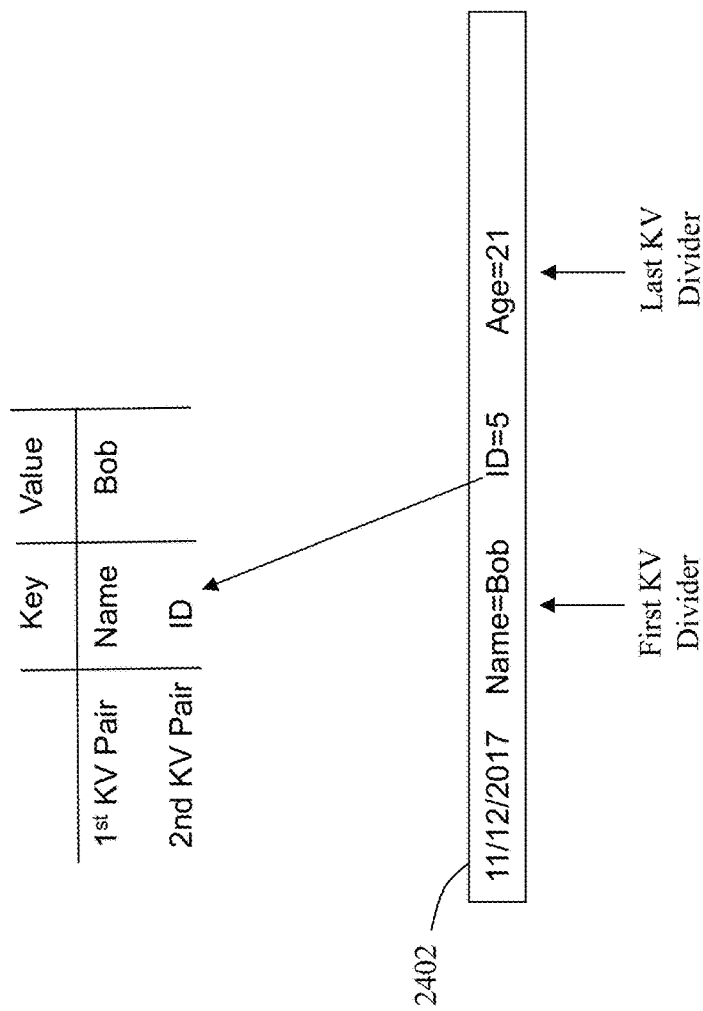
Figures 10, 24:
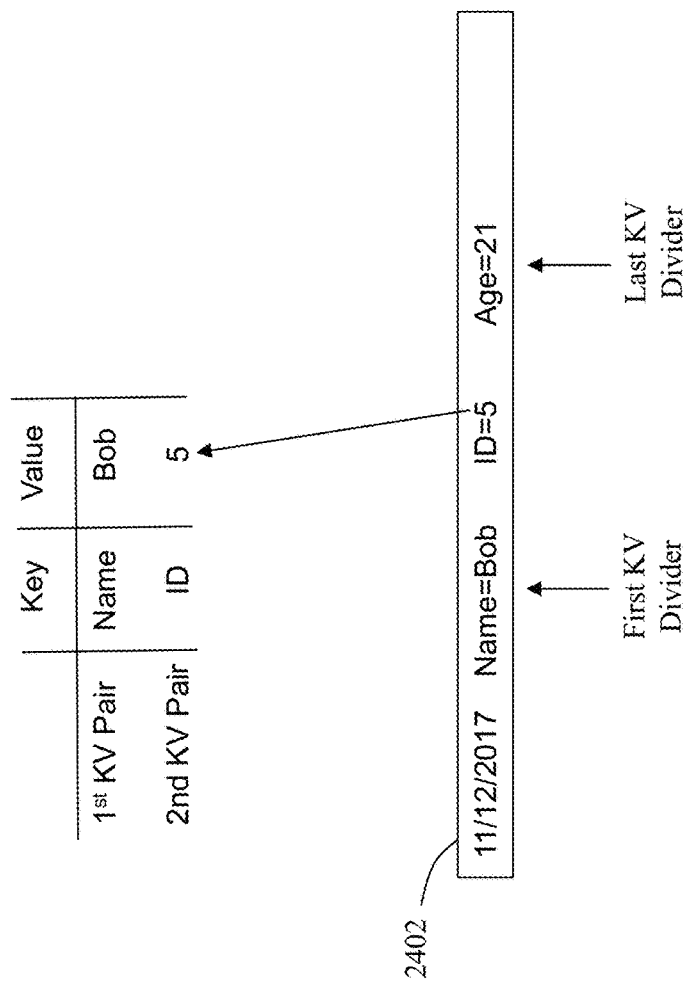
Figures 11, 24:
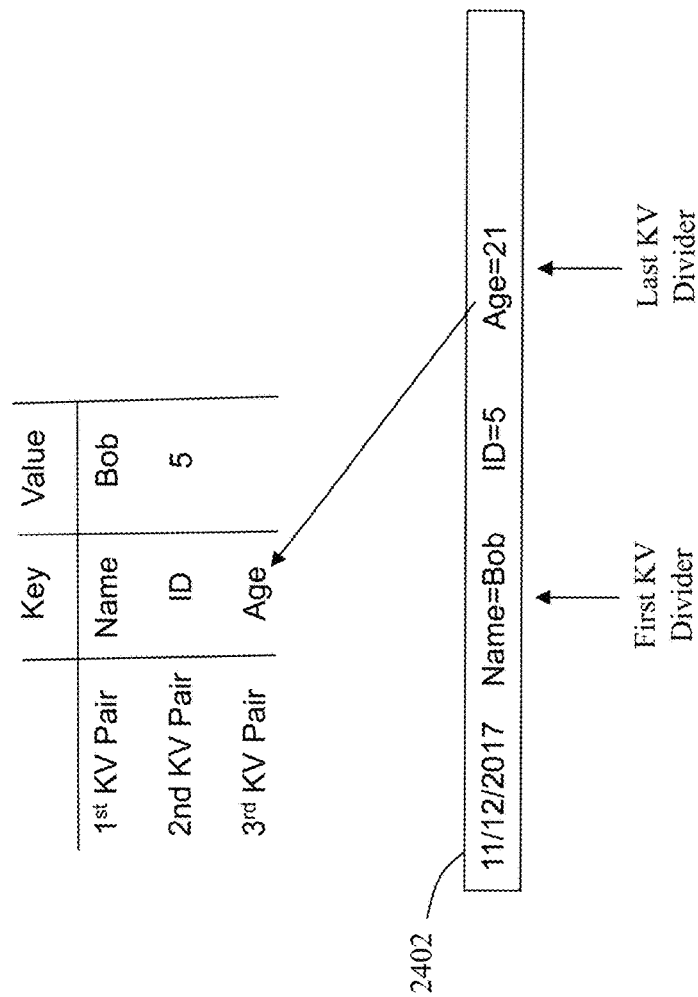
Figures 12, 24:
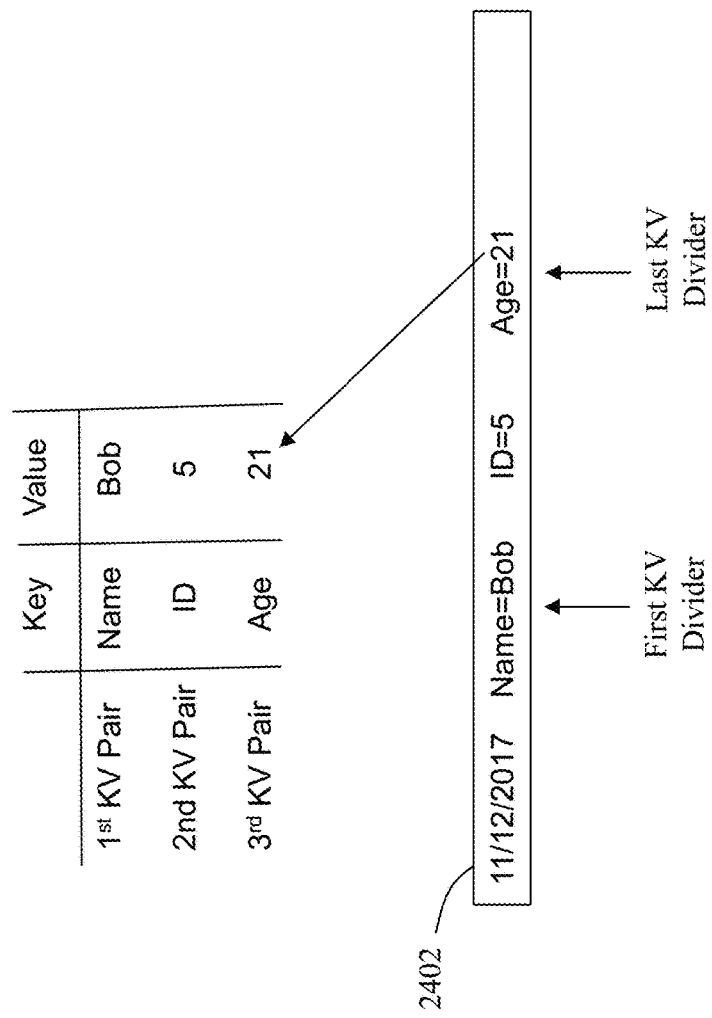

FIGS. 24-1 through 24-12 illustrate this process. FIG. 24-1 shows an example line 2402 from a log file having the following content: "11/12/2017 Name=Bob ID=5 Age=21". As shown in FIG. 24-2, the process begins by analyzing the line 2402 and identifying the first key-value divider that is seen. The key-value divider can be, for example, the "=" character. Here, the search for the first key-value (KV) divider finds the "=" character within "Name=Bob".

Next, as shown in FIG. 24-3, an attempt is made to find a key-value pair divider. This divider can be, for example, the space between different key-value pairs. In line 2402, this identifies the space between the key-value-pair (KVP) "Name=Bob" and the next KVP "ID=5". The process loops through this step to find additional pair dividers. For example, as shown in FIG. 24-4, another pair divider is found between KVP "ID=5" and the next KVP "Age=21". As shown in FIG. 24-5, no further key value pairs are identifier to the right of KVP "Age=21" in line 2402.

At this point the range of analysis has been identified for the key-value content extraction process. As shown in FIG. 24-6, the analysis range spans from the KVP "Name=Bob" to the KVP "Age=21".

Processing will now occur to extract the "key" and the "value" for each key value pair. As shown in FIG. 24-7, identification is made of the key to the left of the first KV divider. In the example line, the first KV divider is located between "Name" and "Bob". The key to the left of this divider is therefore "Name". Next, as shown in FIG. 24-8, the value to the right of the KV divider is identified. In the example line, the value to the right of the divider is "Bob". These values can be recorded into any suitable structure, such as a database table or key-value data structure.

Processing then proceeds to the next key value pair. As shown in FIG. 24-9, identification is made of the key to the left of the next KV divider. In the example line, the KV divider is located between "ID" and "5". The key to the left of this divider is therefore "ID". Next, as shown in FIG. 24-10, the value to the right of the KV divider is identified. In the example line, the value to the right of the divider is "5". These values are recorded into the appropriate storage structure.

Processing then proceeds to the last key value pair. As shown in FIG. 24-11, identification is made of the key to the left of the final KV divider. Here, the final KV divider "=" is located between "Age" and "21". The key to the left of this divider is therefore "Age". Next, as shown in FIG. 24-12, the value to the right of the KV divider is identified. Here, the value to the right of the divider is "21". These values are recorded into the appropriate storage structure. At this point, all of the key value pairs have been identified, and extracted to the key-value storage structure.

Additional optimizations may be performed to efficiently extract key-value content from the log files. To explain, consider again the log file line 2402 shown in FIG. 24-6. The analysis section that has been identified for this line 2502 is fairly straightforward to process, since it only contains key-value pairs for processing. Therefore, iterative application of the above-described approach to check for keys and values on either side of the KV divider "=" will arrive at the correct key/value data for each key value pair.

Figures 1, 25:
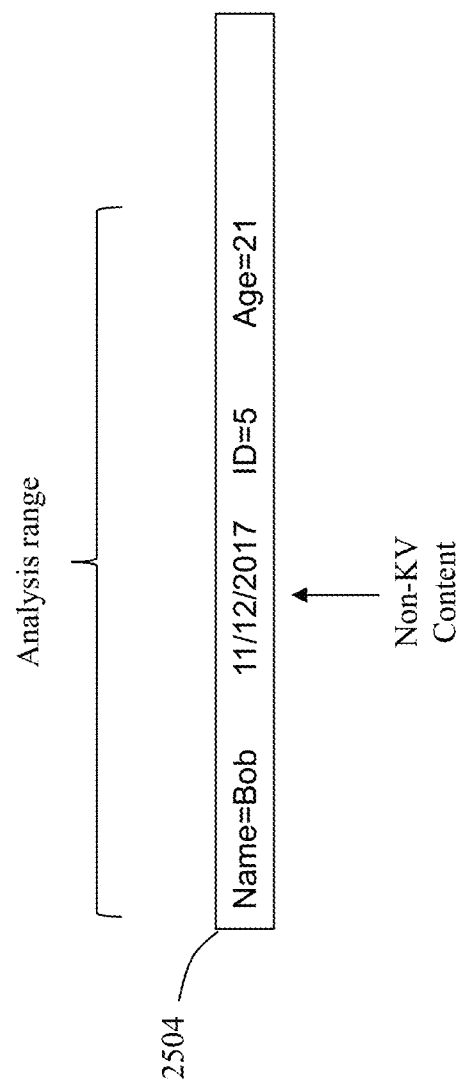
Figures 2, 25:
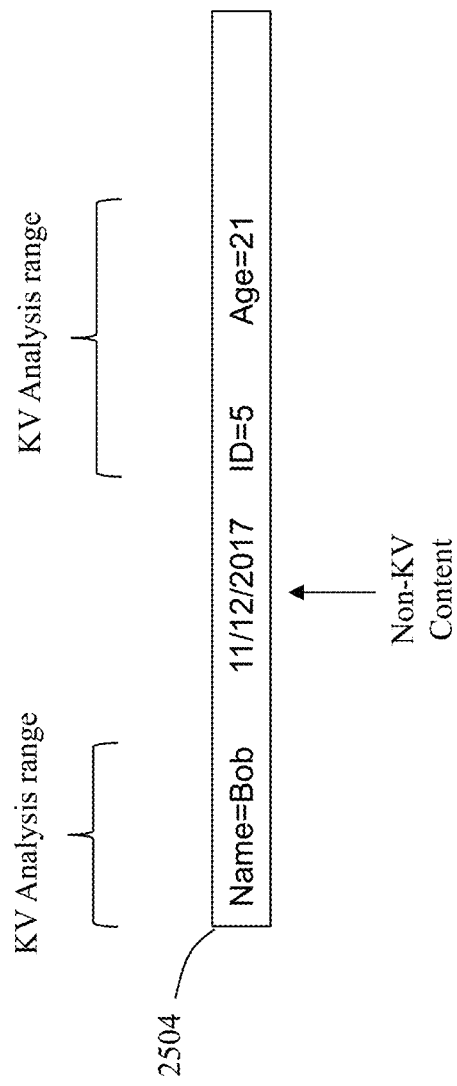

However, as shown within line 2504 of FIG. 25-1, there is a possibility that non-key-value content may exist within the boundaries of the analysis range. In this case, the date content "11/12/2017" appears within the analysis range. Therefore, simplistic application of a process that checks only for values to the left/right of the KV divider "=" may end up with incorrect assignment of this content to either the value content of the preceding KV pair (e.g., where key is "Name" and the value for this key is mistakenly identified as "Bob 11/12/2017"), or with incorrect assignment of the content to the subsequent key content (e.g., where key is mistakenly identified as "11/12/2017 ID and the value for this key identified as "5").

This problem cannot be corrected merely by considering the space character as the delimiter for identifying keys and values. This is because certain keys and/or values may intend to include spaces as part of the key/value content. To explain, consider the line 2506 shown in FIG. 26-1. In this line, the first KV pair has "Name" as the key. The value for this key is supposed to be "Bob Smith", with a space between "Bob" and "Smith". Therefore, any approach that always considers a space to be a delimiter would incorrectly assign only the "Bob" portion as the value, and fail to incorrectly identify "Smith" as part of the value content.

Figures 1, 26:
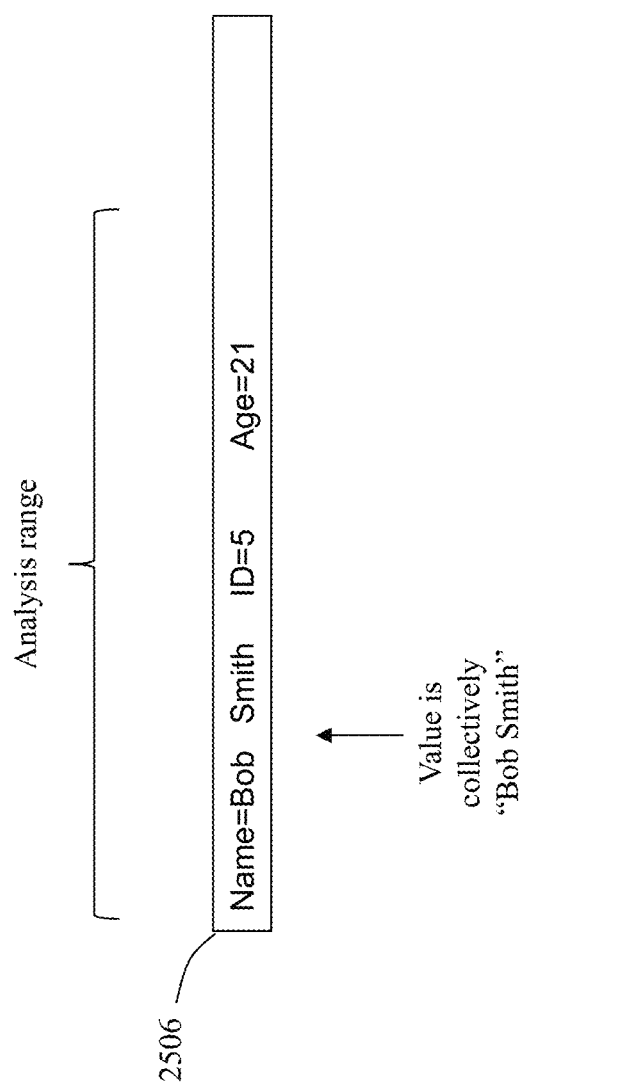
Figures 2, 26:
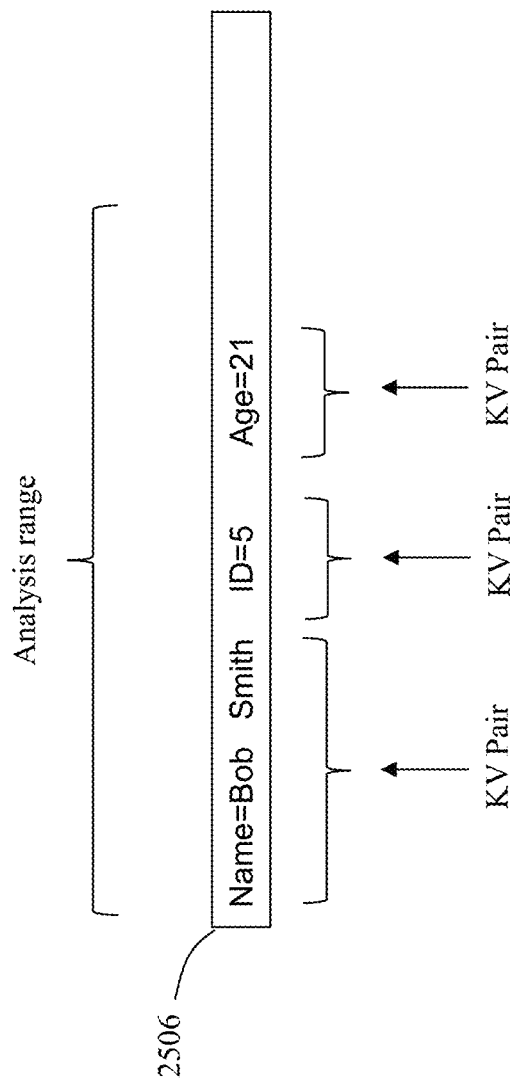

One possible approach to address this problem is to perform pre-processing to classify portions of the line, so that key-value portions of the lines can be identified for key-value extraction. With this approach, the non-KV portion of line 2504 in FIG. 25-1 can be correctly identified (e.g., as a date field), and the key-value extraction process described above would therefore ignore this portion of the line. As shown in FIG. 25-2, this would result in multiple analysis ranges that under KV extraction. This approach can similarly be used to address line 2506 shown in FIG. 26-1, where the first KV pair has "Name" as the key and the value for this key is supposed to be "Bob Smith", with a space between "Bob" and "Smith". Any approach that considers a space to be a delimiter would incorrectly assign only the "Bob" portion as the value, and fail to incorrectly identify "Smith" as part of the value content. However, pre-processing may be employed to identify the fact that a space may exist within the value field for this key value pair, and as shown in FIG. 26-2, will identify the correct portions of the line for the various key value pairs, where the space element between "Bob" and "Smith" is considered part of the value field and not a delimiter. The approach described in U.S. application Ser. No. 14/863,136, filed on Sep. 24, 2015 can be used to identify pattern signatures to implement this approach, and which is hereby incorporated by reference in its entirety. The pattern signature may correspond to KV signatures (e.g., where a recognized KV divider such as "=" separates recognizable key and value portions), which serve to identify the KV analysis portions of the line (and to ignore non KV portions of the line).

Another approach is to perform post-processing to correct any problematic assignments of content to the key or value fields. This approach can be used, for example, to check for incorrect type(s) of values within the key value fields. To explain, consider line 2506 shown in FIG. 25-1, and consider that simplistic application of a process that checks only for values to the left/right of the KV divider "=" may end up with incorrect assignment of the date content to the value content of the preceding KV pair, e.g., where key is "Name" and the value for this key is mistakenly identified as "Bob 11/12/2017". A rule may be configured for the log analytics system that restricts the range of type elements within a field recognizable as a "Name" field, which excludes the "/" character from a valid name. In this situation, the post-processing would be able to identify the incorrect portion of the value field based upon the "I" character within the "Bob 11/12/2017" field. The analytics system may then choose to either exclude the entire extracted key/value content, or may choose to correct the erroneous content. The correction may be implemented by scanning either forwards and/or backwards within line content to identify the correct set of content to be assigned to the key and/or value field. In this case, the "Bob 11/12/2017" field would be corrected to only associate "Bob" to the value field for key "Name".

Therefore, what has been described is an improved system, method, and computer program product for implementing a log analytics method and system that can configure, collect, and analyze log records in an efficient manner. In particular, an improved approach has been described to automatically generate a log parser by analysis of the line content of a log. In addition, an efficient approach has been described to extract key-value content from the log content.

System Architecture Overview

FIG. 27 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method comprising:
   generating a mapping structure that maps a first plurality of elements of a first entry in a log to corresponding element types;
   analyzing a second plurality of elements of a second entry in the log, relative to the mapping structure, to identify at least:
      a common element that is identical in the first plurality of elements and the second plurality of elements, and
      a first variable element that varies between the first plurality of elements and the second plurality of elements;
   generating a regular expression comprising at least:
      the common element, and
      a first matching pattern that (a) restricts the first variable element to a first data type, from a plurality of possible data types, and (b) matches the first variable element in both the first plurality of elements and the second plurality of elements; and
   generating a log parser configured to parse logs based on the regular expression, wherein the method is performed by at least one device comprising a processor.

2. The method of claim 1, wherein analyzing the second plurality of elements relative to the mapping structure comprises:
   traversing the second plurality of elements;
   while traversing the second plurality of elements:
      determining a first common character that is identical between the second plurality of elements and the mapping structure,
      determining a second common character that is identical between the second plurality of elements and the mapping structure, and
      determining that one or more intervening characters, between the first common character and the second common character, does not match between the second plurality of elements and the mapping structure; and
   marking a range of characters, encompassing the one or more intervening characters, as the first variable element.

3. The method of claim 1, wherein the plurality of possible data types comprises one or more of a string type, an integer type, an alphabetic character type, or a field rule type, wherein the field rule type corresponds to a sequence of elements defined by a rule.

4. The method of claim 1, further comprising:
   grouping together contents of a plurality of lines of the log, as the second entry for analysis relative to the mapping structure.

5. The method of claim 4, wherein grouping together the contents of the plurality of lines comprises forming a single line comprising the contents.

6. The method of claim 1, further comprising:
   identifying that the common element is a delimiter within the log, at least by:
      identifying a plurality of common elements in the first entry and the second entry;
      scoring the plurality of common elements, based at least in part on respective positions of the plurality of common elements and one or more weighting factors; and
      selecting the common element as the delimiter, based at least in part on the scoring.

7. The method of claim 1, further comprising:
   identifying a second variable element that varies between the first plurality of elements and the second plurality of elements,
   wherein the regular expression further comprises a second matching pattern that (a) restricts the second variable element to a second data type, from the plurality of possible data types, and (b) matches the second variable element in both the first plurality of elements and the second plurality of elements,
   wherein the first data type is different from the second data type.

8. A non-transitory computer readable medium having stored thereon instructions which, when executed by one or more hardware processors, cause performance of operations comprising:
   generating a mapping structure that maps a first plurality of elements of a first entry in a log to corresponding element types;
   analyzing a second plurality of elements of a second entry in the log, relative to the mapping structure, to identify at least:
      a common element that is identical in the first plurality of elements and the second plurality of elements, and
      a first variable element that varies between the first plurality of elements and the second plurality of elements;
   generating a regular expression comprising at least:
      the common element, and
      a first matching pattern that (a) restricts the first variable element to a first data type, from a plurality of possible data types, and (b) matches the first variable element in both the first plurality of elements and the second plurality of elements; and
   generating a log parser configured to parse logs based on the regular expression,
   wherein the method is performed by at least one device comprising a processor.

9. The non-transitory computer readable medium of claim 8, wherein analyzing the second plurality of elements relative to the mapping structure comprises:
   traversing the second plurality of elements;
   while traversing the second plurality of elements:
      determining a first common character that is identical between the second plurality of elements and the mapping structure,
      determining a second common character that is identical between the second plurality of elements and the mapping structure, and
      determining that one or more intervening characters, between the first common character and the second common character, does not match between the second plurality of elements and the mapping structure; and marking a range of characters, encompassing the one or more intervening characters, as the first variable element.

10. The non-transitory computer readable medium of claim 8, wherein the plurality of possible data types comprises one or more of a string type, an integer type, an alphabetic character type, or a field rule type, wherein the field rule type corresponds to a sequence of elements defined by a rule.

11. The non-transitory computer readable medium of claim 8, the operations further comprising:
grouping together contents of a plurality of lines of the log, as the second entry for analysis relative to the mapping structure.

12. The non-transitory computer readable medium of claim 11, wherein grouping together the contents of the plurality of lines comprises forming a single line comprising the contents.

13. The non-transitory computer readable medium of claim 8, the operations further comprising:
determining that the common element is a delimiter within the log, at least by:
identifying a plurality of common elements in the first entry and the second entry;
scoring the plurality of common elements, based at least in part on respective positions of the plurality of common elements and one or more weighting factors; and
selecting the common element as the delimiter, based at least in part on the scoring.

14. The non-transitory computer readable medium of claim 8, the operations further comprising:
identifying a second variable element that varies between the first plurality of elements and the second plurality of elements,
wherein the regular expression further comprises a second matching pattern that (a) restricts the second variable element to a second data type, from the plurality of possible data types, and (b) matches the second variable element in both the first plurality of elements and the second plurality of elements,
wherein the first data type is different from the second data type.

15. A system, comprising:
at least one device including a hardware processor;
the system being configured to perform operations comprising:
generating a mapping structure that maps a first plurality of elements of a first entry in a log to corresponding element types;
analyzing a second plurality of elements of a second entry in the log, relative to the mapping structure, to identify at least:
a common element that is identical in the first plurality of elements and the second plurality of elements, and
a first variable element that varies between the first plurality of elements and the second plurality of elements;
generating a regular expression comprising at least:
the common element, and
a first matching pattern that (a) restricts the first variable element to a first data type, from a plurality of possible data types, and (b) matches the first variable element in both the first plurality of elements and the second plurality of elements; and
generating a log parser configured to parse logs based on the regular expression,
wherein the method is performed by at least one device comprising a processor.

16. The system of claim 15, wherein analyzing the second plurality of elements relative to the mapping structure comprises:
traversing the second plurality of elements;
while traversing the second plurality of elements:
determining a first common character that is identical between the second plurality of elements and the mapping structure,
determining a second common character that is identical between the second plurality of elements and the mapping structure, and
determining that one or more intervening characters, between the first common character and the second common character, does not match between the second plurality of elements and the mapping structure; and
marking a range of characters, encompassing the one or more intervening characters, as the first variable element.

17. The system of claim 15, wherein the plurality of possible data types comprises one or more of a string type, an integer type, an alphabetic character type, or a field rule type, wherein the field rule type corresponds to a sequence of elements defined by a rule.

18. The system of claim 15, the operations further comprising:
grouping together contents of a plurality of lines of the log, as the second entry for analysis relative to the mapping structure.

19. The system of claim 15, the operations further comprising:
identifying that the common element is a delimiter within the log, at least by:
identifying a plurality of common elements in the first entry and the second entry;
scoring the plurality of common elements, based at least in part on respective positions of the plurality of common elements and one or more weighting factors; and
selecting the common element as the delimiter, based at least in part on the scoring.

20. The system of claim 15, the operations further comprising:
identifying a second variable element that varies between the first plurality of elements and the second plurality of elements,
wherein the regular expression further comprises a second matching pattern that (a) restricts the second variable element to a second data type, from the plurality of possible data types, and (b) matches the second variable element in both the first plurality of elements and the second plurality of elements,
wherein the first data type is different from the second data type.

* * * * *

UNITED STATES PATENT AND TRADEMARK OFFICE
CERTIFICATE OF CORRECTION

PATENT NO. : 10,366,096 B2
APPLICATION NO. : 15/089180
DATED : July 30, 2019
INVENTOR(S) : Ferrar It is certified that error appears in the above-identified patent and that said Letters Patent is hereby corrected as shown below:

On the Title Page

On page 2, Column 2, under Other Publications, Line 31, after "mining" insert -- based on --.

In the Specification

In Column 1, Line 18, delete "15/089,005," and insert -- 15/089,049, --, therefor.

In Column 5, Line 10, delete "that that" and insert -- that --, therefor.

In Column 9, Line 11, delete "type;" and insert -- type. --, therefor.

In Column 9, Line 46, delete "pid[0-9]*" and insert -- pid=[0-9]* --, therefor.

In Column 9, Line 52, delete "(a)<," and insert -- (a) <, --, therefor.

In Column 10, Line 24, delete "that that" and insert -- that --, therefor.

In Column 11, Line 63, delete "that that" and insert -- that --, therefor.

In Column 12, Line 66, delete "XML," and insert -- XML --, therefor.

In Column 14, Line 41, delete "XML," and insert -- XML --, therefor.

In Column 14, Line 42, delete "XML," and insert -- XML --, therefor.

In Column 15, Line 22, delete "Re-syncshronization" and insert -- Re-synchronization --, therefor.

In Column 15, Line 39, delete "XML," and insert -- XML --, therefor.

Signed and Sealed this
Eleventh Day of August, 2020

Andrei Iancu
*Director of the United States Patent and Trademark Office*

CERTIFICATE OF CORRECTION (continued)
U.S. Pat. No. 10,366,096 B2

In Column 23, Line 5, delete "pubhckey" and insert -- publickey --, therefor.

In Column 23, Line 48, delete ""sending" and insert -- "*sending --, therefor.

In Column 25, Line 55, delete "(and )," and insert -- (and), --, therefor.

In Column 25, Line 61, delete "entry-The" and insert -- entry. The --, therefor.

In Column 25, Line 64, delete "(and )" and insert -- (and) --, therefor.

In Column 31, Line 20, delete "} ]" and insert -- }] --, therefor.

In Column 37, Lines 24-28, delete "The approach described in U.S. application Ser. No. 14/863,136, filed on Sep. 24, 2015 can be used to identify pattern signatures to implement this approach, and which is hereby incorporated by reference in its entirety." and insert -- One or more approaches described in U.S. provisional application no. 62/056,073, filed on September 26, 2014, and U.S. application no. 14/863,994, filed on September 24, 2015, which are hereby incorporated by reference in their entirety, can be used to identify pattern signatures to implement this approach. --, therefor.

In Column 37, Line 48, delete ""I"" and insert -- "/" --, therefor.

In Column 38, Line 45, delete "PTSN," and insert -- PSTN, --, therefor.